US012663910B2

(12) United States Patent
Boesel et al.

(10) Patent No.: US 12,663,910 B2
(45) Date of Patent: Jun. 23, 2026

(54) DEVICES, METHODS, AND GRAPHICAL USER INTERFACES FOR CONTENT COLLABORATION AND SHARING

(71) Applicant: Apple Inc., Cupertino, CA (US)

(72) Inventors: Benjamin H. Boesel, Sunnyvale, CA (US); Shih-Sang Chiu, San Francisco, CA (US); Stephen O. Lemay, Palo Alto, CA (US); Jay Moon, San Francisco, CA (US); Matthew J. Sundstrom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 18/611,377

(22) Filed: Mar. 20, 2024

(65) Prior Publication Data

US 2024/0402869 A1 Dec. 5, 2024

Related U.S. Application Data

(60) Provisional application No. 63/470,895, filed on Jun. 3, 2023, provisional application No. 63/470,821, filed on Jun. 2, 2023.

(51) Int. Cl.
*G06F 3/04815* (2022.01)
*G06F 3/0484* (2022.01)

(52) U.S. Cl.
CPC ........ *G06F 3/04815* (2013.01); *G06F 3/0484* (2013.01)

(58) Field of Classification Search
CPC ........................... G06F 3/04815; G06F 3/0484
See application file for complete search history.

(56) References Cited

U.S. PATENT DOCUMENTS

| | | | |
|---|---|---|---|
| 6,097,371 A | 8/2000 | Siddiqui et al. |
| 6,199,012 B1 | 3/2001 | Hasegawa |
| 6,416,471 B1 | 7/2002 | Kumar et al. |
| 6,594,654 B1 | 7/2003 | Salam et al. |
| 6,662,023 B1 | 12/2003 | Helle |

(Continued)

FOREIGN PATENT DOCUMENTS

| | | |
|---|---|---|
| CA | 2897539 A1 | 10/2014 |
| CN | 1443427 A | 9/2003 |

(Continued)

OTHER PUBLICATIONS

Final Office Action received for U.S. Appl. No. 18/583,787, mailed on Jun. 18, 2025, 16 pages.

(Continued)

*Primary Examiner* — Tadesse Hailu
(74) *Attorney, Agent, or Firm* — YHE Law LLP

(57) ABSTRACT

Techniques and user interfaces for collaborating on content and sharing content in an extended reality environment. In some embodiments, while a user is collaborating with another user, a computer system switches from spatially synchronized viewing to unsynchronized viewing when the user edits a document. In some embodiments, content is added to a three-dimensional environment and is shared in a real-time communication session in response to a computer system detecting a set of one or more inputs including a request to add content to the three-dimensional environment in the real-time communication session.

48 Claims, 52 Drawing Sheets

(56) References Cited

U.S. PATENT DOCUMENTS

| | | | |
|---|---|---|---|
| 6,912,694 B1 | 6/2005 | Harrison et al. | |
| 7,302,650 B1 | 11/2007 | Allyn et al. | |
| 7,771,320 B2 | 8/2010 | Riley et al. | |
| 7,773,460 B2 | 8/2010 | Holt | |
| 7,970,827 B1 | 6/2011 | Cumberbatch et al. | |
| 8,105,208 B2 | 1/2012 | Oleson et al. | |
| 8,128,503 B1 | 3/2012 | Haot et al. | |
| 8,152,694 B2 | 4/2012 | Srinivasan et al. | |
| 8,200,323 B2 | 6/2012 | Dibenedetto et al. | |
| 8,379,939 B1 | 2/2013 | Bourdev et al. | |
| 8,462,997 B2 | 6/2013 | Soldan et al. | |
| 8,467,770 B1 | 6/2013 | Ben | |
| 8,504,008 B1 | 8/2013 | Gossweiler et al. | |
| 8,543,081 B2 | 9/2013 | Scott et al. | |
| 8,566,403 B2 | 10/2013 | Pascal et al. | |
| 8,595,798 B2 | 11/2013 | Anand et al. | |
| 8,624,836 B1 | 1/2014 | Miller et al. | |
| 8,666,361 B2 | 3/2014 | Chu et al. | |
| 8,700,158 B2 | 4/2014 | Mass et al. | |
| 8,825,445 B2 | 9/2014 | Hoffman et al. | |
| 8,849,610 B2 | 9/2014 | Molettiere et al. | |
| 8,948,819 B2 | 2/2015 | Yun et al. | |
| 9,071,945 B1 | 6/2015 | Rubin et al. | |
| 9,125,566 B2 | 9/2015 | Libbus et al. | |
| 9,164,663 B1 | 10/2015 | Berard | |
| 9,173,576 B2 | 11/2015 | Yuen et al. | |
| 9,338,242 B1 | 5/2016 | Suchland et al. | |
| 9,600,178 B2 | 3/2017 | Yun et al. | |
| 9,600,630 B2 | 3/2017 | Keegan et al. | |
| 9,730,621 B2 | 8/2017 | Cohen et al. | |
| 9,800,525 B1 | 10/2017 | Lemer et al. | |
| 9,904,906 B2 | 2/2018 | Kim et al. | |
| 10,019,136 B1 | 7/2018 | Ozog | |
| 10,051,103 B1 | 8/2018 | Gordon et al. | |
| 10,076,257 B2 | 9/2018 | Lin et al. | |
| 10,270,898 B2 | 4/2019 | Soll et al. | |
| 10,275,116 B2 | 4/2019 | Decker et al. | |
| 10,425,284 B2 | 9/2019 | Dellinger et al. | |
| 10,639,521 B2 | 5/2020 | Foley et al. | |
| 10,866,619 B1 | 12/2020 | Bushnell et al. | |
| 10,873,786 B2 | 12/2020 | Folse et al. | |
| 11,360,634 B1 * | 6/2022 | Chang | G06F 3/0481 |
| 12,260,059 B2 * | 3/2025 | Chang | H04L 51/214 |
| 2001/0031622 A1 | 10/2001 | Kivela et al. | |
| 2002/0068600 A1 | 6/2002 | Chihara et al. | |
| 2002/0142734 A1 | 10/2002 | Wickstead | |
| 2003/0002391 A1 | 1/2003 | Biggs et al. | |
| 2003/0182628 A1 | 9/2003 | Lira | |
| 2004/0077462 A1 | 4/2004 | Brown et al. | |
| 2004/0083474 A1 | 4/2004 | Mckinlay et al. | |
| 2004/0168107 A1 | 8/2004 | Sharp et al. | |
| 2004/0181771 A1 | 9/2004 | Anonsen et al. | |
| 2004/0218472 A1 | 11/2004 | Narayanaswami et al. | |
| 2004/0225966 A1 | 11/2004 | Besharat et al. | |
| 2004/0246607 A1 | 12/2004 | Watson et al. | |
| 2005/0015803 A1 | 1/2005 | Macrae et al. | |
| 2005/0066325 A1 | 3/2005 | Mori et al. | |
| 2005/0156873 A1 | 7/2005 | Walter et al. | |
| 2005/0197063 A1 | 9/2005 | White et al. | |
| 2005/0202846 A1 | 9/2005 | Glass et al. | |
| 2005/0278757 A1 | 12/2005 | Grossman et al. | |
| 2006/0010098 A1 | 1/2006 | Goodnow et al. | |
| 2006/0010435 A1 | 1/2006 | Jhanwar et al. | |
| 2006/0122748 A1 | 6/2006 | Nou | |
| 2006/0155578 A1 | 7/2006 | Eisenberger et al. | |
| 2006/0217104 A1 | 9/2006 | Cho | |
| 2006/0218500 A1 | 9/2006 | Sauve et al. | |
| 2006/0242259 A1 | 10/2006 | Vallabh et al. | |
| 2006/0271605 A1 | 11/2006 | Petruzzo | |
| 2006/0277118 A1 | 12/2006 | Keohane et al. | |
| 2006/0277469 A1 | 12/2006 | Chaudhri et al. | |
| 2007/0067733 A1 | 3/2007 | Moore et al. | |
| 2007/0101279 A1 | 5/2007 | Chaudhri et al. | |
| 2007/0135043 A1 | 6/2007 | Hayes et al. | |
| 2007/0143495 A1 | 6/2007 | Porat | |
| 2007/0156689 A1 * | 7/2007 | Meek | G06F 9/541 |
| 2007/0239801 A1 | 10/2007 | Lee et al. | |
| 2007/0261537 A1 | 11/2007 | Eronen et al. | |
| 2007/0271340 A1 | 11/2007 | Goodman et al. | |
| 2008/0005734 A1 | 1/2008 | Kendra et al. | |
| 2008/0027586 A1 | 1/2008 | Hern et al. | |
| 2008/0076637 A1 | 3/2008 | Gilley et al. | |
| 2008/0077936 A1 | 3/2008 | Goel et al. | |
| 2008/0122796 A1 | 5/2008 | Jobs et al. | |
| 2008/0183909 A1 | 7/2008 | Lim et al. | |
| 2008/0247519 A1 | 10/2008 | Abella et al. | |
| 2008/0259829 A1 | 10/2008 | Rosenblatt | |
| 2009/0054743 A1 | 2/2009 | Stewart | |
| 2009/0060170 A1 | 3/2009 | Coughlan et al. | |
| 2009/0070675 A1 | 3/2009 | Li | |
| 2009/0113315 A1 | 4/2009 | Fisher et al. | |
| 2009/0144639 A1 | 6/2009 | Nims et al. | |
| 2009/0195497 A1 | 8/2009 | Fitzgerald et al. | |
| 2009/0198581 A1 | 8/2009 | Lidestri | |
| 2009/0205041 A1 | 8/2009 | Michalske | |
| 2009/0216556 A1 | 8/2009 | Martin et al. | |
| 2009/0231960 A1 | 9/2009 | Hutcheson | |
| 2009/0253516 A1 | 10/2009 | Hartmann et al. | |
| 2009/0262088 A1 | 10/2009 | Moll-carrillo et al. | |
| 2009/0276463 A1 | 11/2009 | Miller et al. | |
| 2009/0300598 A1 | 12/2009 | Choi | |
| 2009/0311993 A1 | 12/2009 | Horodezky | |
| 2009/0313579 A1 | 12/2009 | Poulson et al. | |
| 2009/0319467 A1 | 12/2009 | Berg et al. | |
| 2010/0005008 A1 | 1/2010 | Duncker et al. | |
| 2010/0011309 A1 | 1/2010 | Mitra et al. | |
| 2010/0048358 A1 | 2/2010 | Tchao et al. | |
| 2010/0054519 A1 | 3/2010 | Mulvey et al. | |
| 2010/0063840 A1 | 3/2010 | Hoyme et al. | |
| 2010/0064255 A1 | 3/2010 | Rottler et al. | |
| 2010/0082784 A1 | 4/2010 | Rosenblatt et al. | |
| 2010/0125785 A1 | 5/2010 | Moore et al. | |
| 2010/0151908 A1 | 6/2010 | Skarby et al. | |
| 2010/0151918 A1 | 6/2010 | Annambhotla et al. | |
| 2010/0157742 A1 | 6/2010 | Relyea et al. | |
| 2010/0190468 A1 | 7/2010 | Scott et al. | |
| 2010/0194692 A1 | 8/2010 | Orr et al. | |
| 2010/0198453 A1 | 8/2010 | Dorogusker et al. | |
| 2010/0202368 A1 | 8/2010 | Hans | |
| 2010/0211685 A1 | 8/2010 | Mcdowall et al. | |
| 2010/0222645 A1 | 9/2010 | Nadler et al. | |
| 2010/0223563 A1 | 9/2010 | Green | |
| 2010/0225962 A1 | 9/2010 | Okigami et al. | |
| 2010/0226213 A1 | 9/2010 | Drugge | |
| 2010/0269055 A1 | 10/2010 | Daikeler et al. | |
| 2010/0281374 A1 | 11/2010 | Schulz et al. | |
| 2010/0292600 A1 | 11/2010 | Dibenedetto et al. | |
| 2010/0295795 A1 | 11/2010 | Wilairat | |
| 2010/0299601 A1 | 11/2010 | Kaplan et al. | |
| 2011/0003665 A1 | 1/2011 | Burton et al. | |
| 2011/0004835 A1 | 1/2011 | Yanchar et al. | |
| 2011/0010195 A1 | 1/2011 | Cohn et al. | |
| 2011/0029750 A1 | 2/2011 | Jang et al. | |
| 2011/0059769 A1 | 3/2011 | Brunolli | |
| 2011/0061010 A1 | 3/2011 | Wasko et al. | |
| 2011/0074699 A1 | 3/2011 | Marr et al. | |
| 2011/0083111 A1 | 4/2011 | Forutanpour et al. | |
| 2011/0088086 A1 | 4/2011 | Swink et al. | |
| 2011/0093728 A1 | 4/2011 | Das | |
| 2011/0098928 A1 | 4/2011 | Hoffman et al. | |
| 2011/0106954 A1 | 5/2011 | Chatterjee et al. | |
| 2011/0111735 A1 | 5/2011 | Pietrow | |
| 2011/0113337 A1 | 5/2011 | Liu et al. | |
| 2011/0130168 A1 | 6/2011 | Vendrow et al. | |
| 2011/0137678 A1 | 6/2011 | Williams | |
| 2011/0167369 A1 | 7/2011 | Van | |
| 2011/0193878 A1 | 8/2011 | Seo et al. | |
| 2011/0197165 A1 | 8/2011 | Filippov et al. | |
| 2011/0202883 A1 | 8/2011 | Oh et al. | |
| 2011/0205851 A1 | 8/2011 | Harris | |
| 2011/0218765 A1 | 9/2011 | Rogers et al. | |
| 2011/0227872 A1 | 9/2011 | Huska et al. | |
| 2011/0227946 A1 | 9/2011 | Yoshizawa et al. | |
| 2011/0234152 A1 | 9/2011 | Frossen et al. | |

(56) References Cited

U.S. PATENT DOCUMENTS

| | | |
|---|---|---|
| 2011/0246241 A1 | 10/2011 | Hasan et al. |
| 2011/0248992 A1 | 10/2011 | Van et al. |
| 2011/0271223 A1 | 11/2011 | Cruz Moreno et al. |
| 2011/0276683 A1 | 11/2011 | Goldschlag et al. |
| 2011/0296324 A1 | 12/2011 | Goossens et al. |
| 2011/0304685 A1 | 12/2011 | Khedouri et al. |
| 2011/0307880 A1 | 12/2011 | Hilerio et al. |
| 2012/0001922 A1 | 1/2012 | Escher et al. |
| 2012/0015779 A1 | 1/2012 | Powch et al. |
| 2012/0023131 A1 | 1/2012 | Downey et al. |
| 2012/0036220 A1 | 2/2012 | Dare et al. |
| 2012/0036460 A1 | 2/2012 | Cieplinski et al. |
| 2012/0044062 A1 | 2/2012 | Jersa et al. |
| 2012/0047447 A1 | 2/2012 | Haq |
| 2012/0059664 A1 | 3/2012 | Georgiev et al. |
| 2012/0059787 A1 | 3/2012 | Brown et al. |
| 2012/0060092 A1 | 3/2012 | Hill et al. |
| 2012/0066628 A1 | 3/2012 | Ens et al. |
| 2012/0071770 A1 | 3/2012 | Grey et al. |
| 2012/0079122 A1 | 3/2012 | Brown et al. |
| 2012/0083258 A1 | 4/2012 | Rabii et al. |
| 2012/0083294 A1 | 4/2012 | Bray et al. |
| 2012/0092383 A1 | 4/2012 | Hysek et al. |
| 2012/0109836 A1 | 5/2012 | Chen et al. |
| 2012/0116550 A1 | 5/2012 | Hoffman et al. |
| 2012/0117507 A1 | 5/2012 | Tseng et al. |
| 2012/0131441 A1 | 5/2012 | Jitkoff et al. |
| 2012/0143013 A1 | 6/2012 | Davis et al. |
| 2012/0150446 A1 | 6/2012 | Chang et al. |
| 2012/0169608 A1 | 7/2012 | Forutanpour et al. |
| 2012/0197523 A1 | 8/2012 | Kirsch |
| 2012/0209829 A1 | 8/2012 | Thomas et al. |
| 2012/0226117 A1 | 9/2012 | Lamego et al. |
| 2012/0254263 A1 | 10/2012 | Hiestermann et al. |
| 2012/0258684 A1 | 10/2012 | Franz et al. |
| 2012/0290109 A1 | 11/2012 | Engelberg et al. |
| 2012/0310674 A1 | 12/2012 | Faulkner et al. |
| 2012/0324390 A1 | 12/2012 | Tao et al. |
| 2013/0013327 A1 | 1/2013 | Horseman |
| 2013/0016818 A1 | 1/2013 | Cohn |
| 2013/0017846 A1 | 1/2013 | Schoppe |
| 2013/0027341 A1 | 1/2013 | Mastandrea |
| 2013/0031490 A1 | 1/2013 | Joo et al. |
| 2013/0044072 A1 | 2/2013 | Kobayashi et al. |
| 2013/0050263 A1 | 2/2013 | Khoe et al. |
| 2013/0054634 A1 | 2/2013 | Chakraborty et al. |
| 2013/0055147 A1 | 2/2013 | Vasudev et al. |
| 2013/0063383 A1 | 3/2013 | Anderssonreimer et al. |
| 2013/0069893 A1 | 3/2013 | Brinda et al. |
| 2013/0093715 A1 | 4/2013 | Marsden et al. |
| 2013/0103814 A1 | 4/2013 | Carrasco et al. |
| 2013/0111579 A1 | 5/2013 | Newman et al. |
| 2013/0117696 A1 | 5/2013 | Robertson et al. |
| 2013/0137073 A1 | 5/2013 | Nacey et al. |
| 2013/0142495 A1 | 6/2013 | Terai |
| 2013/0143512 A1 | 6/2013 | Hernandez et al. |
| 2013/0151523 A1 | 6/2013 | Hsi |
| 2013/0190083 A1 | 7/2013 | Toy et al. |
| 2013/0197679 A1 | 8/2013 | Balakrishnan et al. |
| 2013/0205210 A1 | 8/2013 | Jeon et al. |
| 2013/0209972 A1 | 8/2013 | Carter et al. |
| 2013/0222270 A1 | 8/2013 | Winkler et al. |
| 2013/0225118 A1 | 8/2013 | Jang et al. |
| 2013/0238360 A1 | 9/2013 | Bhathal |
| 2013/0239063 A1 | 9/2013 | Ubillos et al. |
| 2013/0244633 A1 | 9/2013 | Jacobs et al. |
| 2013/0254685 A1 | 9/2013 | Batraski et al. |
| 2013/0254705 A1 | 9/2013 | Mooring et al. |
| 2013/0260896 A1 | 10/2013 | Miura et al. |
| 2013/0262155 A1 | 10/2013 | Hinkamp |
| 2013/0290013 A1 | 10/2013 | Forrester et al. |
| 2013/0295872 A1 | 11/2013 | Guday et al. |
| 2013/0304276 A1 | 11/2013 | Flies |
| 2013/0310726 A1 | 11/2013 | Miller et al. |
| 2013/0332856 A1 | 12/2013 | Sanders et al. |
| 2013/0345978 A1 | 12/2013 | Lush et al. |
| 2014/0006769 A1 | 1/2014 | Chory et al. |
| 2014/0022183 A1 | 1/2014 | Ayoub et al. |
| 2014/0025737 A1 | 1/2014 | Kruglick |
| 2014/0058812 A1 | 2/2014 | Bender et al. |
| 2014/0059125 A1 | 2/2014 | Hillier |
| 2014/0059493 A1 | 2/2014 | Kim |
| 2014/0068520 A1 | 3/2014 | Missig et al. |
| 2014/0073298 A1 | 3/2014 | Rossmann |
| 2014/0074570 A1 | 3/2014 | Hope et al. |
| 2014/0075234 A1 | 3/2014 | Stekkelpak et al. |
| 2014/0082383 A1 | 3/2014 | De Cesare et al. |
| 2014/0082384 A1 | 3/2014 | De Cesare et al. |
| 2014/0092101 A1 | 4/2014 | Lee et al. |
| 2014/0101565 A1 | 4/2014 | Mahieu et al. |
| 2014/0128021 A1 | 5/2014 | Walker et al. |
| 2014/0129255 A1 | 5/2014 | Woodson et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0155154 A1 | 6/2014 | Laakkonen et al. |
| 2014/0172864 A1 | 6/2014 | Shum |
| 2014/0176475 A1 | 6/2014 | Myers et al. |
| 2014/0179272 A1 | 6/2014 | Zhang et al. |
| 2014/0181205 A1 | 6/2014 | Sherrets et al. |
| 2014/0181558 A1 | 6/2014 | Taha et al. |
| 2014/0187314 A1 | 7/2014 | Perry et al. |
| 2014/0187323 A1 | 7/2014 | Perry |
| 2014/0189584 A1 | 7/2014 | Weng et al. |
| 2014/0195826 A1 | 7/2014 | Wojcik et al. |
| 2014/0208250 A1 | 7/2014 | Ording et al. |
| 2014/0236459 A1 | 8/2014 | Boesch et al. |
| 2014/0240122 A1 | 8/2014 | Roberts et al. |
| 2014/0245177 A1 | 8/2014 | Maklouf et al. |
| 2014/0250391 A1 | 9/2014 | Jong et al. |
| 2014/0280498 A1 | 9/2014 | Frankel et al. |
| 2014/0282103 A1 | 9/2014 | Jerry |
| 2014/0282207 A1 | 9/2014 | Wouhaybi et al. |
| 2014/0287821 A1 | 9/2014 | Barclay et al. |
| 2014/0289660 A1 | 9/2014 | Min |
| 2014/0293755 A1 | 10/2014 | Geiser et al. |
| 2014/0304738 A1 | 10/2014 | Nakaoka et al. |
| 2014/0310618 A1 | 10/2014 | Venkatesh |
| 2014/0317543 A1 | 10/2014 | Kim |
| 2014/0317555 A1 | 10/2014 | Choi et al. |
| 2014/0325384 A1 | 10/2014 | Kobayashi |
| 2014/0325408 A1 | 10/2014 | Leppanen et al. |
| 2014/0337450 A1 | 11/2014 | Choudhary et al. |
| 2014/0344862 A1 | 11/2014 | Cho et al. |
| 2014/0358012 A1 | 12/2014 | Richards et al. |
| 2014/0362056 A1 | 12/2014 | Zambetti et al. |
| 2015/0026615 A1 | 1/2015 | Choi et al. |
| 2015/0033149 A1 | 1/2015 | Kuchoor |
| 2015/0057945 A1 | 2/2015 | White et al. |
| 2015/0067513 A1 | 3/2015 | Zambetti et al. |
| 2015/0098309 A1 | 4/2015 | Adams et al. |
| 2015/0100982 A1 | 4/2015 | Sirpal et al. |
| 2015/0112990 A1 | 4/2015 | Van Os et al. |
| 2015/0130830 A1 | 5/2015 | Nagasaki et al. |
| 2015/0160856 A1 | 6/2015 | Jang et al. |
| 2015/0180980 A1 | 6/2015 | Welinder et al. |
| 2015/0185995 A1 | 7/2015 | Shoemaker et al. |
| 2015/0205509 A1 | 7/2015 | Scriven et al. |
| 2015/0208115 A1 | 7/2015 | Kutsumi et al. |
| 2015/0217163 A1 | 8/2015 | Amis et al. |
| 2015/0227609 A1 | 8/2015 | Shoemaker et al. |
| 2015/0227782 A1 | 8/2015 | Salvador et al. |
| 2015/0253740 A1 | 9/2015 | Nishijima et al. |
| 2015/0256491 A1 | 9/2015 | Eatough et al. |
| 2015/0269848 A1 | 9/2015 | Yuen et al. |
| 2015/0286391 A1 | 10/2015 | Jacobs et al. |
| 2015/0295901 A1 | 10/2015 | Woodward et al. |
| 2015/0301506 A1 | 10/2015 | Koumaiha |
| 2015/0317147 A1 | 11/2015 | Nachimuthu et al. |
| 2015/0324751 A1 | 11/2015 | Orenstein et al. |
| 2015/0334546 A1 | 11/2015 | Diamond |
| 2015/0341695 A1 | 11/2015 | Pattan |
| 2015/0347711 A1 | 12/2015 | Soli et al. |
| 2015/0350141 A1 | 12/2015 | Yang et al. |

(56) References Cited

U.S. PATENT DOCUMENTS

| | | |
|---|---|---|
| 2015/0350861 A1 | 12/2015 | Soli et al. |
| 2015/0355804 A1 | 12/2015 | Nguyen et al. |
| 2016/0004393 A1 | 1/2016 | Faaborg et al. |
| 2016/0012294 A1 | 1/2016 | Bouck |
| 2016/0014266 A1 | 1/2016 | Bhatt |
| 2016/0022202 A1 | 1/2016 | Peterson et al. |
| 2016/0027420 A1 | 1/2016 | Eronen |
| 2016/0028869 A1 | 1/2016 | Bhatt |
| 2016/0044269 A1 | 2/2016 | Kang |
| 2016/0054841 A1 | 2/2016 | Yang et al. |
| 2016/0058336 A1 | 3/2016 | Blahnik et al. |
| 2016/0063748 A1 | 3/2016 | Kim et al. |
| 2016/0065505 A1 | 3/2016 | Iskander |
| 2016/0066005 A1 | 3/2016 | Davis et al. |
| 2016/0073034 A1 | 3/2016 | Mukherjee et al. |
| 2016/0098137 A1 | 4/2016 | Kim et al. |
| 2016/0103970 A1 | 4/2016 | Liu et al. |
| 2016/0150063 A1 | 5/2016 | Choi et al. |
| 2016/0180568 A1 | 6/2016 | Bullivant et al. |
| 2016/0187995 A1 | 6/2016 | Rosewall |
| 2016/0188181 A1 | 6/2016 | Smith |
| 2016/0196760 A1 | 7/2016 | Koo et al. |
| 2016/0197773 A1 | 7/2016 | Pandrangi et al. |
| 2016/0202889 A1 | 7/2016 | Shin et al. |
| 2016/0210568 A1 | 7/2016 | Krupa et al. |
| 2016/0217601 A1 | 7/2016 | Tsuda et al. |
| 2016/0226713 A1 | 8/2016 | Pitschel et al. |
| 2016/0239724 A1 | 8/2016 | Arfvidsson et al. |
| 2016/0253864 A1 | 9/2016 | Weber et al. |
| 2016/0256741 A1 | 9/2016 | Holma et al. |
| 2016/0261675 A1 | 9/2016 | Block et al. |
| 2016/0270717 A1 | 9/2016 | Luna et al. |
| 2016/0321932 A1 | 11/2016 | Mitchell et al. |
| 2016/0327911 A1 | 11/2016 | Eim et al. |
| 2016/0357363 A1 | 12/2016 | Decker et al. |
| 2017/0026430 A1 | 1/2017 | Beckhardt et al. |
| 2017/0039535 A1 | 2/2017 | Park et al. |
| 2017/0041549 A1 | 2/2017 | Kim et al. |
| 2017/0063753 A1 | 3/2017 | Probasco et al. |
| 2017/0083189 A1 | 3/2017 | Yang et al. |
| 2017/0087469 A1 | 3/2017 | Hardee et al. |
| 2017/0093769 A1 | 3/2017 | Lind et al. |
| 2017/0093780 A1 | 3/2017 | Lieb et al. |
| 2017/0123571 A1 | 5/2017 | Huang et al. |
| 2017/0134321 A1 | 5/2017 | Ushio et al. |
| 2017/0239524 A1 | 8/2017 | Lee et al. |
| 2017/0243508 A1 | 8/2017 | Cheng et al. |
| 2017/0255169 A1 | 9/2017 | Lee et al. |
| 2017/0269792 A1 | 9/2017 | Xu et al. |
| 2017/0344257 A1 | 11/2017 | Gnedin et al. |
| 2017/0354845 A1 | 12/2017 | Williams et al. |
| 2017/0357520 A1 | 12/2017 | De Vries et al. |
| 2017/0359623 A1 | 12/2017 | Folse et al. |
| 2018/0034765 A1 | 2/2018 | Keszler et al. |
| 2018/0039406 A1 | 2/2018 | Kong et al. |
| 2018/0077344 A1 | 3/2018 | Bostick et al. |
| 2018/0081515 A1 | 3/2018 | Block et al. |
| 2018/0121060 A1 | 5/2018 | Jeong et al. |
| 2018/0143761 A1 | 5/2018 | Choi et al. |
| 2018/0157452 A1 | 6/2018 | Nelson et al. |
| 2018/0300037 A1 | 10/2018 | Takeda et al. |
| 2018/0316783 A1 | 11/2018 | Ye et al. |
| 2018/0316964 A1 | 11/2018 | Dillon et al. |
| 2018/0364648 A1 | 12/2018 | Chi et al. |
| 2018/0367484 A1 | 12/2018 | Rodriguez et al. |
| 2019/0026011 A1 | 1/2019 | Wang et al. |
| 2019/0072909 A1 | 3/2019 | Misaki et al. |
| 2019/0102049 A1 | 4/2019 | Anzures et al. |
| 2019/0126099 A1 | 5/2019 | Hoang |
| 2019/0184234 A1 | 6/2019 | Packles et al. |
| 2019/0220243 A1 | 7/2019 | Decker et al. |
| 2019/0232110 A1 | 8/2019 | Williams et al. |
| 2019/0232111 A1 | 8/2019 | Williams et al. |
| 2019/0250813 A1 | 8/2019 | Block et al. |
| 2019/0268771 A1 | 8/2019 | Seo et al. |
| 2019/0334782 A1 | 10/2019 | Dellinger et al. |
| 2019/0339822 A1 | 11/2019 | Devine et al. |
| 2019/0349463 A1 | 11/2019 | Soli et al. |
| 2020/0149921 A1 | 5/2020 | Hoffman et al. |
| 2020/0213437 A1 | 7/2020 | Bhatt |
| 2021/0042028 A1 | 2/2021 | Block et al. |
| 2021/0042132 A1 | 2/2021 | Park et al. |
| 2021/0092488 A1 | 3/2021 | Folse et al. |
| 2021/0191600 A1* | 6/2021 | Lemay ..................... G06F 3/013 |
| 2021/0255758 A1 | 8/2021 | Devine et al. |
| 2021/0263700 A1 | 8/2021 | Decker et al. |
| 2021/0289067 A1 | 9/2021 | Dellinger et al. |
| 2021/0352118 A1 | 11/2021 | Ahn et al. |
| 2022/0047918 A1 | 2/2022 | Williams et al. |
| 2022/0264184 A1 | 8/2022 | Folse et al. |
| 2022/0365740 A1* | 11/2022 | Chang ................... G06F 3/0488 |
| 2023/0012755 A1 | 1/2023 | D'Auria et al. |
| 2023/0013809 A1 | 1/2023 | D'Auria et al. |
| 2023/0019337 A1 | 1/2023 | D'Auria et al. |
| 2023/0024084 A1 | 1/2023 | D'Auria et al. |
| 2023/0031103 A1 | 2/2023 | Decker et al. |
| 2023/0066552 A1 | 3/2023 | Van Os et al. |
| 2023/0100610 A1* | 3/2023 | Pastrana Vicente .... G06F 3/011 |
| | | 715/727 |
| 2023/0107803 A1 | 4/2023 | Dugan |
| 2023/0179700 A1 | 6/2023 | Bhatt |
| 2024/0004521 A1 | 1/2024 | Devine et al. |
| 2024/0192845 A1 | 6/2024 | Block et al. |
| 2024/0316404 A1 | 9/2024 | Williams et al. |
| 2024/0402881 A1 | 12/2024 | Bignell et al. |
| 2025/0047777 A1 | 2/2025 | Bhatt |
| 2025/0153004 A1 | 5/2025 | Williams et al. |
| 2025/0195954 A1 | 6/2025 | D'auria et al. |

FOREIGN PATENT DOCUMENTS

| | | |
|---|---|---|
| CN | 1536511 A | 10/2004 |
| CN | 1782685 A | 6/2006 |
| CN | 1997050 A | 7/2007 |
| CN | 101061484 A | 10/2007 |
| CN | 101365127 A | 2/2009 |
| CN | 101505320 A | 8/2009 |
| CN | 101566919 A | 10/2009 |
| CN | 101822020 A | 9/2010 |
| CN | 101827363 A | 9/2010 |
| CN | 101828411 A | 9/2010 |
| CN | 101910992 A | 12/2010 |
| CN | 101939740 A | 1/2011 |
| CN | 101978374 A | 2/2011 |
| CN | 102193895 A | 9/2011 |
| CN | 102449560 A | 5/2012 |
| CN | 102449561 A | 5/2012 |
| CN | 102646081 A | 8/2012 |
| CN | 102937970 A | 2/2013 |
| CN | 102989159 A | 3/2013 |
| CN | 103003668 A | 3/2013 |
| CN | 103154954 A | 6/2013 |
| CN | 103282937 A | 9/2013 |
| CN | 103297610 A | 9/2013 |
| CN | 103577108 A | 2/2014 |
| CN | 103581456 A | 2/2014 |
| CN | 103876721 A | 6/2014 |
| CN | 103902808 A | 7/2014 |
| CN | 103914238 A | 7/2014 |
| CN | 103973899 A | 8/2014 |
| CN | 104288983 A | 1/2015 |
| CN | 104464010 A | 3/2015 |
| CN | 104508426 A | 4/2015 |
| CN | 104885107 A | 9/2015 |
| CN | 104917794 A | 9/2015 |
| CN | 105260078 A | 1/2016 |
| CN | 105308634 A | 2/2016 |
| CN | 105874447 A | 8/2016 |
| CN | 106575149 A | 4/2017 |
| CN | 107122049 A | 9/2017 |
| CN | 107491259 A | 12/2017 |
| CN | 107710197 A | 2/2018 |
| CN | 110456899 A | 11/2019 |
| CN | 110456971 A | 11/2019 |

(56) References Cited

FOREIGN PATENT DOCUMENTS

| CN | 111787984 A | 10/2020 |
| CN | 111796657 A | 10/2020 |
| EP | 1705883 A1 | 9/2006 |
| EP | 2407219 A2 | 1/2012 |
| EP | 2426902 A1 | 3/2012 |
| EP | 2632139 A2 | 8/2013 |
| EP | 2993602 A1 | 3/2016 |
| EP | 3739439 B1 | 4/2023 |
| GB | 2550639 A | 11/2017 |
| JP | 7-334463 A | 12/1995 |
| JP | 10-90333 A | 4/1998 |
| JP | 10-202715 A | 8/1998 |
| JP | 2001-133293 A | 5/2001 |
| JP | 2002-73486 A | 3/2002 |
| JP | 2003-296246 A | 10/2003 |
| JP | 2005-339017 A | 12/2005 |
| JP | 3830956 B1 | 10/2006 |
| JP | 2008-272301 A | 11/2008 |
| JP | 2009-50471 A | 3/2009 |
| JP | 2009-147889 A | 7/2009 |
| JP | 2010-12335 A | 1/2010 |
| JP | 2011-65500 A | 3/2011 |
| JP | 2012-53642 A | 3/2012 |
| JP | 2012-203537 A | 10/2012 |
| JP | 2012-533117 A | 12/2012 |
| JP | 2013-29925 A | 2/2013 |
| JP | 2013-54468 A | 3/2013 |
| JP | 2014-112404 A | 6/2014 |
| JP | 5530320 B2 | 6/2014 |
| JP | 2014-216868 A | 11/2014 |
| JP | 2015-531916 A | 11/2015 |
| JP | 2016-508631 A | 3/2016 |
| KR | 10-2009-0112132 A | 10/2009 |
| KR | 10-2013-0109466 A | 10/2013 |
| TV | 200512616 A | 4/2005 |
| TW | 498240 B | 8/2002 |
| TW | 201210368 A | 3/2012 |
| TW | 201240499 A | 10/2012 |
| WO | 2004/047440 A2 | 6/2004 |
| WO | 2007/142703 A1 | 12/2007 |
| WO | 2007/149731 A1 | 12/2007 |
| WO | 2008/114491 A1 | 9/2008 |
| WO | 2010/129221 A1 | 11/2010 |
| WO | 2012/075322 A2 | 6/2012 |
| WO | 2012/127484 A1 | 9/2012 |
| WO | 2014/002711 A1 | 1/2014 |
| WO | 2014/022711 A1 | 2/2014 |
| WO | 2014/200730 A1 | 12/2014 |
| WO | 2015/029313 A1 | 3/2015 |
| WO | 2015/183828 A1 | 12/2015 |
| WO | 2016/126733 A1 | 8/2016 |
| WO | 2019/118853 A1 | 6/2019 |
| WO | 2019/217005 A1 | 11/2019 |
| WO | 2019/217009 A1 | 11/2019 |
| WO | 2022/066438 A1 | 3/2022 |

OTHER PUBLICATIONS

Office Action received for Chinese Patent Application No. 202510130289.7, mailed on Sep. 19, 2025, 18 pages (9 pages of English Translation and 9 pages of Official Copy).
Final Office Action received for U.S. Appl. No. 18/367,934, mailed on Sep. 2, 2025, 11 pages.
Office Action received for Australian Patent Application No. 2024200956, mailed on Aug. 20, 2025, 7 pages.
Advisory Action received for U.S. Appl. No. 14/841,606, mailed on Feb. 28, 2019, 3 pages.
Advisory Action received for U.S. Appl. No. 14/863,099, mailed on Sep. 8, 2016, 3 pages.
Advisory Action received for U.S. Appl. No. 15/554,204, mailed on Mar. 12, 2020, 3 pages.
Advisory Action received for U.S. Appl. No. 16/145,033, mailed on Nov. 2, 2021, 5 pages.
Advisory Action received for U.S. Appl. No. 16/377,892, mailed on Apr. 9, 2021, 4 pages.
Advisory Action received for U.S. Appl. No. 16/378,136, mailed on Apr. 12, 2021, 4 pages.
Advisory Action received for U.S. Appl. No. 16/389,722, mailed on Jun. 9, 2023, 4 pages.
Advisory Action received for U.S. Appl. No. 16/389,722, mailed on Mar. 09. 2021, 5 pages.
Advisory Action received for U.S. Appl. No. 17/744,500, mailed on Nov. 14, 2023, 5 pages.
Apple Inc., "iPhone User Guide For iOS 7.1 Software", available online at <https://manuals.info.apple.com/MANUALS/1000/MA1681/en_US/iphone_ios7_user_guide.pdf>, Mar. 10, 2014, pp. 1-162.
Applicant Initiated Interview Summary received for U.S. Appl. No. 16/363,945, mailed on Aug. 13, 2020, 5 pages.
Initiated Interview Summary received for U.S. Appl. No. 16/389,722, mailed on Jul. 7, 2020, 5 pages.
Initiated Interview Summary received for U.S. Appl. No. 17/327,204, mailed on Jan. 25, 2022, 5 pages.
Applicante-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/614.121, mailed on Feb. 13, 2020, 4 pages.
Applicant-Initiated Interview Summary received for U.S. Appl. No. 16/145,033, mailed on Apr. 30, 2021, 4 pages.
Applicant-Initiated Interview Summary received for U.S. Appl. No. 16/145,033, mailed on Jun. 29, 2020, 5 pages.
Applicant-Initiated Interview Summary received for U.S. Appl. No. 16/145,033, mailed on Nov. 24, 2020, 4 pages.
Applicant-Initiated Interview Summary received for U.S. Appl. No. 16/145,033, mailed on Oct. 7, 2021, 4 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/388,493, mailed on Feb. 17, 2022, 2 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on May 31, 2023, 4 pages.
Applicant-Initiated Interview Summary received for U.S. Appl. No. 16/389,722, mailed on Nov. 4, 2022, 4 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/407,590, mailed on Jun. 5, 2020, 3 pages.
Applicant-Initiated Interview Summary received for U.S. Appl. No. 16/407,590, mailed on Nov. 17, 2020, 6 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 17/068,386, mailed on Apr. 24, 2023, 2 pages.
Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/116,775, mailed on Nov. 3, 2021, 4 pages.
Applicant-Initiated Interview Summary received for U.S. Appl. No. 17/126,571, mailed on Jan. 27, 2022, 4 pages.

(56) References Cited

OTHER PUBLICATIONS

Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/744,500, mailed on May 30, 2023, 4 pages.
Applicant-Initiated Interview Summary received for U.S. Appl. No. 17/744,500, mailed on Oct. 17, 2023, 4 pages.
Applicant-Initiated Interview Summary received for U.S. Appl. No. 17/862,097, mailed on Mar. 1, 2023, 4 pages.
Applicant-Initiated Interview Summary received for U.S. Appl. No. 17/862,097, mailed on May 18, 2023, 3 pages.
Applicant-Initiated Interview Summary received for U.S. Appl. No. 17/951,613, mailed on Sep. 8, 2023, 5 pages.
Applicant-Initiated Interview Summary received for U.S. Appl. No. 17/951,624, mailed on Nov. 16, 2023, 3 pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Applicant-Initiated Interview Summary received for U.S. Appl. No. 17/952,027, mailed on May 30, 2023, 4 pages.
Applicant-Initiated Interview Summary received for U.S. Appl. No. 17/952,027, mailed on Sep. 11, 2023, 3 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Board Decision received for Chinese Patent Application No. 201510284850.3, mailed on Mar. 3, 2022, 27 pages (1 page of English Translation and 26 pages of Official Copy).
Board Opinion received for Chinese Patent Application No. 201510284850.3, mailed on Jul. 2, 2021, 13 pages (3 pages of English Translation and 10 pages of Official Copy).
Brief Communication Regarding Oral Proceedings received for European Patent Application No. 19724963.4, mailed on Jun. 22, 2021, 2 pages.
Brief Communication Regarding Oral Proceedings received for European Patent Application No. 21165295.3, mailed on Feb. 27, 2024, 1 page.
Certificate of Examination received for Australian Patent Application No. 2018101855, mailed on Aug. 6, 2019, 2 pages.
Certificate of Examination received for Australian Patent Application No. 2019100490, mailed on Oct. 16, 2019, 2 pages.
Certification of Examination received for Australian Patent Application No. 2018100158, mailed on Oct. 23, 2018, 2 pages.
Codrington Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Corrected Notice of Allowance received for U.S. Appl. No. 15/554,204, mailed on Aug. 19, 2020, 3 pages.
Corrected Notice of Allowance received for U.S. Appl. No. 16/145,033, mailed on Jun. 23, 2023, 3 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 17/116,775, mailed on Jan. 28, 2022, 2 pages.
Corrected Notice of Allowance received for U.S. Appl. No. 17/744,500, mailed on Jan. 12, 2024, 3 pages.
Corrected Notice of Allowance received for U.S. Appl. No. 17/951,613, mailed on Jan. 2, 2024, 2 pages.
Corrected Notice of Allowance received for U.S. Appl. No. 17/952,027, mailed on Jan. 22, 2024, 3 pages.

Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for U.S. Appl. No. 16/145,033, mailed on Apr. 4, 2023, 9 pages.
Decision to Grant received for Danish Patent Application No. PA201870385, mailed on Mar. 26, 2020, 2 pages.
Decision to Grant received for European Patent Application No. 16706081.3, mailed on Nov. 29, 2018, 2 pages.
Decision to Grant received for European Patent Application No. 16762356.0, mailed on Apr. 26, 2022, 2 pages.
Decision to Grant received for European Patent Application No. 18213157.3, mailed on Feb. 24, 2022, 2 pages.
Decision to Grant received for European Patent Application No. 19724963.4, mailed on Feb. 3, 2022, 2 pages.
Decision to Grant received for European Patent Application No. 22173249.8, mailed on Dec. 14, 2023, 2 pages.
Decision to Refuse received for European Patent Application No. 17810749.6, mailed on Jan. 29, 2021, 24 pages.
Dharmasena Anusha, "iMessage-send as text message Option", YouTube, Available online at: <https://www.youtube.com/watch?v=hXG-MdlW6FA>, Feb. 18, 2013, 1 page.
European Search Report received for European Patent Application No. 21165295.3, mailed on Jun. 18, 2021, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 16/145,033, mailed on Aug. 4, 2022, 10 pages.
Examiner's Answer to Appeal Brief received for U.S. Appl. No. 16/389,722, mailed on Feb. 2, 2024, 8 pages.
Extended European Search Report received for European Patent Application No. 16762356.0, mailed on Nov. 9, 2018, 10 Pages.
Extended European Search Report received for European Patent Application No. 18213157.3, mailed on Apr. 12, 2019, 8 pages.
Extended European Search Report received for European Patent Application No. 19163212.4, mailed on Jun. 25, 2019, 11 pages.
Extended European Search Report received for European Patent Application No. 22150207.3, mailed on Apr. 11, 2022, 11 pages.
Extended European Search Report received for European Patent Application No. 22152524.9, mailed on May 2, 2022, 10 pages.
Extended European Search Report received for European Patent Application No. 22170561.9, mailed on Aug. 10, 2022, 11 pages.
Extended European Search Report received for European Patent Application No. 22173249.8, mailed on Aug. 19, 2022, 15 pages.
Extended European Search Report received for European Patent Application No. 23216484.8, mailed on Feb. 28, 2024. 9 pages.
Extended European Search Report received for European Patent Application No. 17813824.4, mailed on Dec. 5, 2019, 7 pages.
Final Office Action received for U.S. Appl. No. 14/599,424, mailed on Jun. 28, 2018, 12 pages.
Final Office Action received for U.S. Appl. No. 14/599,425, mailed on Jun. 12, 2018, 45 pages.
Final Office Action received for U.S. Appl. No. 14/599,425, mailed on May 19, 2017, 24 pages.
Final Office Action received for U.S. Appl. No. 14/599,425, mailed on Oct. 8, 2015, 20 pages.
Final Office Action received for U.S. Appl. No. 14/774,664, mailed on Aug. 25, 2017, 23 pages.
Final Office Action received for U.S. Appl. No. 14/841,606, mailed on Sep. 7, 2018, 34 pages.
Final Office Action received for U.S. Appl. No. 14/863,069, mailed on Jul. 5, 2018, 19 pages.
Final Office Action received for U.S. Appl. No. 14/863,099, mailed on Apr. 21, 2016, 20 pages.
Final Office Action received for U.S. Appl. No. 14/864,759, mailed on Sep. 4, 2018, 24 pages.
Final Office Action received for U.S. Appl. No. 15/554,204, mailed on Oct. 31, 2019, 22 pages.
Final Office Action received for U.S. Appl. No. 15/614,121, mailed on Apr. 8, 2019, 32 pages.

(56) References Cited

OTHER PUBLICATIONS

Final Office Action received for U.S. Appl. No. 16/145,033, mailed on Jul. 6, 2021, 113 pages.
Final Office Action received for U.S. Appl. No. 16/145,033, mailed on Sep. 22, 2020, 49 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/389,722, mailed on Mar. 17, 2023, 14 pages.
Final Office Action received for U.S. Appl. No. 16/407,590, mailed on Aug. 25, 2020, 14 pages.
Final Office Action received for U.S. Appl. No. 16/679,967, mailed on Nov. 10, 2021, 14 pages.
Final Office Action received for U.S. Appl. No. 17/068,386, mailed on Mar. 3, 2022, 29 pages.
Final Office Action received for U.S. Appl. No. 17/068,386, mailed on May 8, 2023, 23 pages.
Final Office Action received for U.S. Appl. No. 17/516,537, mailed on Oct. 11, 2022, 9 pages.
Final Office Action received for U.S. Appl. No. 17/744,500, mailed on Sep. 19, 2023, 35 pages.
Final Office Action received for U.S. Appl. No. 17/862,097, mailed on Apr. 24, 2023, 17 pages.
Final Office Action received for U.S. Appl. No. 17/951,624, mailed on Jan. 25, 2024, 48 pages.
Final Office Action received for U.S. Appl. No. 17/951,875, mailed on May 30, 2023, 12 pages.
Final Office Action received for U.S. Appl. No. 17/952,027, mailed on Aug. 21, 2023, 47 pages.
Final Office Action received for U.S. Appl. No. 18/088,309, mailed on Jan. 9, 2024, 13 pages.
Google. "Android User's Guide", Retrieved from the Internet:https://static.googleusercontent.com/media/www.google.com/en//help/hc/pdfs/mobile/AndroidUsersGuide-30-100.pdf, Feb. 23, 2011, 140 pages.
How to Send and Receive files over Bluetooth on an Android Phone, Online Available at: <https://web. archive.org/web/20160529062240/http://www.androidtipsandhacks.com/android/send-receive-files-bluetooth-android-phone/, May 29, 2016, 7 pages.
Intention to Grant received for Danish Patent Application No. PA201870385, mailed on Jan. 24, 2020, 2 pages.
Intention to Grant received for European Patent Application No. 16706081.3, mailed on Jul. 18, 2018, 8 pages.
Intention to Grant received for European Patent Application No. 16706081.3, mailed on Jun. 11, 2018, 7 pages.
Intention to Grant received for European Patent Application No. 16762356.0, mailed on Dec. 23, 2021, 8 pages.
Intention to Grant received for European Patent Application No. 17813824.4, mailed on Feb. 1, 2024, 9 pages.
Intention to Grant received for European Patent Application No. 18213157.3, mailed on May 19, 2021, 8 pages.
Intention to Grant received for European Patent Application No. 18213157.3, mailed on Oct. 27, 2021, 8 pages.
Intention to Grant received for European Patent Application No. 19724963.4, mailed on Sep. 20, 2021, 7 pages.
Intention to Grant received for European Patent Application No. 22150207.3, mailed on Mar. 21, 2024, 9 pages.
Intention to Grant received for European Patent Application No. 22173249.8, mailed on Oct. 2, 2023, 9 pages.
International Preliminary Report on Patentability received for PCT Patent Application No. PCT/US2014/027882, mailed on Sep. 24, 2015, 8 pages.

International Preliminary Report on Patentability received for PCT Patent Application No. PCT/US2015/032474, mailed on Dec. 15, 2016, 7 pages.
International Preliminary Report on Patentability received for PCT Patent Application No. PCT/US2015/053353, mailed on Sep. 21, 2017., 15 pages.
International Preliminary Report on Patentability received for PCT Patent Application No. PCT/US2016/014997, mailed on Dec. 21, 2017, 16 pages.
International Preliminary Report on Patentability received for PCT Patent Application No. PCT/US2016/016216, mailed on May 4, 2017, 14 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2017/036608, mailed on Dec. 27, 2018, 12 pages.
International Preliminary Report on Patentability received for PCT Patent Application No. PCT/US2019/024790, mailed on Nov. 19, 2020, 11 pages.
International Preliminary Report on Patentability received for PCT Patent Application No. PCT/US2022/029297, mailed on Nov. 30, 2023, 10 pages.
International Search Report & Written Opinion received for PCT Patent Application No. PCT/US2016/014997, mailed on Aug. 31, 2016, 21 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/032474, mailed on Aug. 19, 2015, 8 pages.
International Search Report and Written Opinion received for PCT Patent Application No. PCT/US2015/053353, mailed on May 9, 2016, 21 pages.
International Search Report and Written Opinion received for PCT Patent Application No. PCT/US2016/016216, mailed on Jun. 27, 2016, 18 pages.
International Search Report and Written Opinion received for PCT Patent Application No. PCT/US2016/021403, mailed on May 12, 2016, 23 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2017/036608, mailed on Oct. 20, 2017, 15 pages.
International Search Report and Written Opinion received for PCT Patent Application No. PCT/US2019/024790, mailed on Sep. 11, 2019, 18 pages.
International Search Report and Written Opinion received for PCT Patent Application No. PCT/US2022/029297, mailed on Aug. 11, 2022, 13 pages.
Internet Blog Post,"[PC] Pre-Customization of Black Desert's Characters", Online Available at: - <https://blog.naver.com/hsh6051/220209813968>, Dec. 14, 2014, 41 pages (21 pages of English translation and 20 pages of Official Copy).
Invitation to Pay Additional Fee received for PCT Patent Application No. PCT/US2019/024790, mailed on Jul. 18, 2019, 10 pages.
Invitation to Pay Additional Fees received for PCT Patent Application No. PCT/US2014/027882, mailed on Aug. 5, 2014, 2 pages.
Invitation to Pay Additional fees received for PCT Patent Application No. PCT/US2015/053353, mailed on Jan. 21, 2016, 7 pages.
Invitation to Pay Additional Fees received for PCT Patent Application No. PCT/US2016/014997, mailed on May 2, 2016, 5 pages.

(56) References Cited

OTHER PUBLICATIONS

Invitation to Pay Additional Fees received for PCT Patent Application No. PCT/US2016/016216, mailed on Apr. 20, 2016, 6 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2017/036608, mailed on Aug. 14, 2017, 2 pages.
Invitation to Restrict or Pay Additional Fees received for PCT Patent Application No. PCT/US2016/016216, mailed on Dec. 19, 2016, 9 pages.
Jurick et al., "iPhone Hacks", Tips & Tools for Unlocking the Power of Your iPhone & iPod touch, Online: URL: https://api.pageplace.de/preview/DT0400.9780596550974_A23629666/preview-9780596550974_A23629666.pdf >, Apr. 2009, 49 pages.
Kamcord—Wikipedia, Online Available at: <https://en.wikipedia.org/w/index.php?title=Kamcord&oldid=712263010>, Mar. 28, 2016, 2 pages.
Kamcord Developers—Quick Start Guide, Online Available at: <https://web.archive.org/web/20140801055705/https://www.kamcord.com/developers/docs/ios/features-and-settings/, Aug. 1, 2014, 10 pages.
Kamcord Developers, Online Available at: <https://web.archive.org/web/20140827043641/http://www.kamcord.com/developers/>, Aug. 27, 2014, 7 pages.
Lin et al., "Cooperation Stimulation Strategies for Peer-To-Peer Wireless Video Streaming Social Networks", In IEEE Transactions on Image Processing, vol. 19, Issue 17, Available Online at: https://dl.acm.org/doi/abs/10.1109/TIP.2010.2045035. 2010, 30 pages.
Minutes of Oral Proceedings received for European Patent Application No. 16762356.0, mailed on Dec. 17, 2021, 5 pages.
Minutes of the Oral Proceedings received for European Patent Application No. 17810749.6, mailed on Jan. 26, 2021, 8 pages.
Minutes of the Oral Proceedings received for European Patent Application No. 19724963.4, mailed on Sep. 3, 2021, 6 pages.
Mugs,Online Available at: https://web.archive.org/web/20151029034349/http://le-mugs.com/, Oct. 29, 2015, 14 pages.
Non-Final Office Action received for U.S. Appl. No. 15/554,204, mailed on Apr. 17, 2019, 19 pages.
Non-Final Office Action received for U.S. Appl. No. 16/679,967, mailed on Sep. 2, 2021, 12 pages.
Non-Final Office Action received for U.S. Appl. No. 14/503,372, mailed on Dec. 5, 2014, 11 pages.
Non-Final Office Action received for U.S. Appl. No. 14/599,424, mailed on Jan. 17, 2018, 13 pages.
Non-Final Office Action received for U.S. Appl. No. 14/599,425, mailed on Jan. 11, 2018, 42 pages.
Non-Final Office Action received for U.S. Appl. No. 14/599,425, mailed on Mar. 17, 2015, 16 pages.
Non-Final Office Action received for U.S. Appl. No. 14/599,425, mailed on Oct. 26, 2016., 22 pages.
Non-Final Office Action received for U.S. Appl. No. 14/774,664, mailed on Mar. 7, 2017, 23 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/863,069, mailed on Oct. 5, 2017, 19 pages.
Non-Final Office Action received for U.S. Appl. No. 14/863,099, mailed on Dec. 2, 2015, 12 pages.
Non-Final Office Action received for U.S. Appl. No. 14/864,759, mailed on Mar. 20, 2018, 20 pages.
Non-Final Office Action received for U.S. Appl. No. 15/614,121, mailed on Nov. 4, 2019, 44 pages.
Non-Final Office Action received for U.S. Appl. No. 15/614.121, mailed on Nov. 30, 2018, 28 pages.
Non-Final Office Action received for U.S. Appl. No. 16/145,033, mailed on Feb. 9, 2021, 55 pages.
Non-Final Office Action received for U.S. Appl. No. 16/145,033, mailed on Mar. 4, 2020, 50 pages.
Non-Final Office Action received for U.S. Appl. No. 16/363,945, mailed on Apr. 24, 2020, 13 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/388,493, mailed on Dec. 9, 2021, 7 pages.
Non-Final Office Action received for U.S. Appl. No. 16/389,722, mailed on Apr. 3, 2020, 15 pages.
Non-Final Office Action received for U.S. Appl. No. 16/389.722, mailed on Jul. 7, 2022, 16 pages.
Non-Final Office Action received for U.S. Appl. No. 16/389,722, mailed on Jun. 3, 2021, 17 pages.
Non-Final Office Action received for U.S. Appl. No. 16/407,590, mailed on Apr. 10, 2020, 12 pages.
Non-Final Office Action received for U.S. Appl. No. 16/679,967, mailed on Apr. 19, 2022, 13 pages.
Non-Final Office Action received for U.S. Appl. No. 17/068,386, mailed on Jan. 30, 2023, 20 pages.
Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/116,775, mailed on Aug. 24, 2021, 20 Pages
Non-Final Office Action received for U.S. Appl. No. 17/126,571, mailed on Dec. 21, 2021, 19 pages.
Non-Final Office Action received for U.S. Appl. No. 17/327,204, mailed on Nov. 26, 2021, 13 pages.
Non-Final Office Action received for U.S. Appl. No. 17/516,537, mailed on May 5, 2022, 8 pages.
Non-Final Office Action received for U.S. Appl. No. 17/744,500, mailed on Apr. 19, 2023, 30 pages.
Non-Final Office Action received for U.S. Appl. No. 17/862,097, mailed on Feb. 1, 2023, 16 pages.
Non-Final Office Action received for U.S. Appl. No. 17/951,613, mailed on Aug. 2, 2023, 42 pages.
Non-Final Office Action received for U.S. Appl. No. 17/951,624, mailed on Sep. 19, 2023, 41 pages.
Non-Final Office Action received for U.S. Appl. No. 17/951,875, mailed on Jan. 23, 2023, 12 pages.
Non-Final Office Action received for U.S. Appl. No. 17/952,027, mailed on Apr. 28, 2023, 46 pages.
Non-Final Office Action received for U.S. Appl. No. 18/088,309, mailed on Apr. 9, 2024, 14 pages.
Non-Final Office Action received for U.S. Appl. No. 18/088,309, mailed on Sep. 21, 2023, 11 pages.
Notice of Acceptance received for Australian Patent Application No. 2015267240, mailed on Apr. 10, 2018, 3 pages.
Notice of Acceptance received for Australian Patent Application No. 2016215440, mailed on Feb. 28, 2019, 3 pages.
Notice of Acceptance received for Australian Patent Application No. 2016229847, mailed on Sep. 12, 2018, 3 pages.
Notice of Acceptance received for Australian Patent Application No. 2017277971, mailed on Feb. 17, 2021, 3 pages.
Notice of Acceptance received for Australian Patent Application No. 2017286296, mailed on May 1, 2020, 3 pages.
Notice of Acceptance received for Australian Patent Application No. 2018206772, mailed on Mar. 17, 2020, 3 pages.
Notice of Acceptance received for Australian Patent Application No. 2018279037, mailed on May 13, 2020, 3 pages.
Notice of Acceptance received for Australian Patent Application No. 2019266054, mailed on Nov. 25, 2021, 3 pages.
Notice of Acceptance received for Australian Patent Application No. 2020204259, mailed on June 11, 2021, 3 pages.
Notice of Acceptance received for Australian Patent Application No. 2020204506, mailed on Apr. 8, 2021, 3 pages.
Notice of Acceptance received for Australian Patent Application No. 2020210234, mailed on Feb. 3, 2022, 3 pages.
Notice of Acceptance received for Australian Patent Application No. 2021203216, mailed on Jul. 26, 2022, 3 pages.

(56)     References Cited

OTHER PUBLICATIONS

Notice of Acceptance received for Australian Patent Application No. 2021203636, mailed on Apr. 14, 2022, 3 pages.

Notice of Acceptance received for Australian Patent Application No. 2021218036, mailed on May 9, 2023, 3 pages.

Notice of Acceptance received for Australian Patent Application No. 2022200514, mailed on Apr. 17, 2023, 3 pages.

Notice of Acceptance received for Australian Patent Application No. 2022203278, mailed on Dec. 4, 2023, 3 pages.

Notice of Acceptance received for Australian Patent Application No. 2022209277, mailed on Apr. 28, 2023, 3 pages.

Notice of Acceptance received for Australian Patent Application No. 2022235634, mailed on Nov. 2, 2023, 3 pages.

Notice of Allowance received for Chinese Patent Application No. 201520358505.5, issued on Jan. 13, 2016, 3 pages (2 pages of English Translation and 1 page of Official Copy).

Notice of Allowance received for Chinese Patent Application No. 201580028677.9, mailed on Apr. 2, 2019, 2 pages (1 pages of English Translation and 1 pages of Official Copy).

Notice of Allowance received for Chinese Patent Application No. 201680008151.9, mailed on Jun. 16, 2020, 2 pages (1 page of English Translation and 1 page of Official Copy).

Notice of Allowance received for Chinese Patent Application No. 201680013193.1, mailed on May 7, 2021, 5 pages (1 page of English Translation and 4 pages of Official Copy).

Notice of Allowance received for Chinese Patent Application No. 201710439448.7, mailed on Jan. 26, 2021, 2 pages (1 page of English Translation and 1 page of Official Copy).

Notice of Allowance received for Chinese Patent Application No. 201780034193.4, mailed on Oct. 20, 2021, 4 pages (1 page of English Translation and 3 pages of Official Copy).

Notice of Allowance received for Chinese Patent Application No. 201780034203.4, mailed on Jan. 17, 2022, 2 pages (1 page of English Translation and 1 page of Official Copy).

Notice of Allowance received for Chinese Patent Application No. 201811136445.7, mailed on Aug. 11, 2021, 2 pages (1 page of English Translation and 1 page of Official Copy).

Notice of Allowance received for Japanese Patent Application No. 2016-569945, mailed on Jan. 7, 2020, 4 pages (1 page of English Translation and 3 pages of Official Copy).

Notice of Allowance received for Japanese Patent Application No. 2017-545918, mailed on Jul. 22, 2019, 4 pages (1 page of English Translation and 3 pages of Official Copy).

Notice of Allowance received for Japanese Patent Application No. 2019-151358, mailed on Jan. 22, 2021, 4 pages (1 page of English Translation and 3 pages of Official Copy).

Notice of Allowance received for Japanese Patent Application No. 2020-010239, mailed on Sep. 3, 2021, 4 pages (1 page of English Translation and 3 pages of Official Copy).

Notice of Allowance received for Japanese Patent Application No. 2021-023661, mailed on Apr. 10, 2023, 4 pages (1 page of English Translation and 3 pages of Official Copy).

Notice of Allowance received for Japanese Patent Application No. 2021-163700, mailed on Mar. 3, 2023, 4 pages (1 page of English Translation and 3 pages of Official Copy).

Notice of Allowance received for Korean Patent Application No. 10-2019-7029673, mailed on Aug. 3, 2021, 3 pages (1 page of English Translation and 2 pages of Official Copy).

Notice of Allowance received for Korean Patent Application No. 10-2021-7036016, mailed on Sep. 28, 2022, 7 pages (2 pages of English Translation and 5 pages of Official Copy).

Notice of Allowance received for Korean Patent Application No. 10-2022-7044515, mailed on Feb. 19, 2024, 7 pages (2 pages of English Translation and 5 pages of Official Copy).

Notice of Allowance received for Taiwanese Patent Application No. 104117509, mailed on Mar. 31, 2017, 3 pages (Official Copy Only) (See Communication Under Rule 37 CFR § 1.98(a) (3)}.

Notice of Allowance received for U.S. Appl. No. 14/599,424, mailed on Dec. 13, 2018, 6 pages.

Notice of Allowance received for U.S. Appl. No. 14/599,425, mailed on Dec. 19, 2018, 9 pages.

Notice of Allowance received for U.S. Appl. No. 14/863,069, mailed on Feb. 6, 2019, 6 pages.

Notice of Allowance received for U.S. Appl. No. 14/863,069, mailed on Jun. 18, 2019, 6 pages.

Notice of Allowance received for U.S. Appl. No. 14/864,759, mailed on Dec. 14, 2018, 10 pages.

Notice of Allowance received for U.S. Appl. No. 15/554,204, mailed on Jul. 13, 2020, 10 pages.

Notice of Allowance received for U.S. Appl. No. 15/614,121, mailed on Aug. 27, 2020, 8 pages.

Notice of Allowance received for U.S. Appl. No. 15/614,121, mailed on Mar. 6, 2020, 8 pages.

Notice of Allowance received for U.S. Appl. No. 15/616,480, mailed on Jan. 3, 2019, 8 pages.

Notice of Allowance received for U.S. Appl. No. 16/145,033, mailed on Aug. 17, 2023, 8 pages.

Notice of Allowance received for U.S. Appl. No. 16/145,033, mailed on May 3, 2023, 5 pages.

Notice of Allowance received for U.S. Appl. No. 16/363,945, mailed on Sep. 23, 2020, 10 pages.

Notice of Allowance received for U.S. Appl. No. 16/377,892, mailed on May 24, 2021, 9 pages.

Notice of Allowance received for U.S. Appl. No. 16/377,892, mailed on Sep. 9, 2021, 9 pages.

Notice of Allowance received for U.S. Appl. No. 16/378,136, mailed on Jun. 3, 2021, 7 pages.

Notice of Allowance received for U.S. Appl. No. 16/378,136, mailed on Sep. 22, 2021, 7 pages.

Notice of Allowance received for U.S. Appl. No. 16/388,493, mailed on Jun. 20, 2022, 5 pages.

Notice of Allowance received for U.S. Appl. No. 16/407,590, mailed on Apr. 9, 2021, 3 pages.

Notice of Allowance received for U.S. Appl. No. 16/407,590, mailed on Dec. 16, 2020, 6 pages.

Notice of Allowance received for U.S. Appl. No. 16/407,590, mailed on Mar. 22, 2021, 6 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 17/068,386, mailed on Dec. 13, 2023, 12 pages.

Notice of Allowance received for U.S. Appl. No. 17/116,775, mailed on Jan. 18, 2022, 10 pages.

Notice of Allowance received for U.S. Appl. No. 17/126,571, mailed on Mar. 11, 2022, 9 pages.

Notice of Allowance received for U.S. Appl. No. 17/327,204, mailed on May 18, 2022, 18 pages.

Notice of Allowance received for U.S. Appl. No. 17/516,537, mailed on Apr. 17, 2023, 8 pages.

Notice of Allowance received for U.S. Appl. No. 17/516,537, mailed on Dec. 27, 2022, 7 pages.

Notice of Allowance received for U.S. Appl. No. 17/739,664, mailed on Dec. 7, 2022, 8 pages.

Notice of Allowance received for U.S. Appl. No. 17/744,500, mailed on Dec. 22, 2023, 38 pages.

Notice of Allowance received for U.S. Appl. No. 17/951,613, mailed on Dec. 8, 2023, 13 pages.

Notice of Allowance received for U.S. Appl. No. 17/951,613, mailed on Feb. 2, 2024, 5 pages.

Notice of Allowance received for U.S. Appl. No. 17/951,875, mailed on Dec. 26, 2023, 7 pages.

Notice of Allowance received for U.S. Appl. No. 17/951,875, mailed on Jul. 26, 2023, 7 pages.

Notice of Allowance received for U.S. Appl. No. 17/951,875, mailed on Oct. 20, 2023, 8 pages.

Notice of Allowance received for U.S. Appl. No. 17/952,027, mailed on Dec. 29, 2023, 6 pages.

Notice of Allowance received for U.S. Appl. No. 17/952,027, mailed on Oct. 4, 2023, 13 pages.

(56)         References Cited

OTHER PUBLICATIONS

Office Action received for Australian Patent Application No. 2015100734, issued on Jul. 29, 2015, 5 pages.
Office Action received for Australian Patent Application No. 2015267240, mailed on Apr. 10, 2017, 5 pages.
Office Action received for Australian Patent Application No. 2015267240, mailed on Mar. 21, 2018, 5 pages.
Office Action received for Australian Patent Application No. 2016215440, mailed on Jan. 22, 2019, 2 pages.
Office Action received for Australian Patent Application No. 2016215440, mailed on Mar. 13, 2018, 3 pages.
Office Action received for Australian Patent Application No. 2016229847, mailed on Jul. 3, 2018, 4 pages.
Office Action received for Australian Patent Application No. 2017100667, mailed on Aug. 3, 2017, 9 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2017286296, mailed on May 8, 2019, 4 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018206772, mailed on Apr. 1, 2019, 4 pages.
Office Action received for Australian Patent Application No. 2018206772, mailed on Feb. 6, 2020, 4 pages.
Office Action received for Australian Patent Application No. 2018206772, mailed on Nov. 6, 2019, 4 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019100490, mailed on Jul. 26, 2019, 4 pages.
Office Action received for Australian Patent Application No. 2019266054, mailed on Aug. 23, 2021, 4 pages.
Office Action received for Australian Patent Application No. 2019266054, mailed on Jun. 29, 2021, 3 pages.
Office Action received for Australian Patent Application No. 2020204259, mailed on Nov. 30, 2020, 8 pages.
Action received for Australian Patent Application No. 2020204506, mailed on Dec. 7, 2020, 6 pages.
Action received for Australian Patent Application No. 2020210234, mailed on Jul. 30, 2021, 7 pages.
Office Action received for Australian Patent Application No. 2021203216, mailed on Mar. 7, 2022, 8 pages.
Office Action received for Australian Patent Application No. 2021203636, mailed on Mar. 23, 2022, 3 pages.
Office Action received for Australian Patent Application No. 2021218036, mailed on Apr. 13, 2023, 3 pages.
Office Action received for Australian Patent Application No. 2021218036, mailed on Jun. 21, 2022, 5 pages.
Office Action received for Australian Patent Application No. 2021218036, mailed on Nov. 16, 2022, 4 pages.
Office Action received for Australian Patent Application No. 2022200514, mailed on Feb. 15, 2023, 2 pages.
Office Action received for Australian Patent Application No. 2022200514, mailed on Jan. 17, 2023, 3 pages.
Office Action received for Australian Patent Application No. 2022203278, mailed on Aug. 12, 2023, 5 pages.
Office Action received for Australian Patent Application No. 2022203278, mailed on May 10, 2023, 4 pages.
Office Action received for Australian Patent Application No. 2022209277, mailed on Mar. 10, 2023, 6 pages.
Office Action received for Australian Patent Application No. 2022235634, mailed on May 25, 2023, 4 pages.

Office Action received for Australian Patent Application No. 2023214377, mailed on Mar. 27, 2024, 3 pages.
Office Action received for Chinese Patent Application No. 201510284850.3, mailed on Jul. 9, 2018, 11 pages (2 pages of English Translation and 9 pages of Official copy).
Office Action received for Chinese Patent Application No. 201510284850.3, mailed on Jun. 21, 2019, 10 pages(4 pages of English Translation and 6 pages of Official Copy).
Office Action received for Chinese Patent Application No. 201510284850.3, mailed on Nov. 28, 2017, 15 pages (5 pages of English Translation and 10 pages of Official Copy).
Office Action received for Chinese Patent Application No. 201580028677.9, mailed on May 25, 2018, 14 pages (4 pages of English Translation and 10 pages of Official copy).
Office Action received for Chinese Patent Application No. 201680008151.9, mailed on Apr. 20, 2020, 6 pages (3 pages of English Translation and 3 pages of Official Copy).
Office Action received for Chinese Patent Application No. 201680008151.9, mailed on Aug. 27, 2019, 24 pages (11 pages of English Translation and 13 pages of Official Copy).
Office Action received for Chinese Patent Application No. 201680013193.1, mailed on Feb. 1, 2021, 8 pages (3 pages of English Translation and 5 pages of Official Copy).
Office Action received for Chinese Patent Application No. 201680013193.1, mailed on Mar. 25, 2020, 21 pages (8 pages of English Translation and 13 pages of Official Copy).
Office Action received for Chinese Patent Application No. 201680013193.1, mailed on Sep. 7, 2020, 6 pages (3 pages of English Translation and 3 pages of Official Copy).
Office Action received for Chinese Patent Application No. 201710439448.7, mailed on Mar. 27, 2020, 13 pages (7 pages of English Translation and 6 pages of Official Copy).
Office Action received for Chinese Patent Application No. 201710439448.7, mailed on Oct. 10, 2020, 19 pages (8 pages of English Translation and 11 pages of Official Copy).
Office Action received for Chinese Patent Application No. 201780034193.4, mailed on Jun. 8, 2021, 16 pages (7 pages of English Translation and 9 pages of Official Copy).
Office Action received for Chinese Patent Application No. 201780034203.4, mailed on Jul. 14, 2021, 12 pages (5 pages of English Translation and 7 pages of Official Copy).
Office Action received for Chinese Patent Application No. 201780034203.4, mailed on Sep. 24, 2021, 7 pages (3 pages of English Translation and 4 pages of Official Copy).
Office Action received for Chinese Patent Application No. 201811136445.7, mailed on Apr. 14, 2021, 7 pages (4 pages of English Translation and 3 pages of Official Copy).
Office Action received for Chinese Patent Application No. 201811136445.7, mailed on Oct. 28, 2020, 17 pages (10 pages of English Translation and 7 pages of Official Copy).
Office Action received for Chinese Patent Application No. 202111576661.5, mailed on Dec. 1, 2023, 13 pages (6 pages of English Translation and 7 pages of Official Copy).
Office Action received for Danish Patent Application No. PA201770423, mailed on Jun. 12, 2018, 7 pages.
Office Action received for Danish Patent Application No. PA201770423, mailed on Mar. 29, 2019, 6 pages.
Office Action received for Danish Patent Application No. PA201870385, mailed on Aug. 23, 2019, 3 Pages.
Office Action received for European Patent Application No. 15730890.9, mailed on Aug. 3, 2017, 4 pages.
Office Action received for European Patent Application No. 16762356.0, mailed on Dec. 11, 2020, 7 pages.
Office Action received for European Patent Application No. 17810749.6, mailed on Aug. 20, 2019, 9 pages.
Office Action received for European Patent Application No. 17813824.4, mailed on Nov. 30, 2021, 8 pages.
Office Action received for European Patent Application No. 18213157.3. mailed on May 15, 2020, 7 pages.
Office Action received for European Patent Application No. 19163212.4, mailed on Oct. 12, 2020, 4 pages.
Office Action received for European Patent Application No. 19724963.4, mailed on Jul. 28, 2020, 6 pages.

(56) References Cited

OTHER PUBLICATIONS

Office Action received for European Patent Application No. 21165295.3, mailed on Jul. 1, 2021, 10 pages.
Office Action received for European Patent Application No. 22152524.9, mailed on Dec. 5, 2023, 8 pages.
Office Action received for Japanese Patent Application No. 2016-569945, mailed on Jul. 29, 2019, 6 pages (3 pages of English Translation and 3 pages of Official Copy).
Office Action received for Japanese Patent Application No. 2016-569945, mailed on Nov. 10, 2017, 8 pages (4 pages of English Translation and 4 pages of Official Copy).
Office Action received for Japanese Patent Application No. 2016-569945, mailed on Sep. 10, 2018, 11 pages (6 pages of English Translation and 5 pages of Official Copy).
Office Action received for Japanese Patent Application No. 2017-545918, mailed on Sep. 14, 2018, 12 pages (7 pages of English Translation and 5 pages of Official copy).
Office Action received for Japanese Patent Application No. 2019-151358, mailed on Oct. 2, 2020, 5 pages (2 pages of English Translation and 3 pages of Official Copy).
Office Action received for Japanese Patent Application No. 2020-010239, mailed on Jan. 4, 2021, 6 pages (3 pages of English Translation and 3 pages of Official Copy).
Office Action received for Japanese Patent Application No. 2021-023661, mailed on Feb. 25, 2022, 6 pages (3 pages of English Translation and 3 pages of Official Copy).
Office Action received for Japanese Patent Application No. 2021-023661, mailed on Oct. 3, 2022, 8 pages (4 pages of English Translation and 4 pages of Official Copy).
Office Action received for Japanese Patent Application No. 2021-163700, mailed on Oct. 7, 2022, 4 pages (2 pages of English Translation and 2 pages of Official Copy).
Office Action received for Korean Patent Application No. 10-2017-7024570, mailed on Jul. 10, 2019, 6 pages (3 pages of English Translation and 3 pages of Official Copy).
Office Action received for Korean Patent Application No. 10-2017-7024570, mailed on Sep. 28, 2018, 14 pages (6 pages of English Translation and 8 pages of Official copy).
Office Action received for Korean Patent Application No. 10-2019-7029673, mailed on Apr. 8, 2021, 7 pages (3 pages of English Translation and 4 pages of Official Copy).
Office Action received for Korean Patent Application No. 10-2019-7029673, mailed on Nov. 5, 2019, 10 pages (4 pages of English Translation and 6 pages of Official Copy).
Office Action received for Korean Patent Application No. 10-2019-7029673, mailed on Sep. 3, 2020, 9 pages (4 pages of English Translation and 5 pages of Official Copy).
Office Action received for Korean Patent Application No. 10-2021-7036016, mailed on Nov. 10, 2021, 13 pages (6 pages of English Translation and 7 pages of Official Copy).
Office Action received for Korean Patent Application No. 10-2022-7044515, mailed on Aug. 21, 2023, 11 pages (5 pages of English Translation and 6 pages of Official Copy).
Office Action received for Taiwanese Patent Application No. 104117509, issued on Aug. 22, 2016, 6 pages (3 pages of English Translation and 3 pages of Official Copy).
Office Action received for Taiwanese Patent Application No. 104132636, issued on Dec. 13, 2018, 26 pages (9 pages of English Translation and 17 pages of Official Copy).
Office Action received for Taiwanese Patent Application No. 104132636, issued on Mar. 23, 2017, 25 pages (10 pages of English Translation and 15 pages of Official copy).
Office Action received for Taiwanese Patent Application No. 104132636, issued on Oct. 31, 2017, 10 pages (4 pages of English Translation and 6 pages of Official Copy).
Partial Supplementary European Search Report received for European Patent Application No. 17810749.6, mailed on Apr. 25, 2019, 8 pages.

Phandroid, "How to record & stream using YouTube Gaming", Available online at: https://www.youtube.com/watch?v=8H5Q1L9M_ql, Jun. 1, 2016, 3 pages.
Prasad et al., "Understanding Sharing Preferences and Behavior for Mhealth Devices", Proceedings of the 2012 ACM workshop on Privacy in the electronic society, Available online at: https://dl.acm.org/doi/10.1145/2381966.2381983, Oct. 15, 2012, pp. 117-128.
Preliminary Opinion received for European Patent Application No. 15730890.9, mailed on Mar. 7, 2019, 4 pages.
Programmatically download APK from google play store, retrieved from the Internet: https://stackoverflow.com/questions/13703982/prog ram maticallydownload-apk-from-google-play-store/13704021#13704021, Dec. 10, 2012, 2 pages.
Puryear Blake, "A modular framework for home healthcare monitoring", Online available at: https://scholarworks.uark.edu/cgi/viewcontent.cgi?article=1009&context=csceuht, May 2012, 92 pages.
Razykdreviews, "In Depth Review of Apple Watch Activity and Workout App", available at <URL: https://www.youtube.com/watch?v=GkKI3qIK0ow>, Category: X Claims: 1-5 Category: L Reason: Internet citation/video, May 11, 2015, 1 page.
Record of Oral Hearing received for U.S. Appl. No. 16/145,033, mailed on Apr. 19, 2023, 16 pages.
Result of Consultation received for European Patent Application No. 16762356.0, mailed on Nov. 29, 2021, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 19724963.4, mailed on Jul. 8, 2021, 3 pages.
Result of Consultation received for European Patent Application No. 19724963.4, mailed on May 31, 2021, 3 pages.
Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Sansford Steve, "Streaming Android Games with OBS On Linux", Available online at: https://www.youtube.com/watch?v=twyh32Ud8vQ, May 20, 2016, 3 pages.
Search Report and Opinion received for Danish Patent Application No. PA201770423, mailed on Oct. 4, 2017., 10 pages.
Search Report and Opinion received for Danish Patent Application No. PA201870385, mailed on Nov. 16, 2018, 10 Pages.
Summons to Attend Oral Proceedings received for European Patent Application No. 15730890.9, mailed on Sep. 10, 2018, 11 pages.
Summons to Attend Oral Proceedings received for European Patent Application No. 16762356.0, mailed on May 10, 2021, 10 pages.
Summons to Attend Oral Proceedings received for European Patent Application No. 17810749.6, mailed on Aug. 12, 2020, 11 pages.
Summons to Attend Oral Proceedings received for European Patent Application No. 19163212.4, mailed on Dec. 15, 2021, 9 pages.
Summons to Attend Oral Proceedings received for European Patent Application No. 19724963.4, mailed on Dec. 23, 2020, 8 pages.
Summons to Attend Oral Proceedings received for European Patent Application No. 21165295.3, mailed on Jul. 25, 2023, 14 pages.
Supplemental Notice of Allowance received for U.S. Appl. No. 14/863,069 , mailed on Aug. 15, 2019, 3 pages.
Supplemental Notice of Allowance received for U.S. Appl. No. 14/863,069 , mailed on Mar. 29, 2019, 3 pages.
Supplemental Notice of Allowance received for U.S. Appl. No. 14/863,069, mailed on Mar. 1, 2019, 3 pages.
Supplemental Notice of Allowance received for U.S. Appl. No. 15/616,480, mailed on Mar. 28, 2019, 2 pages.
Supplemental Notice of Allowance received for U.S. Appl. No. 17/951,875, mailed on Aug. 25, 2023, 2 pages.
Supplementary European Search Report received for European Patent Application No. 17810749.6, mailed on Aug. 6, 2019, 6 pages.

(56) References Cited

OTHER PUBLICATIONS

Tweedie Steven, "Create and Customize Your Own Emojis with 'Makemoji' for iPhone", Available online at: http://www.businessinsider. com/create-custom-emojis-with-makemoji-app-2014-8, Aug. 19, 2014, 6 pages.

Whitwam Ryan, "Facer is Fast Becoming the De Facto Custom Watch Face Maker for Android Wear", Available online at: http:// www.androidpolice.com/2014/09/19/facer-is-fast-becoming-the-de- facto-custom-watch-face-maker-for-android-wear, Sep. 19, 2014, 11 pages.

Wikipedia, "Emoji", Available online at: https://en.wikipedia.org/ w/index.php?title=Emoji&oldid=648831795, Feb. 25, 2015, 12 pages.

Wikipedia, "Emoticon", Available online at: https://en.wikipedia. org/w/index.php?title=Emoticon&oldid=648776142, Feb. 25, 2015, 9 pages.

Wikipedia, "Enhanced Multi-Level Precedence And Pre-emption Service", Available online at: https://de.wikipedia.org/w/index.php?% 20title=Enhanced%20Multi%E3%83%BCLevel_Precedence_And_ Pre-emption_Service&oldid=123047429, Oct. 2013, 2 pages. (Offi- cial copy only) (See Communication Under Rule 37 CFR § 1.98(a) (3)}.

Willem Jonker. "Secure Data Management", Online available at: http://ndl.ethernet.edu.et/bitstream/123456789/21649/1/291.pdf, Sep. 17, 2010, 177 pages.

Written Opinion Issued from International Preliminary Examining Authority for PCT Application No. PCT/US2016/016216, mailed on Feb. 20, 2017., 12 pages.

Xiaoli Wan, "Research on sharing and collaboration technology for P2P instant messaging", Wan Fang's dissertation, August 11, 2008, 64 pages (Official Copy Only) (See Communication Under Rule 37 CFR § 1.98(a) (3)}.

Xzulas,"PS4 to Twitch—How To Broadcast Gameplay—Camera and Audio Settings", Available online at: https://www.youtube.com/ watch?v=TyTR64RF0wl, Nov. 3, 2014, 4 pages.

Yang Yang, "Design and implementation of P2P-based video live broadcast function on OS system", CNKI Excellent Master's Thesis Full Text Database, Apr. 15, 2015, 64 pages (Official Copy Only) {See Communication Under Rule 37 CFR § 1.98(a) (3)}.

Applicant-Initiated Interview Summary received for U.S. Appl. No. 18/583,787, mailed on Jul. 18, 2025, 2 pages.

Summons to Oral Proceedings received for European Patent Appli- cation No. 21165295.3, mailed on Jul. 21, 2025, 11 pages.

Applicant-Initiated Interview Summary received for U.S. Appl. No. 18/088,309, mailed on Aug. 27, 2024, 2 pages.

Applicant-Initiated Interview Summary received for U.S. Appl. No. 18/088,309, mailed on Jun. 7, 2024, 2 pages.

Corrected Notice of Allowance received for U.S. Appl. No. 17/068,386, mailed on May 20, 2024, 2 pages.

Corrected Notice of Allowance received for U.S. Appl. No. 17/951,624, mailed on Oct. 3, 2024, 2 pages.

Decision on Appeal received for U.S. Appl. No. 14/599,424, mailed on Apr. 3, 2024, 34 pages.

Decision to Grant received for European Patent Application No. 17813824.4, mailed on Jun. 13, 2024, 2 pages.

Decision to Grant received for European Patent Application No. 22150207.3, mailed on Jul. 11, 2024, 2 pages.

Decision to Refuse received for European Patent Application No. 21165295.3, mailed on Apr. 29, 2024, 14 pages.

Extended European Search Report received for European Patent Application No. 24179066.6, mailed on Aug. 8, 2024, 10 pages.

Final Office Action received for U.S. Appl. No. 18/088,309, mailed on Aug. 1, 2024, 16 pages.

Immersed, "Immersed on the Quest Pro in AR & VR", XP093203344, Available online at: https://www.youtube.com/watch?v= iWSDNIDtsHE, Oct. 25, 2022, 4 pages.

Invitation to Pay Additional Fees and Partial International Search Report received for PCT Patent Application No. PCT/US2024/ 028414, mailed on Sep. 20, 2024, 12 pages.

Lu et al., "E-health Web Application Framework and Platform Based On The Cloud Technology", Available online at: https://www. diva- portal.org/smash/get/diva2:647835/FULLTEXT01.pdf, 2013, 64 pages.

Minutes of Oral Proceedings received for European Patent Appli- cation No. 21165295.3. mailed on Apr. 26, 2024, 6 pages.

Notice of Allowance received for Chinese Patent Application No. 202111244490.6, mailed on Sep. 23, 2024, 2 pages (1 page of English Translation and 1 page of Official Copy).

Notice of Allowance received for Chinese Patent Application No. 202111576661.5, mailed on Mar. 28, 2024, 4 pages (1 page of English Translation and 3 pages of Official Copy).

Notice of Allowance received for Chinese Patent Application No. 202210312775.7, mailed on Sep. 23, 2024, 5 pages (1 page of English Translation and 4 pages of Official Copy).

Notice of Allowance received for Chinese Patent Application No. 202210326960.1, mailed on Jun. 21, 2024, 5 pages (1 page of English Translation and 4 pages of Official Copy).

Notice of Allowance received for U.S. Appl. No. 17/068,386, mailed on Apr. 29, 2024, 13 pages.

Notice of Allowance received for U.S. Appl. No. 17/951,624, mailed on Sep. 20, 2024, 9 pages.

Office Action received for Australian Patent Application No. 2023210654, mailed on Jun. 13, 2024, 6 pages.

Office Action received for Australian Patent Application No. 2023210654, mailed on Sep. 4, 2024, 3 pages.

Office Action received for Australian Patent Application No. 2023214377, mailed on Jun. 5, 2024, 4 pages.

Office Action received for Australian Patent Application No. 2023214377, mailed on Sep. 25, 2024, 4 pages.

Office Action received for Chinese Patent Application No. 202110831819.2, mailed on Apr. 16, 2024, 6 pages (3 pages of English Translation and 3 pages of Official Copy).

Office Action received for Chinese Patent Application No. 202110831819.2, mailed on Aug. 17, 2024, 11 pages (5 pages of English Translation and 6 pages of Official Copy).

Office Action received for Chinese Patent Application No. 202111244490.6, mailed on Apr. 3, 2024, 20 pages (11 pages of English Translation and 9 pages of Official Copy).

Office Action received for Chinese Patent Application No. 202210312775.7, mailed on Jun. 19, 2024, 13 pages (6 pages of English Translation and 7 pages of Official Copy).

Office Action received for Chinese Patent Application No. 202210618961.3, mailed on Jun. 21, 2024, 20 pages (7 pages of English Translation and 13 pages of Official Copy).

Office Action received for European Patent Application No. 22152524. 9, mailed on Jun. 25, 2024, 7 pages.

Office Action received for European Patent Application No. 22170561. 9, mailed on May 23, 2024, 8 pages.

Office Action received for European Patent Application No. 22731852. 4, mailed on Jun. 26, 2024, 7 pages.

Office Action received for Japanese Patent Application No. 2023- 077331, mailed on May 31, 2024, 4 pages (2 pages of English Translation and 2 pages of Official Copy).

Park et al., "The UCONABC Usage Control Model", ACM Trans- actions on Information and System Security (TISSEC, vol. 7, No. 1), Available online at: https://citeseerx.ist.psu.edu/document?repid= rep1&type=pdf&doi= 15a34e494fcfb656c2bcb3897b65b30f00f9fcd1, Feb. 2004, pp. 128- 174.

Result of Consultation received for European Patent Application No. 21165295.3, mailed on Apr. 18, 2024, 3 pages.

Decision to Grant received for European Patent Application No. 22731852.4, mailed on Apr. 17, 2025, 3 pages.

Applicant-Initiated Interview Summary received for U.S. Appl. No. 18/583,787, mailed on May 28, 2025, 2 pages.

Applicant-Initiated Interview Summary received for U.S. Appl. No. 18/367,934, mailed on May 29, 2025, 4 pages.

Extended European Search Report received for European Patent Application No. 25164739.2, mailed on Jun. 2, 2025, 8 pages.

Notice of Acceptance received for Australian Patent Application No. 2023208169, mailed on May 22, 2025, 3 pages.

(56) References Cited

OTHER PUBLICATIONS

Anonymous, "Application Development Discussions", Available online at: https://community.sap.com/t5/application-development-discussions/skip-selection-screen/m-p/2769825, Sep. 10, 2007, 10 pages.

Blackburn Ian, "How Using Custom Workouts on Apple Watch will make you a better Athlete (and everything you need to know about creating them)—The Apple Watch Triathlete", Available online at: https://theapplewatchtriathlete.com/blog-1/2022/8/23/how-using-custom-workouts-on-apple-watch-will-make-you-a-better-athlete-and-everything-you-need-to-know-about-creating-them, Aug. 23, 2022, pp. 1-51.

Corrected Notice of Allowance received for U.S. Appl. No. 18/589,265, mailed on Feb. 26, 2025, 2 pages.

Decision on Appeal received for U.S. Appl. No. 16/389,722, mailed on Mar. 4, 2025, 18 pages.

Extended European Search Report received for European Patent Application No. 24186217.6, mailed on Oct. 31, 2024, 11 pages.

GREGGLESTV, "Google Photos How To Share Albums With Android and iOS Users", Online Available at: https://www.youtube.com/watch?v=vty3c3DgDnl, Dec. 18, 2015, 3 pages.

Intention to Grant received for European Patent Application No. 22731852.4, mailed on Dec. 17, 2024, 9 pages.

International Search Report and Written Opinion received for PCT Patent Application No. PCT/US2024/028414, mailed on Nov. 11, 2024, 20 pages.

International Search Report and Written Opinion received for PCT Patent Application No. PCT/US2024/031346, mailed on Dec. 6, 2024, 17 pages.

Invitation to Pay Additional Fees and Partial International Search Report received for PCT Patent Application No. PCT/US2024/031346, mailed on Oct. 14, 2024, 9 pages.

Lafayette Pierre-Antoine, "The 'icon' URI scheme", draft-lafayette-icon-uri-scheme-01, Online available at: https://www.jeff.org/archive/id/draft-lafayette-icon-uri-scheme-01.html, 2010. 7 pages.

LIMEGAMINGTV, "How To Upload Ps4 Share Clips To Youtube!", Available online at: https://www.youtube.com/watch?v=ZAYFajRWIMA, Oct. 30, 2014, 3 pages.

Malatesta Francesco, "How to Implement User Log-in with PayPal", Available online at: https://www.sitepoint.com/implement-user-log-paypal/, Dec. 23, 2014, 16 pages.

Nikoletseas et al., "Decentralizing and Adding Portability to an IoT Test-bed through Smartphones", IEEE International Conference on Distributed Computing in Sensor Systems, Online available at: https://ieeexplore.ieee.org/stamp/stamp.jsp?tp=&arnumber=6846177, 2014, pp. 281-286.

Non-Final Office Action received for U.S. Appl. No. 18/367.934, mailed on Feb. 27, 2025, 12 pages.

Non-Final Office Action received for U.S. Appl. No. 18/583,787, mailed on Mar. 5, 2025, 16 pages.

Notice of Allowance received for Chinese Patent Application No. 202110831819.2, mailed on Oct. 28, 2024, 4 pages (1 page of English Translation and 3 pages of Official Copy).

Notice of Allowance received for Chinese Patent Application No. 202210312598.2, mailed on Nov. 6, 2024, 4 pages (1 page of English Translation and 3 pages of Official Copy).

Notice of Allowance received for Chinese Patent Application No. 202210618961.3, mailed on Oct. 30, 2024, 5 pages (1 page of English Translation and 4 pages of Official Copy).

Notice of Allowance received for Chinese Patent Application No. 202311811912.2, mailed on Dec. 1, 2024, 5 pages (1 page of English Translation and 4 pages of Official Copy).

Notice of Allowance received for Japanese Patent Application No. 2023-077331, mailed on Nov. 29, 2024, 4 pages (1 page of English Translation and 3 pages of Official Copy).

Notice of Allowance received for U.S. Appl. No. 17/951,624, mailed on Jan. 15, 2025, 5 pages.

Notice of Allowance received for U.S. Appl. No. 18/589,265, mailed on Dec. 6, 2024, 9 pages.

Notice of Allowance received for U.S. Appl. No. 18/589,265, mailed on Feb. 18, 2025, 10 pages.

Office Action received for Australian Patent Application No. 2023208169, mailed on Dec. 5, 2024, 3 pages.

Office Action received for Australian Patent Application No. 2023208169, mailed on Oct. 2, 2024, 3 pages.

Office Action received for Australian Patent Application No. 2023210654, mailed on Nov. 26, 2024, 4 pages.

Office Action received for Australian Patent Application No. 2023214377, mailed on Jan. 17, 2025, 3 pages.

Office Action received for Australian Patent Application No. 2024200956, mailed on Jan. 10, 2025, 6 pages.

Applicant-Initiated Interview Summary received for U.S. Appl. No. 18/367,934, mailed on Nov. 20, 2025, 4 pages.

Non-Final Office Action received for U.S. Appl. No. 18/583,787, mailed on Nov. 5, 2025, 17 pages.

Office Action received for Chinese Patent Application No. 202210312598.2, mailed on Jun. 27, 2024, 22 pages (7 pages of English Translation and 15 pages of Official Copy).

Office Action received for European Patent Application No. 23216484.8, mailed on Mar. 13, 2025, 7 pages.

Playstation Europe, "How to stream your gameplay | Inside PS4 | #4ThePlayers", Available online at: https://www.youtube.com/watch?v=eaQzxZa_BVE, Sep. 10, 2014, 3 pages.

Record of Oral Hearing received for U.S. Appl. No. 16/389,722, mailed on Feb. 26, 2025, 15 pages.

Supplemental Notice of Allowance received for U.S. Appl. No. 18/589,265, mailed on Dec. 18, 2024, 2 pages.

* cited by examiner

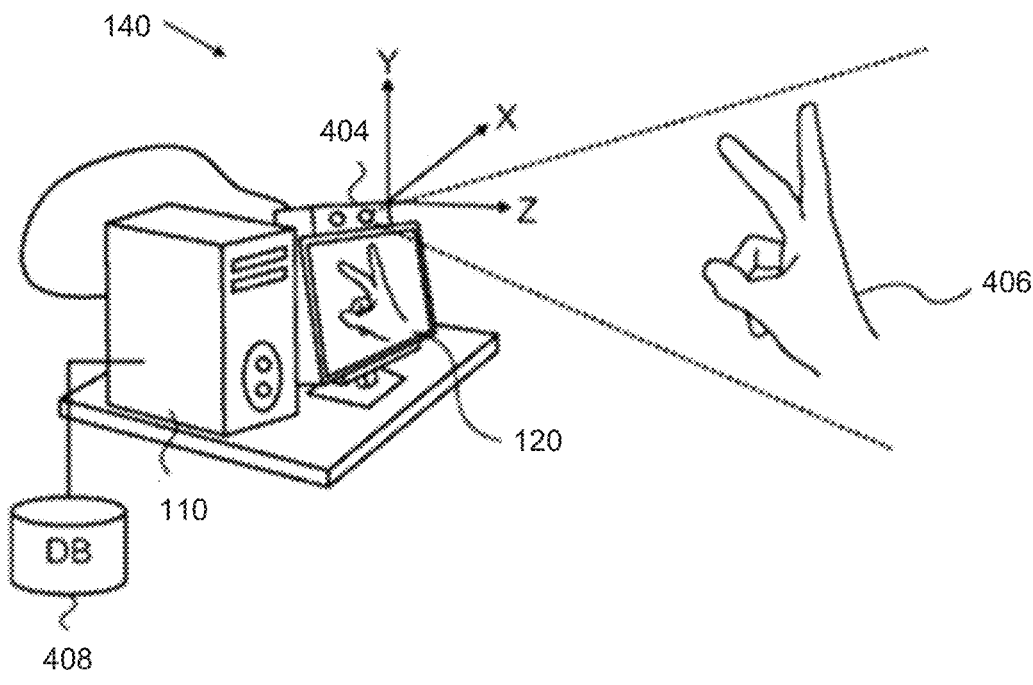
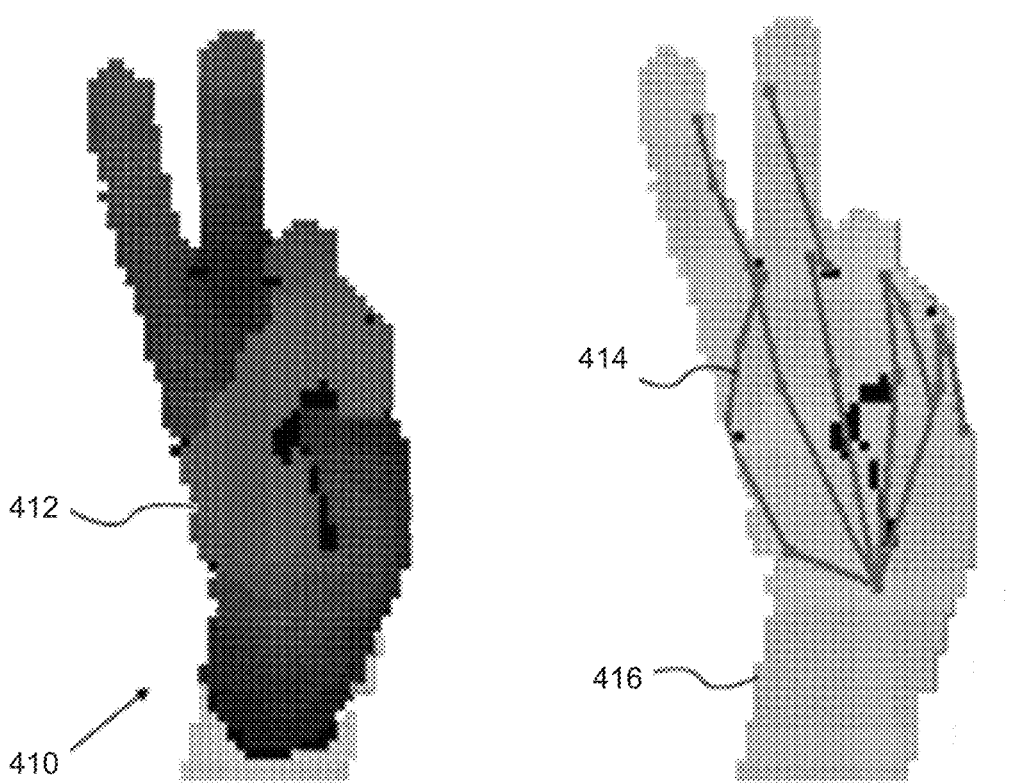
*FIG. 4*

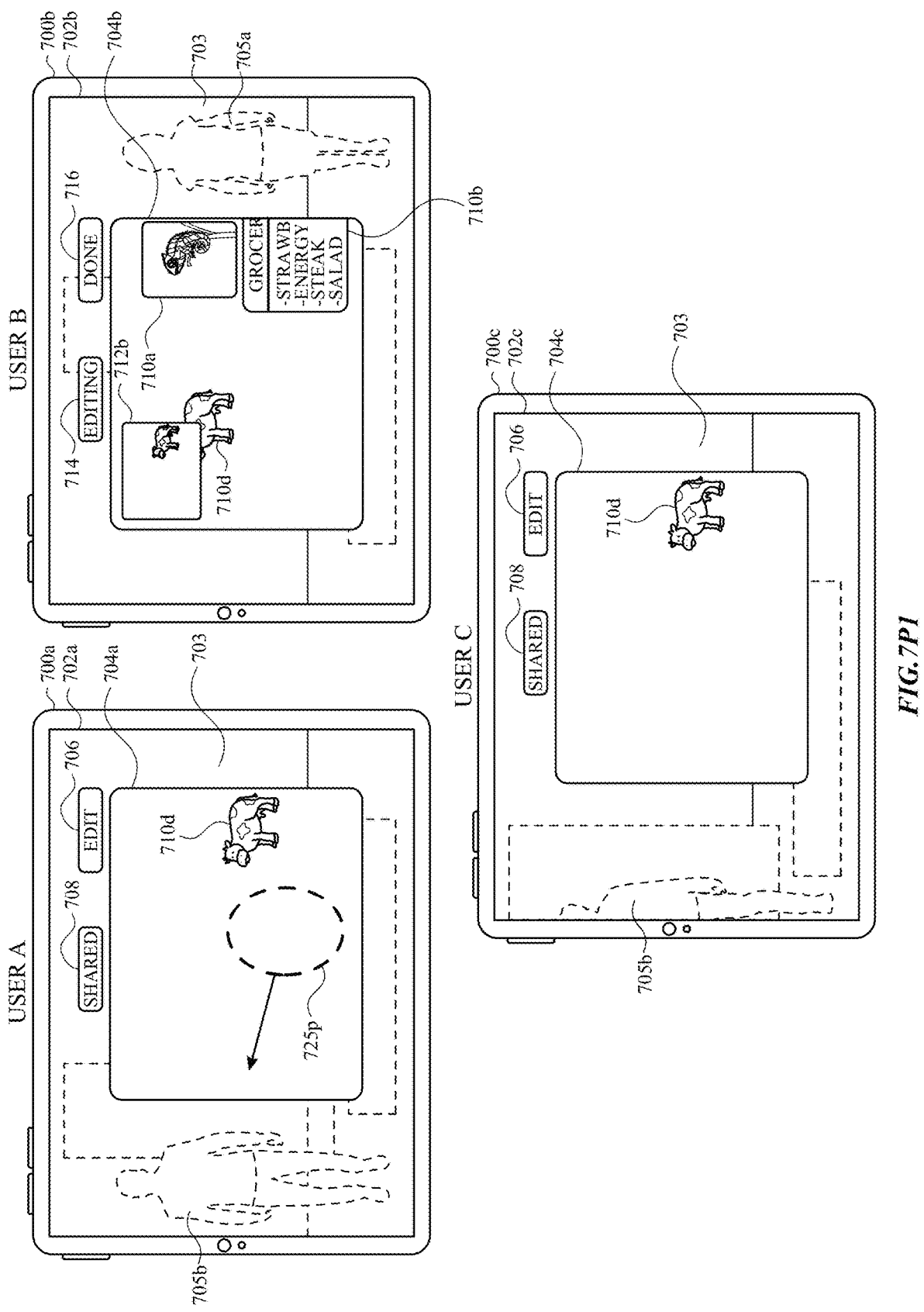
*FIG.7P1*

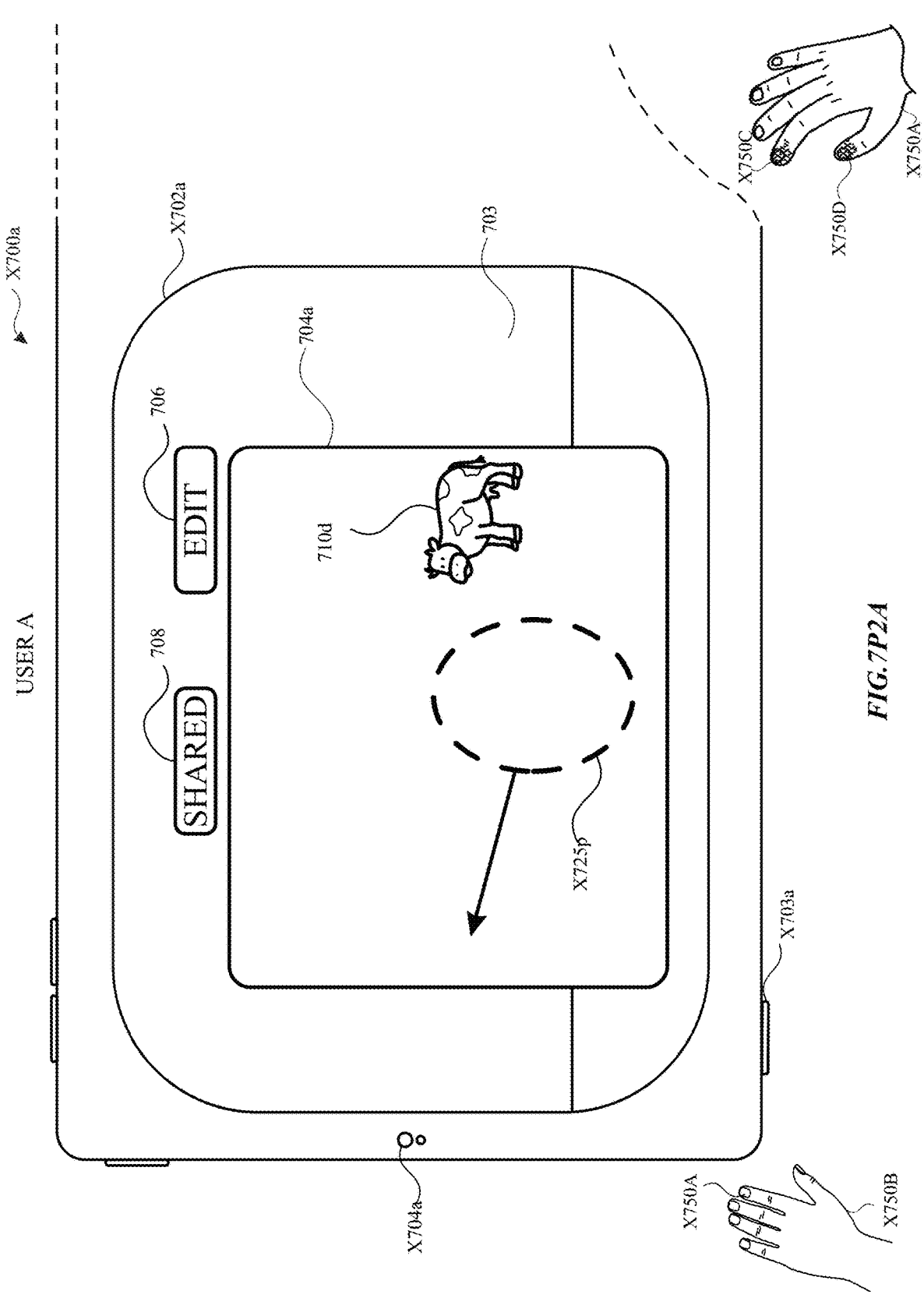
FIG.7P2A

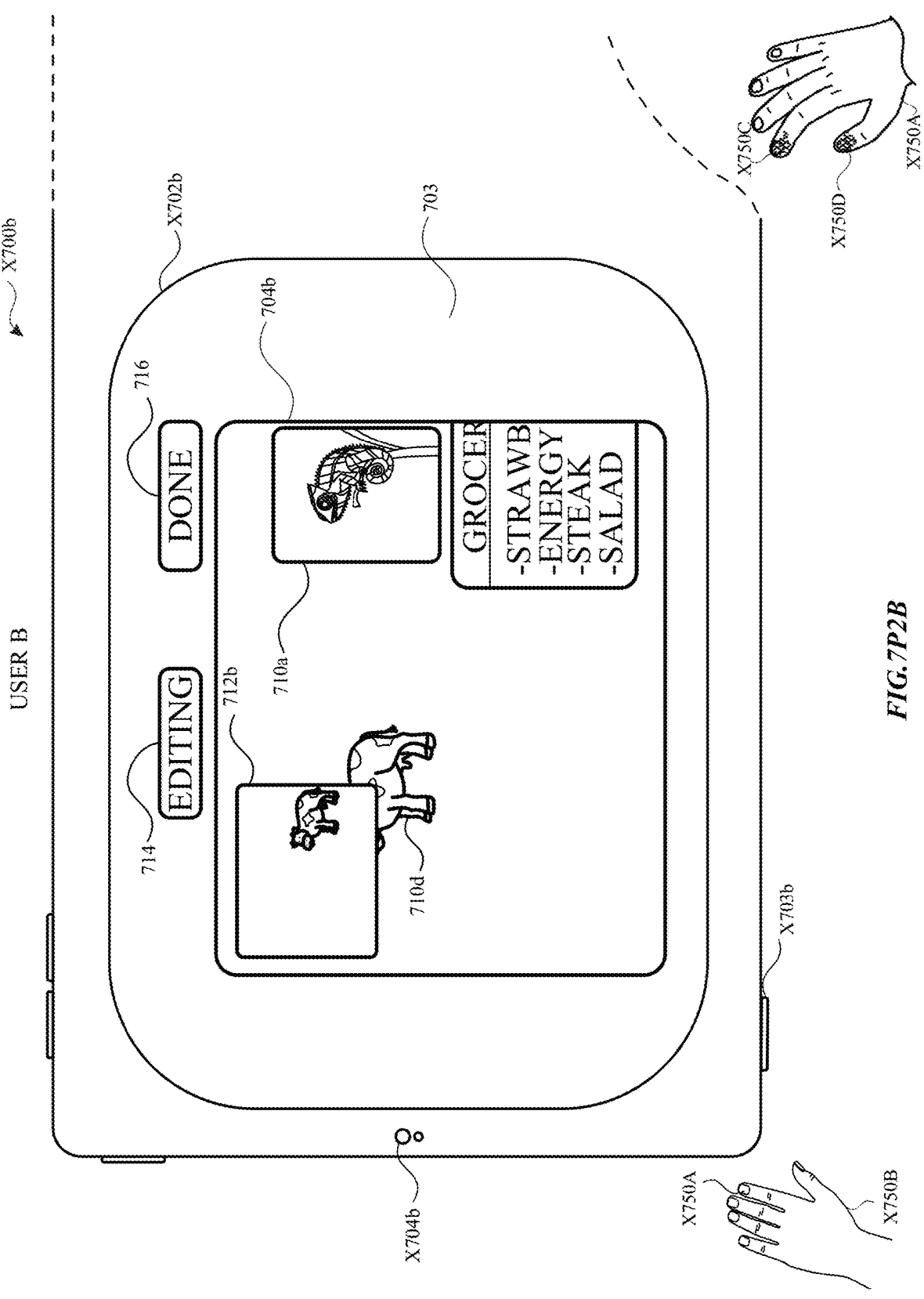
*FIG.7P2B*

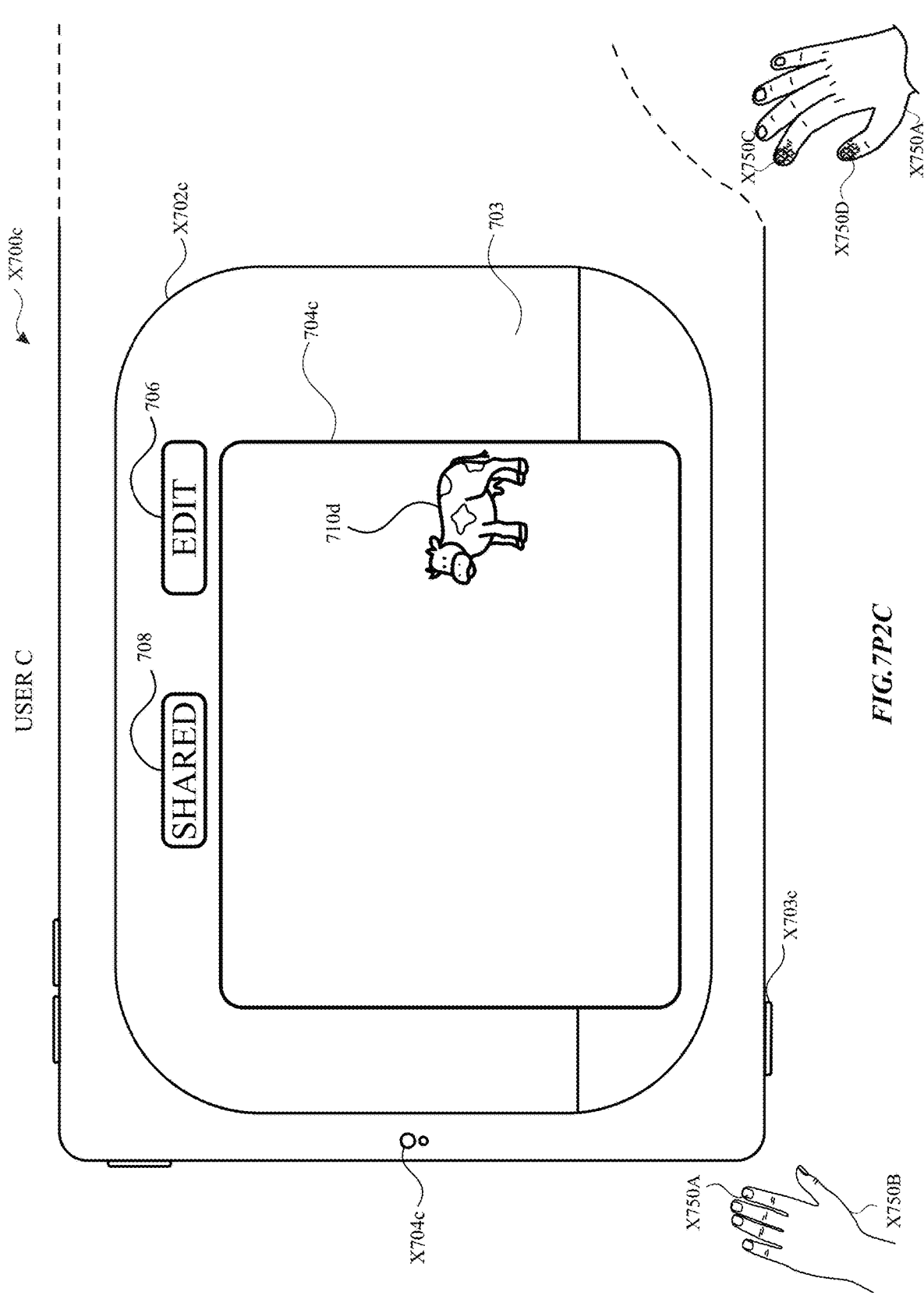
FIG.7P2C

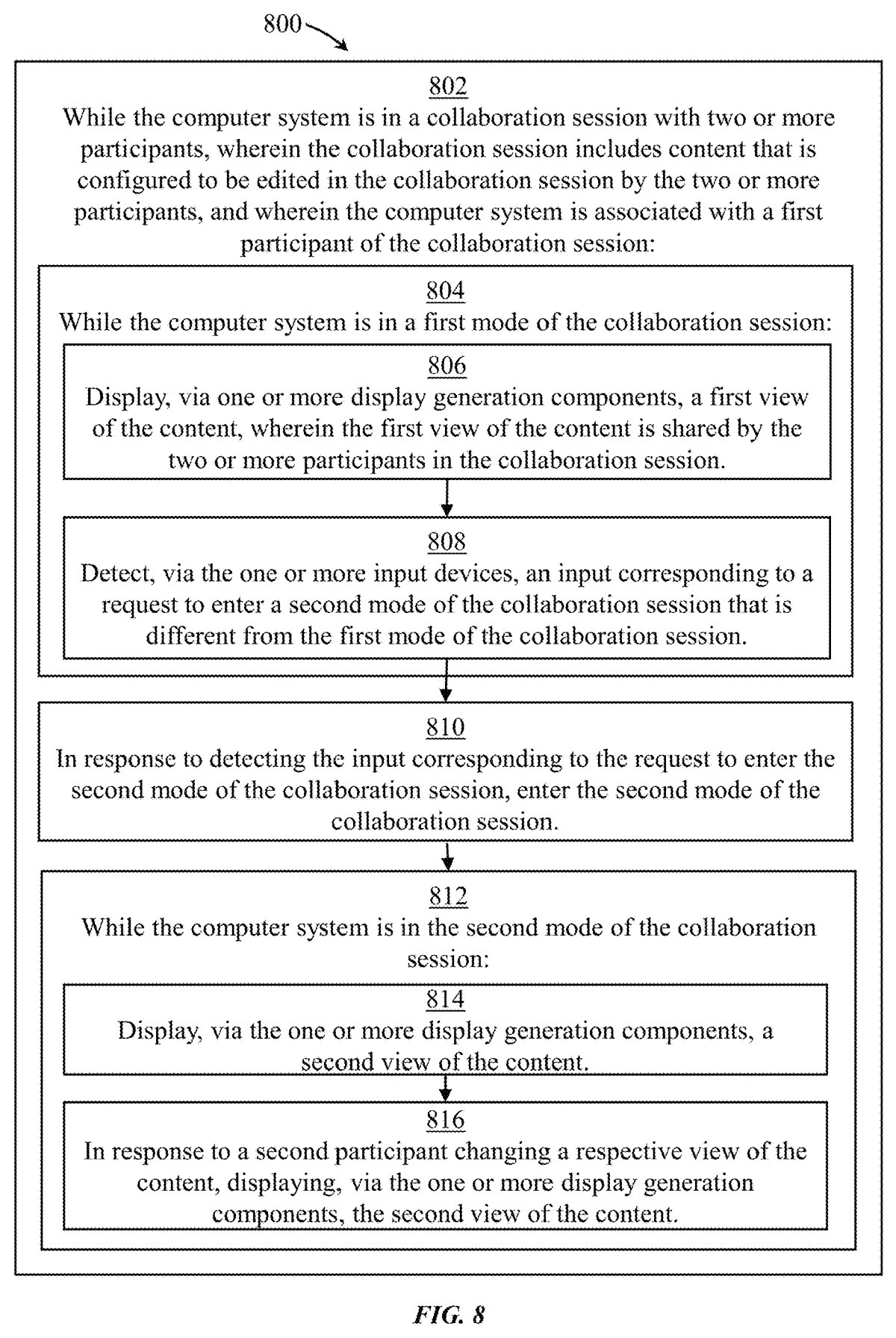

800

802
While the computer system is in a collaboration session with two or more participants, wherein the collaboration session includes content that is configured to be edited in the collaboration session by the two or more participants, and wherein the computer system is associated with a first participant of the collaboration session:

804
While the computer system is in a first mode of the collaboration session:

806
Display, via one or more display generation components, a first view of the content, wherein the first view of the content is shared by the two or more participants in the collaboration session.

808
Detect, via the one or more input devices, an input corresponding to a request to enter a second mode of the collaboration session that is different from the first mode of the collaboration session.

810
In response to detecting the input corresponding to the request to enter the second mode of the collaboration session, enter the second mode of the collaboration session.

812
While the computer system is in the second mode of the collaboration session:

814
Display, via the one or more display generation components, a second view of the content.

816
In response to a second participant changing a respective view of the content, displaying, via the one or more display generation components, the second view of the content.

*FIG. 8*

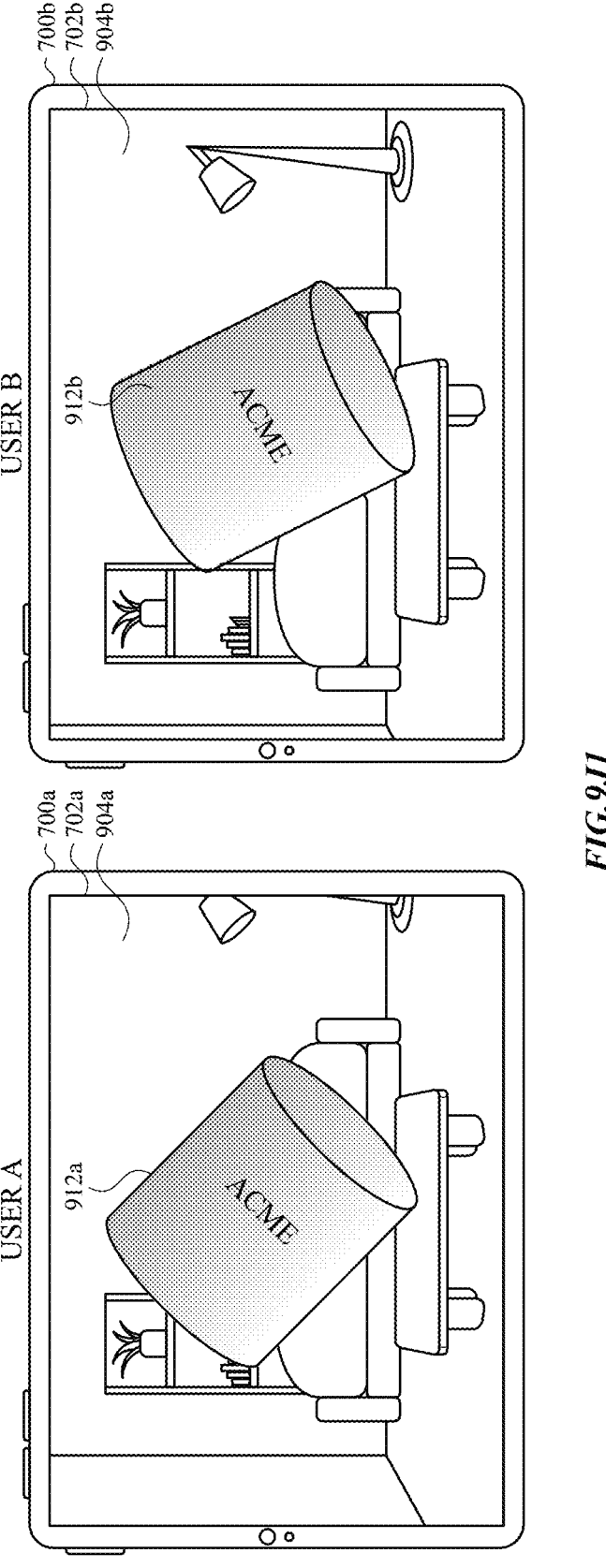
*FIG.9J1*

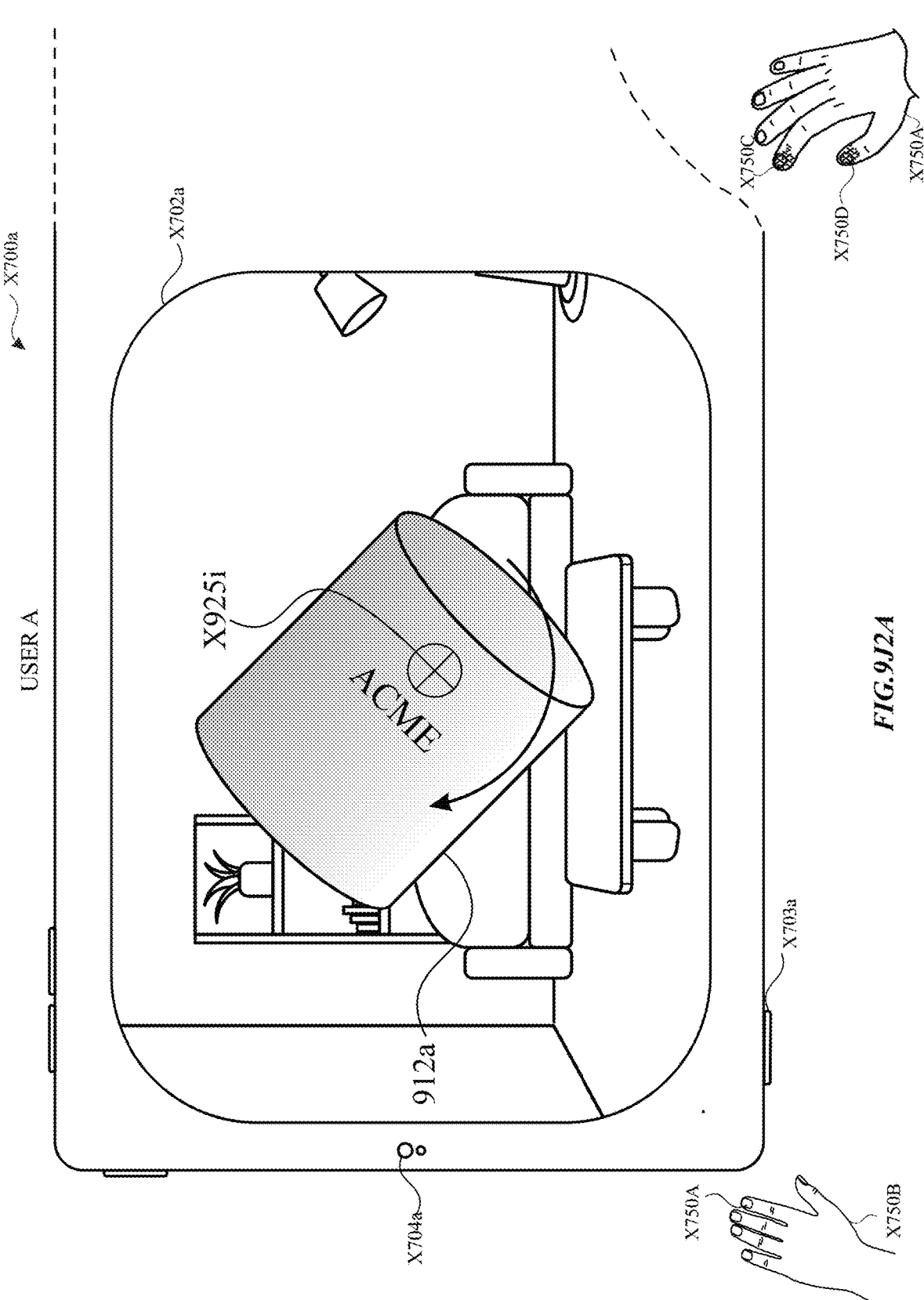
FIG.9J2A

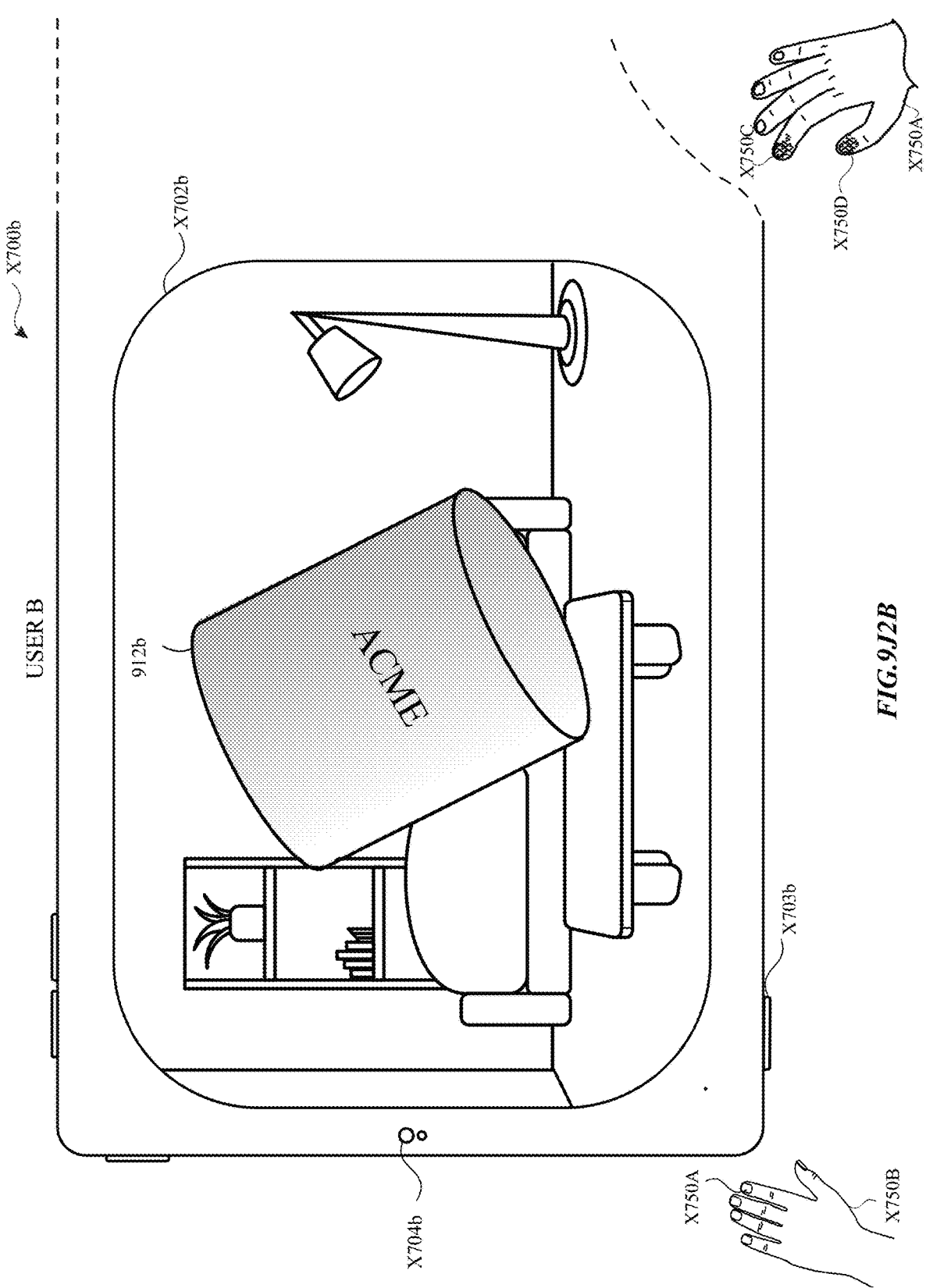
FIG.9J2B

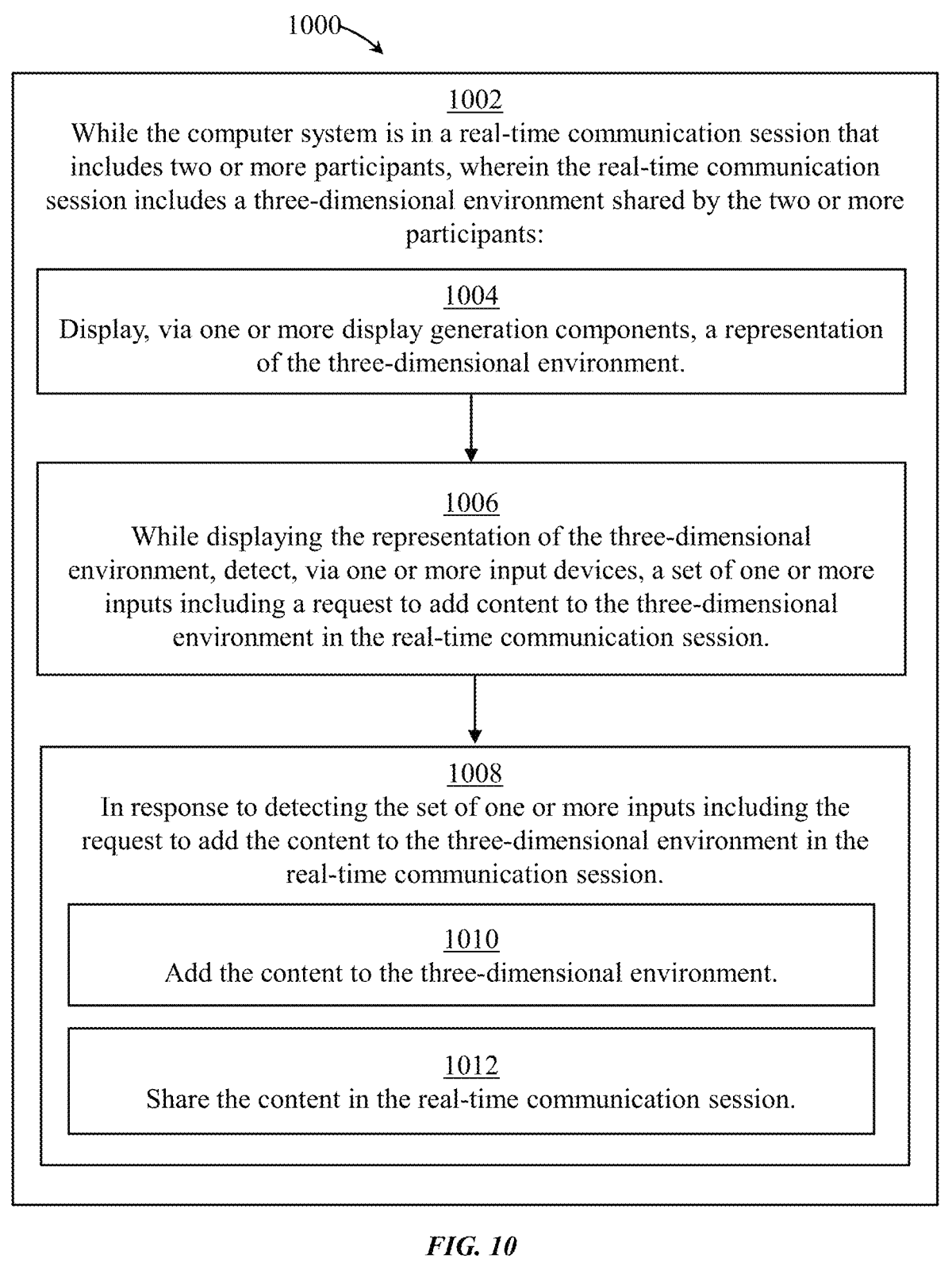

1000

1002
While the computer system is in a real-time communication session that includes two or more participants, wherein the real-time communication session includes a three-dimensional environment shared by the two or more participants:

1004
Display, via one or more display generation components, a representation of the three-dimensional environment.

1006
While displaying the representation of the three-dimensional environment, detect, via one or more input devices, a set of one or more inputs including a request to add content to the three-dimensional environment in the real-time communication session.

1008
In response to detecting the set of one or more inputs including the request to add the content to the three-dimensional environment in the real-time communication session.

1010
Add the content to the three-dimensional environment.

1012
Share the content in the real-time communication session.

*FIG. 10*

DEVICES, METHODS, AND GRAPHICAL USER INTERFACES FOR CONTENT COLLABORATION AND SHARING

CROSS-REFERENCE TO RELATED APPLICATIONS

This application claims priority to U.S. Provisional Patent Application No. 63/470,821, entitled "DEVICES, METHODS, AND GRAPHICAL USER INTERFACES FOR CONTENT COLLABORATION AND SHARING," filed on Jun. 2, 2023, and U.S. Provisional Patent Application No. 63/470,895, entitled "DEVICES, METHODS, AND GRAPHICAL USER INTERFACES FOR CONTENT COLLABORATION AND SHARING," filed on Jun. 3, 2023, the contents of each of which is hereby incorporated by reference in its entirety.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touchscreen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for collaborating on content in environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for collaborating on content that make interaction with the computer systems more efficient and intuitive for a user. Such methods and interfaces optionally complement or replace conventional methods for collaborating on content. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for collaborating on content. Such methods and interfaces may complement or replace conventional methods for collaborating on content. Such methods and interfaces reduce conflicting inputs and the number, extent, and/or the nature of the inputs from a user, enable real-time collaboration and sharing, and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components and one or more input devices: while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices. The one or more programs include instructions for: while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a transitory computer-readable storage medium is described. The transitory computer-readable storage medium stores one or more programs configured to be executed by one or more processors of a computer system that is in communication with one or more display generation components and one or more input devices. The one or more programs include instructions for: while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a computer system configured to communicate with one or more display generation components and one or more input devices is described. The computer system comprises: one or more processors; and memory storing one or more programs configured to be executed by the one or more processors. The one or more programs include instructions for: while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a computer system configured to communicate with one or more display generation components and one or more input devices is described. The computer system comprises: means for, while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a computer program product is described. The computer program product comprises one or more programs configured to be executed by one or more processors of a computer system that is in communication with one or more display generation components and one or more input devices. The one or more programs include instructions for: while the computer system is in a collaboration session with two or more participants, wherein the collaboration session includes content that is configured to be edited in the collaboration session by the two or more participants, and wherein the computer system is associated with a first participant of the collaboration session: while the computer system is in a first mode of the collaboration session: displaying, via the one or more display generation components, a first view of the content, wherein the first view of the content is shared by the two or more participants in the collaboration session; and detecting, via the one or more input devices, an input corresponding to a request to enter a second mode of the collaboration session that is different from the first mode of the collaboration session; in response to detecting the input corresponding to the request to enter the second mode of the collaboration session, entering the second mode of the collaboration session; and while the computer system is in the second mode of the collaboration session: displaying, via the one or more display generation components, a second view of the content; and in response to a second participant changing a respective view of the content, displaying, via the one or more display generation components, the second view of the content.

In accordance with some embodiments, a method is described. The method comprises: at a computer system that is in communication with one or more display generation components and one or more input devices: while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices. The one or more programs include instructions for: while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

In accordance with some embodiments, a transitory computer-readable storage medium is described. The transitory computer-readable storage medium stores one or more programs configured to be executed by one or more processors of a computer system that is in communication with one or more display generation components and one or more input devices. The one or more programs include instructions for: while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

In accordance with some embodiments, a computer system configured to communicate with one or more display generation components and one or more input devices is described. The computer system comprises: one or more processors; and memory storing one or more programs configured to be executed by the one or more processors. The one or more programs include instructions for: while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

In accordance with some embodiments, a computer system configured to communicate with one or more display generation components and one or more input devices is described. The computer system comprises: means for, while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

In accordance with some embodiments, a computer program product is described. The computer program product comprises one or more programs configured to be executed by one or more processors of a computer system that is in communication with one or more display generation components and one or more input devices. The one or more programs include instructions for: while the computer system is in a real-time communication session that includes two or more participants, wherein the real-time communication session includes a three-dimensional environment shared by the two or more participants: displaying, via the one or more display generation components, a representation of the three-dimensional environment; while displaying the representation of the three-dimensional environment, detecting, via the one or more input devices, a set of one or more inputs including a request to add content to the three-dimensional environment in the real-time communication session; and in response to detecting the set of one or more inputs including the request to add the content to the three-dimensional environment in the real-time communication session, adding the content to the three-dimensional environment and sharing the content in the real-time communication session.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of methods of collaborating on content, in accordance with some embodiments.

FIGS. 9A-9K illustrate example techniques for displaying content in a shared computer-generated environment, in accordance with some embodiments.

FIG. 10 is a flow diagram of methods of displaying content in a shared computer-generated environment, in accordance with some embodiments.

DESCRIPTION OF EMBODIMENTS

Figure 1A:
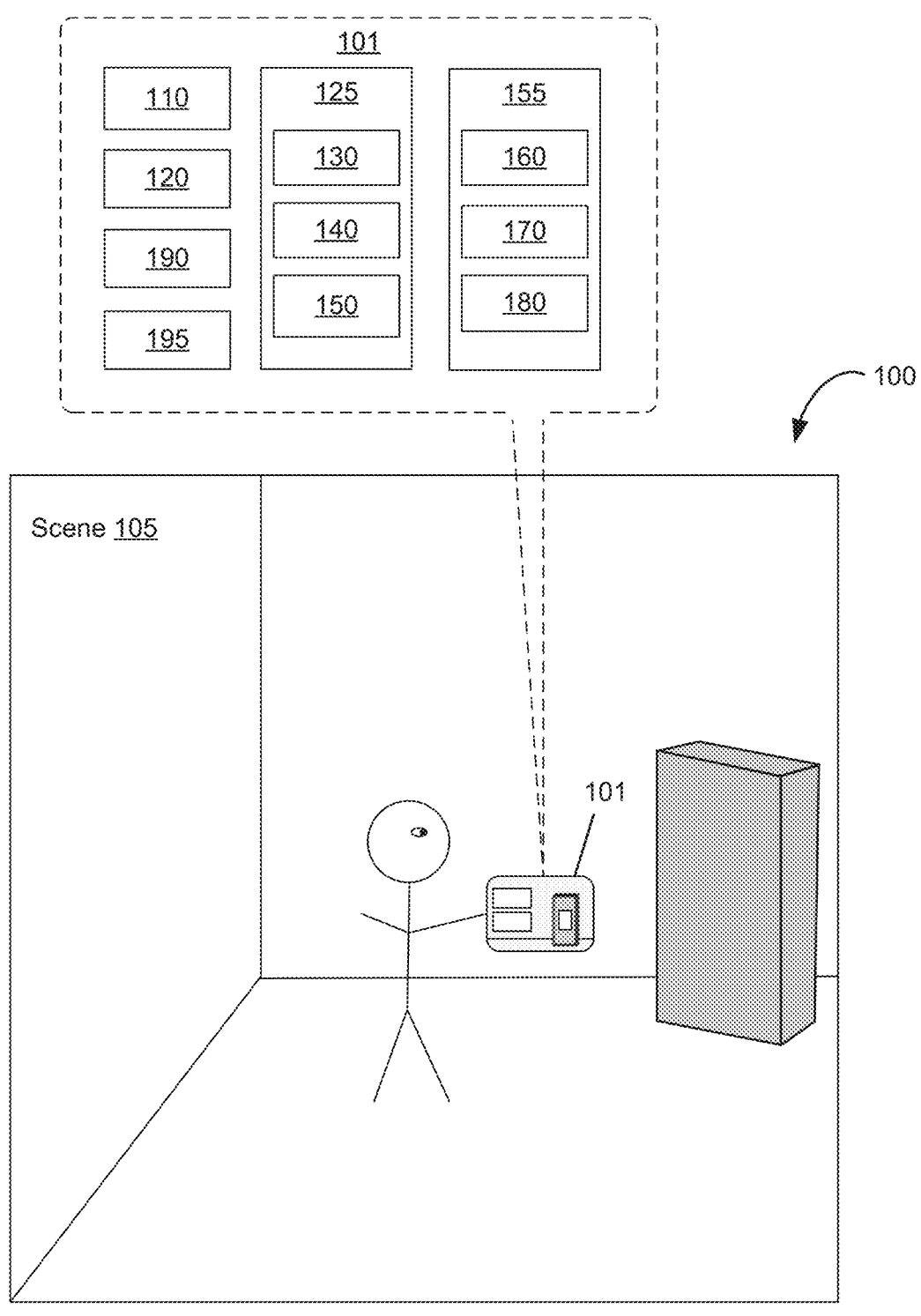
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system provides a synchronized view of content in a collaboration session when the computer system is in a first mode and provides an unsynchronized view of the content when the computer system is in a second mode. Providing different views of the content in different modes enables a user to have a local view of the content that is not affected by other users when the user is editing the content. This helps avoid interruptions while editing and makes editing shared content more efficient. In some embodiments, a computer system adds content to a three-dimensional environment shared by two or more participants. Adding the content to the three-dimensional environment enables the content to be manipulated by different participants in the same environment and for one participant to view the manipulations of another participant (e.g., in real-time).

FIGS. 1A-6 provide a description of example computer systems for providing XR experiences to users. FIGS. 7A-7R illustrate example techniques for collaborating on content, in accordance with some embodiments. FIG. 8 is a flow diagram of methods of collaborating on content, in accordance with some embodiments. The user interfaces in FIGS. 7A-7R are used to illustrate the processes in FIG. 8. FIGS. 9A-9K illustrate example techniques for displaying content in a shared computer-generated environment, in accordance with some embodiments. FIG. 10 is a flow diagram of methods of displaying content in a shared computer-generated environment, in accordance with some embodiments. The user interfaces in FIGS. 9A-9K are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques.

These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the car-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human car, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each car of the listener has a corresponding personalized filter (e.g., personalized HRTF filter), as the cars of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
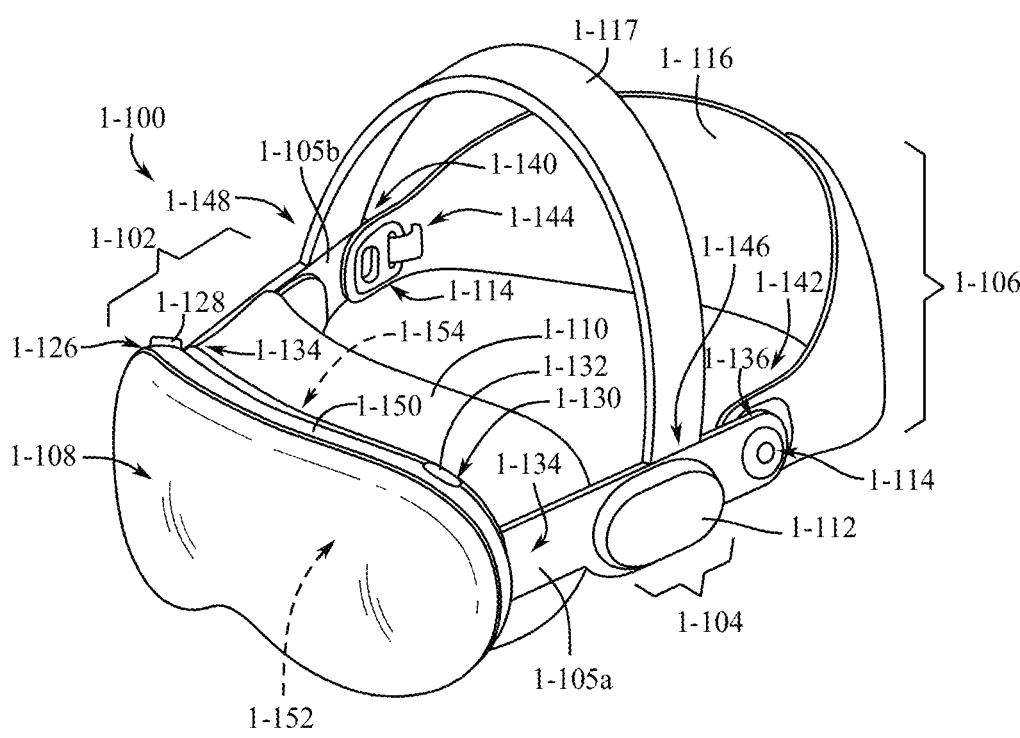
FIGS. 1B-1P are examples of a computer system for providing XR experiences in the operating environment of FIG. 1A.
Figure 1C:
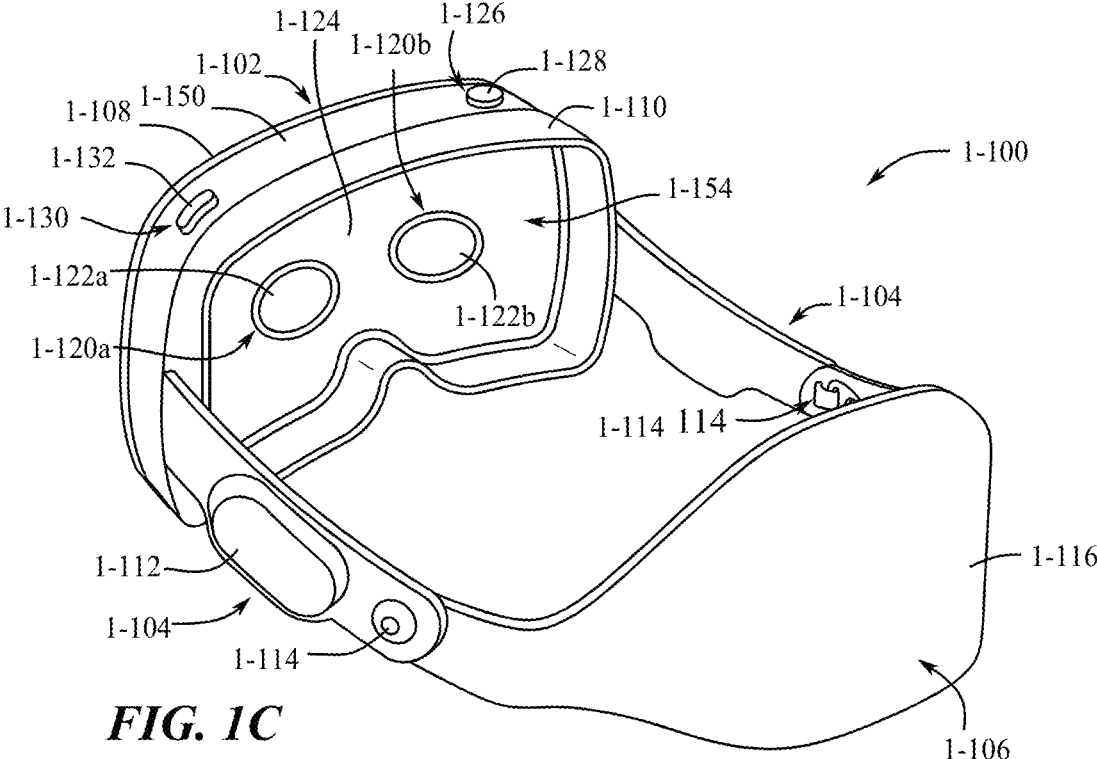
Figure 1D:
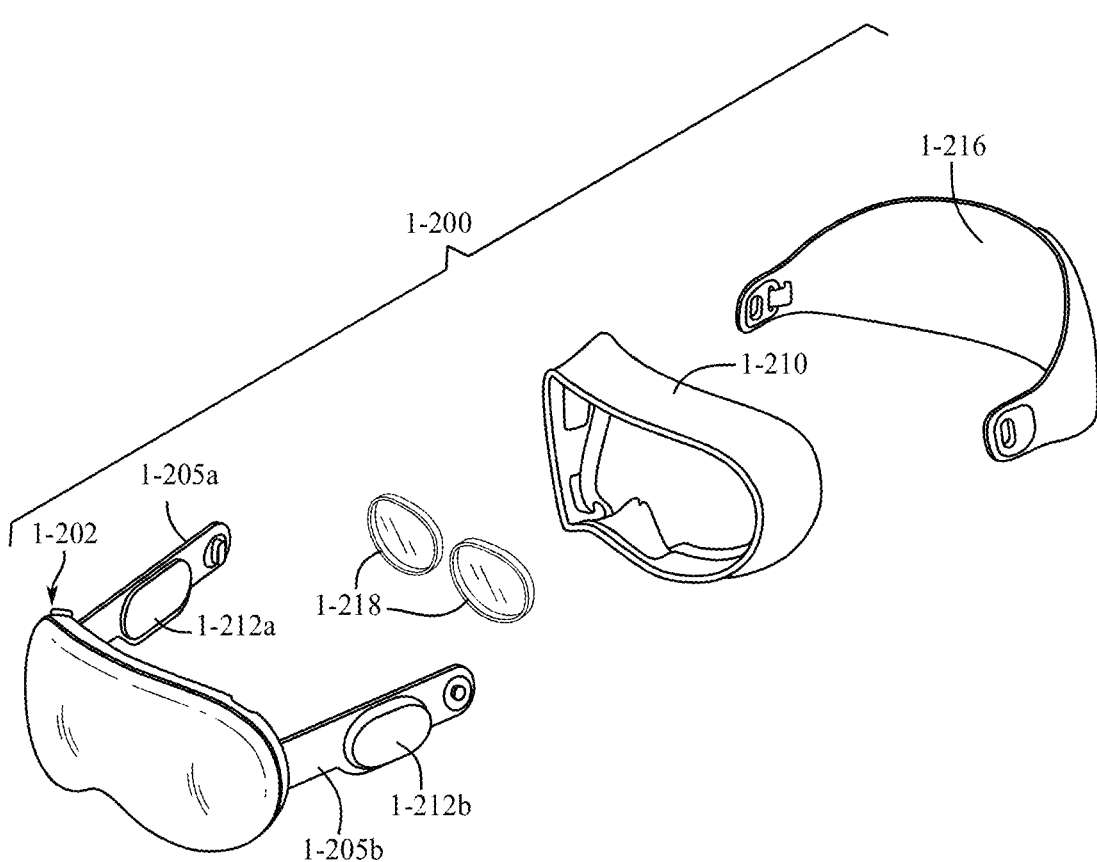
Figure 1E:
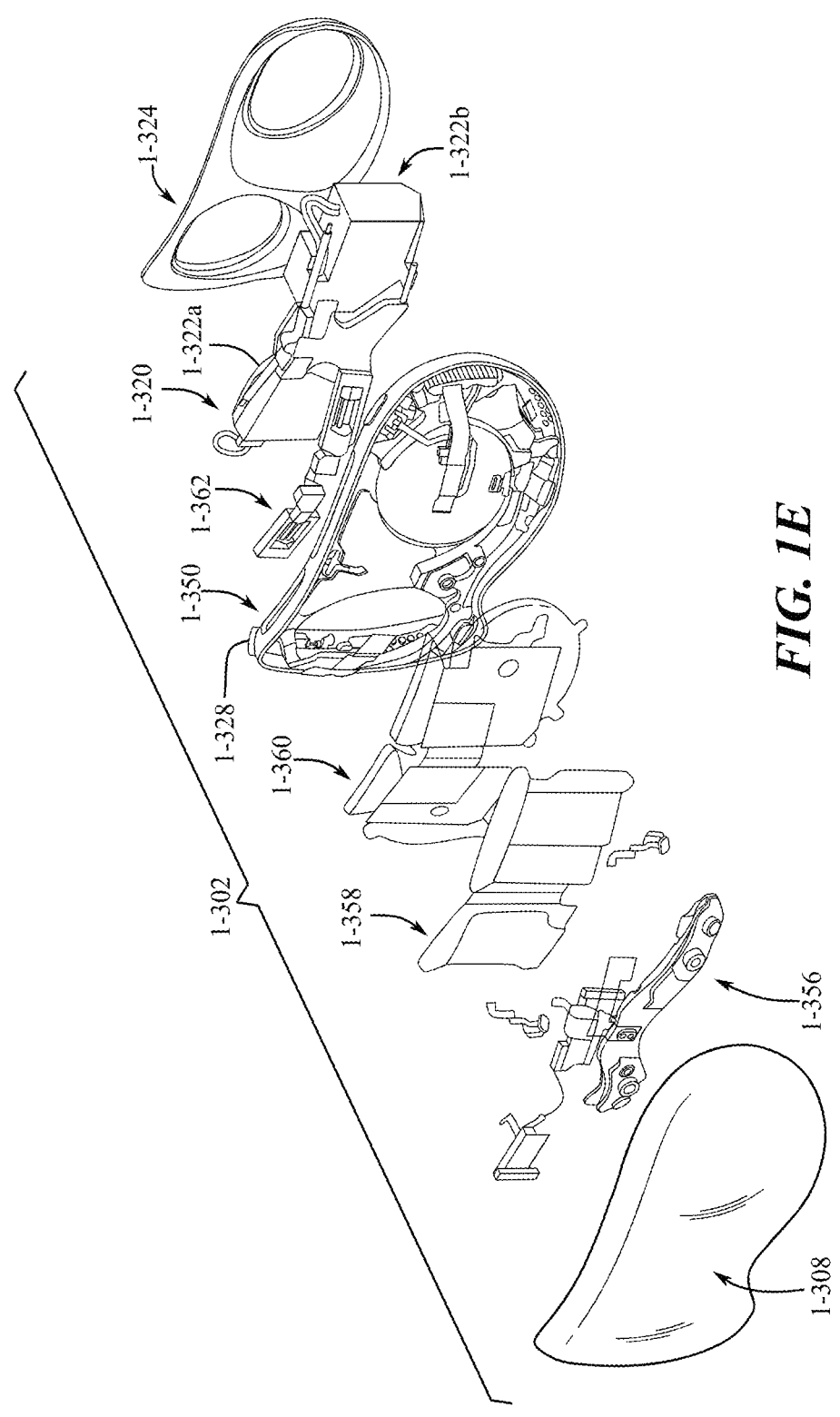
Figure 1F:
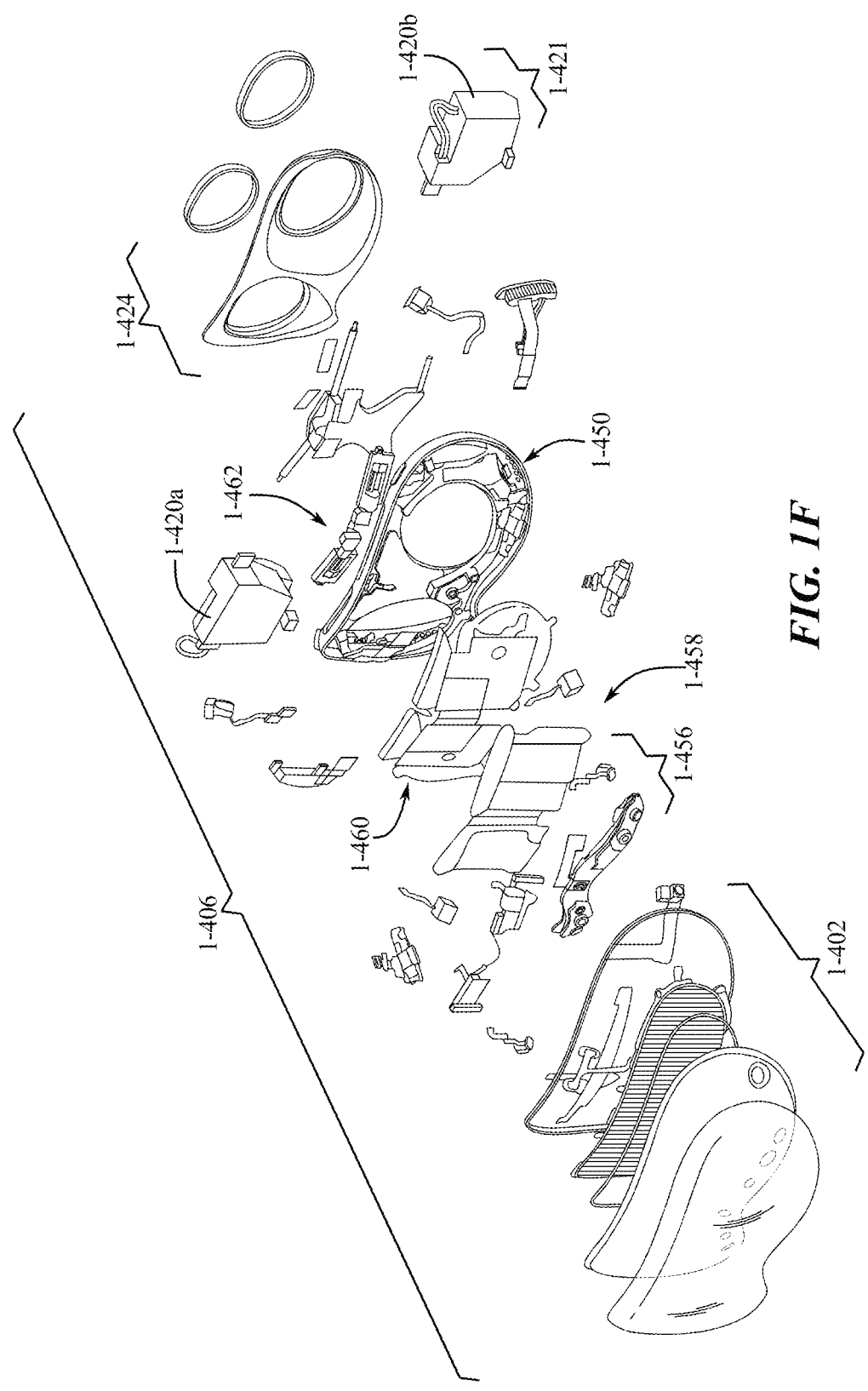
Figure 1G:
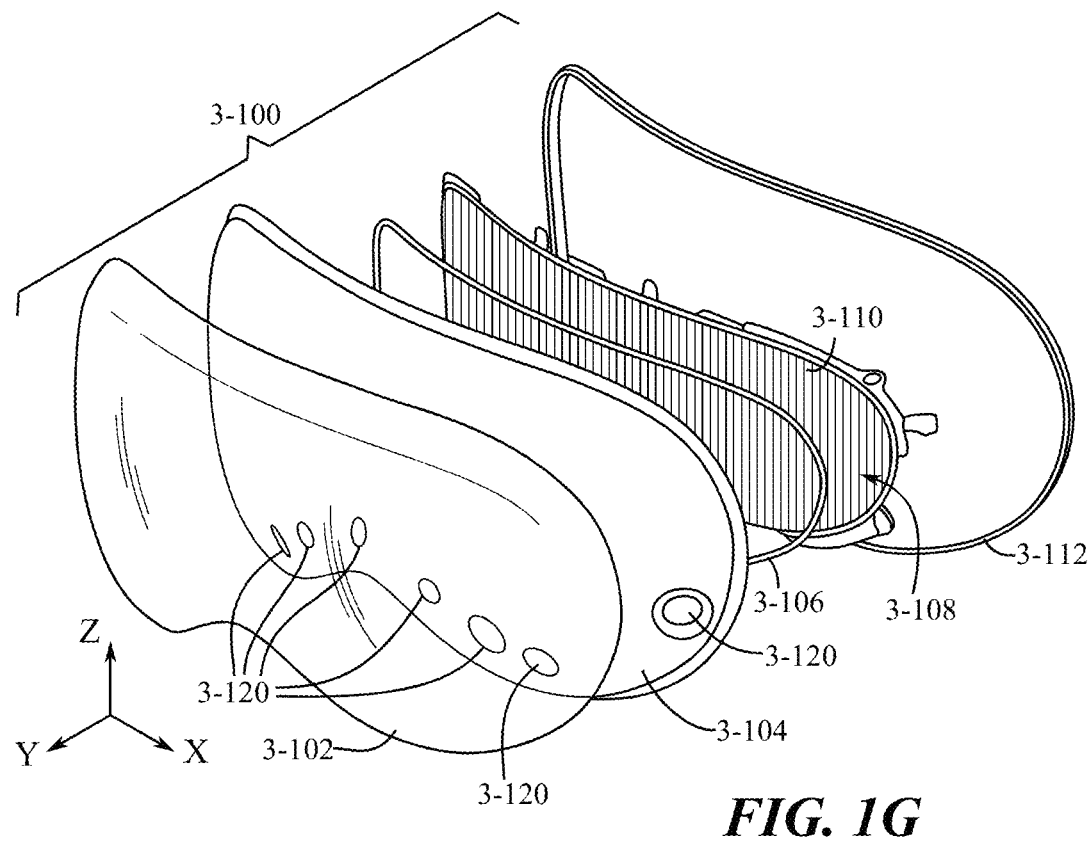
Figure 1H:
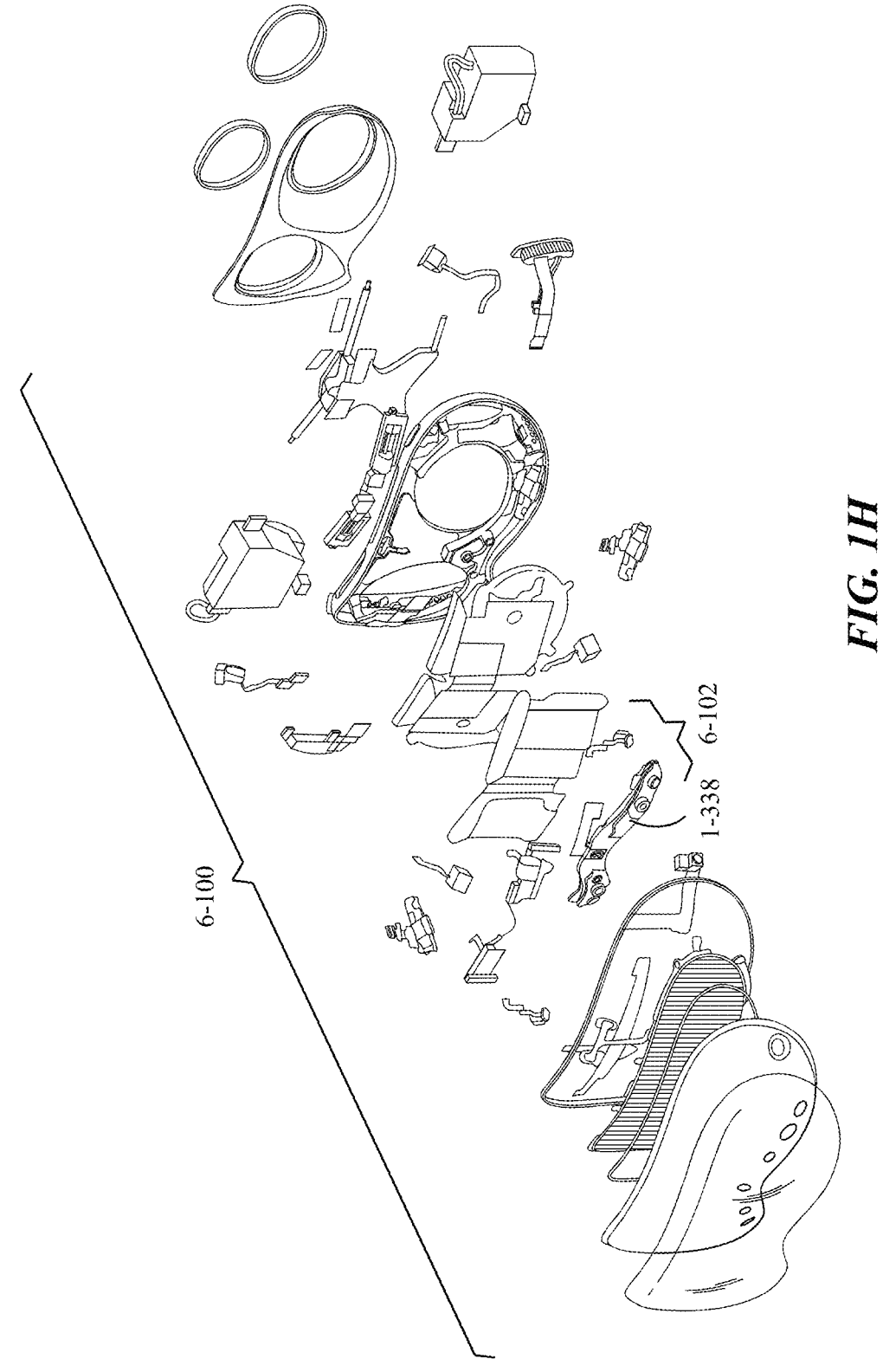
Figure 1I:
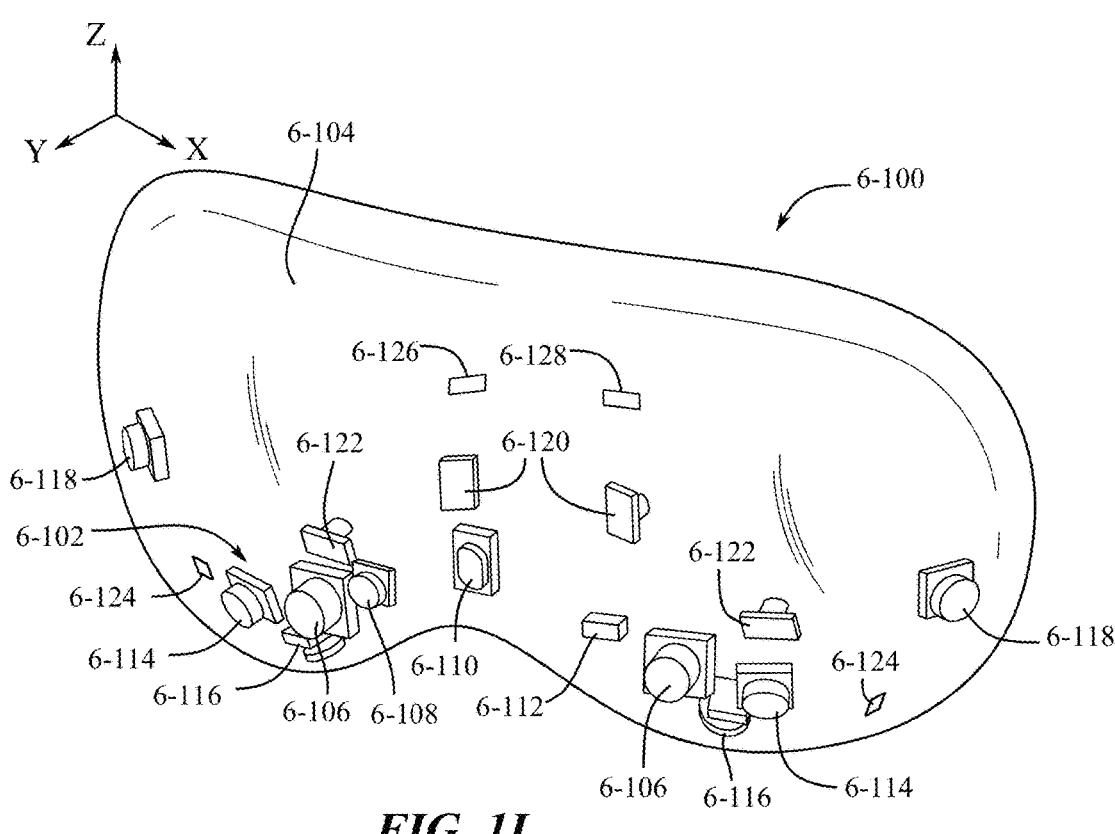
Figure 1J:
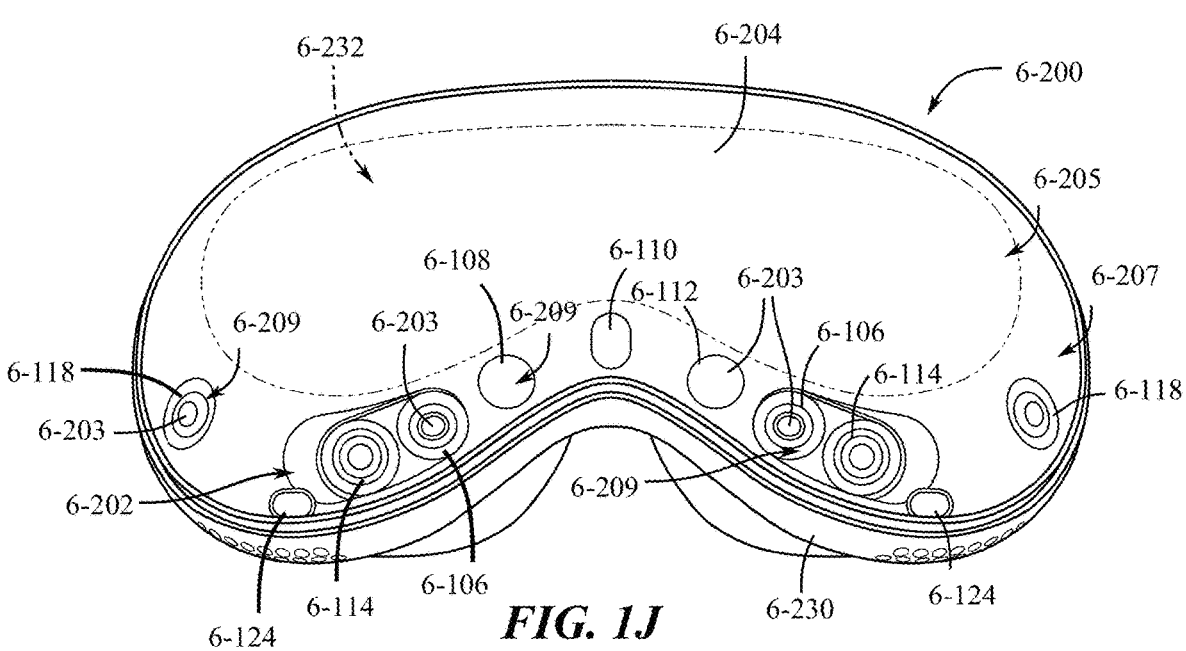
Figure 1K:
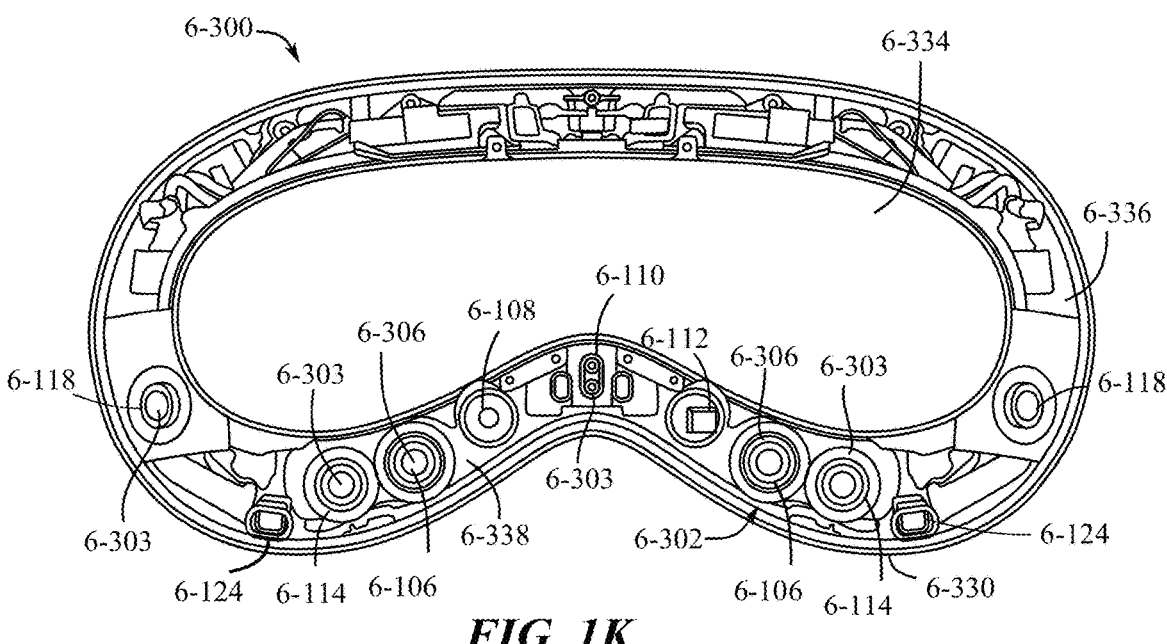
Figure 1L:
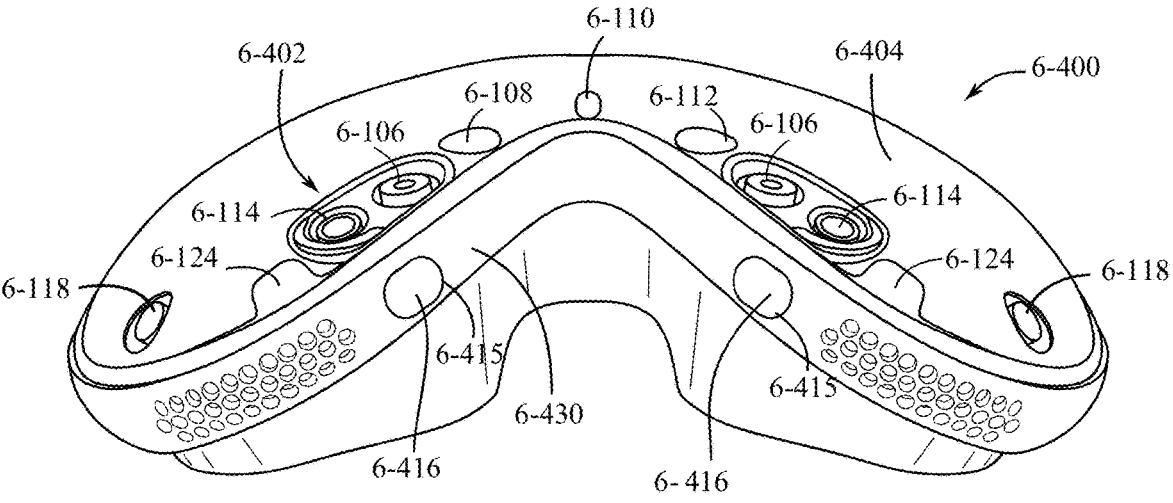
Figure 1M:
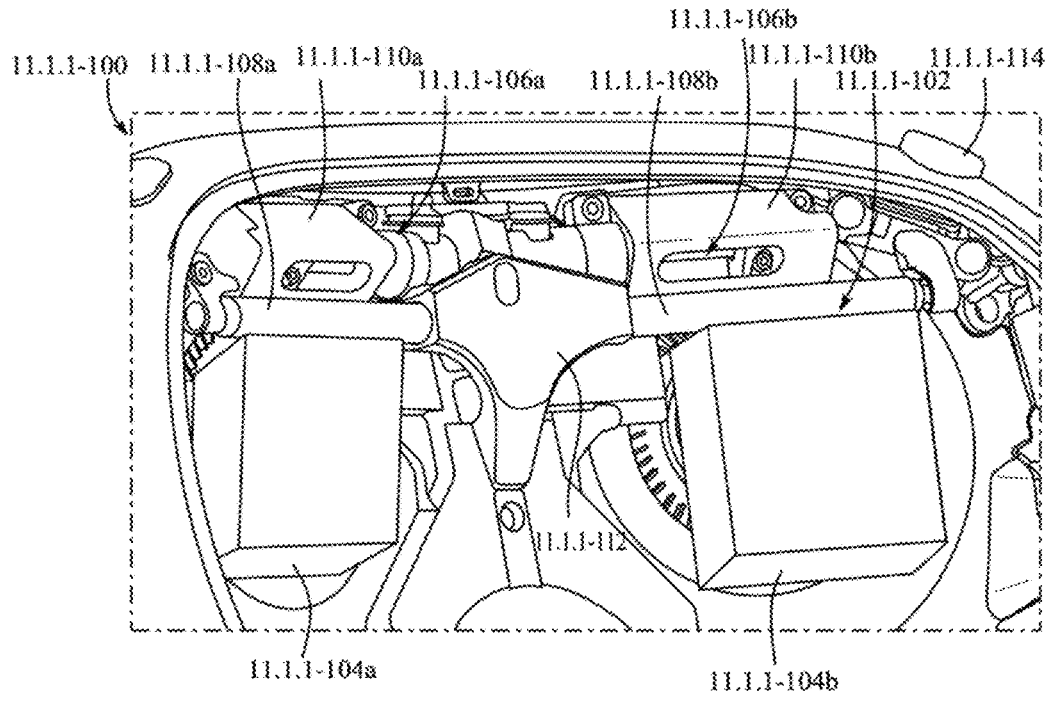
Figure 1N:
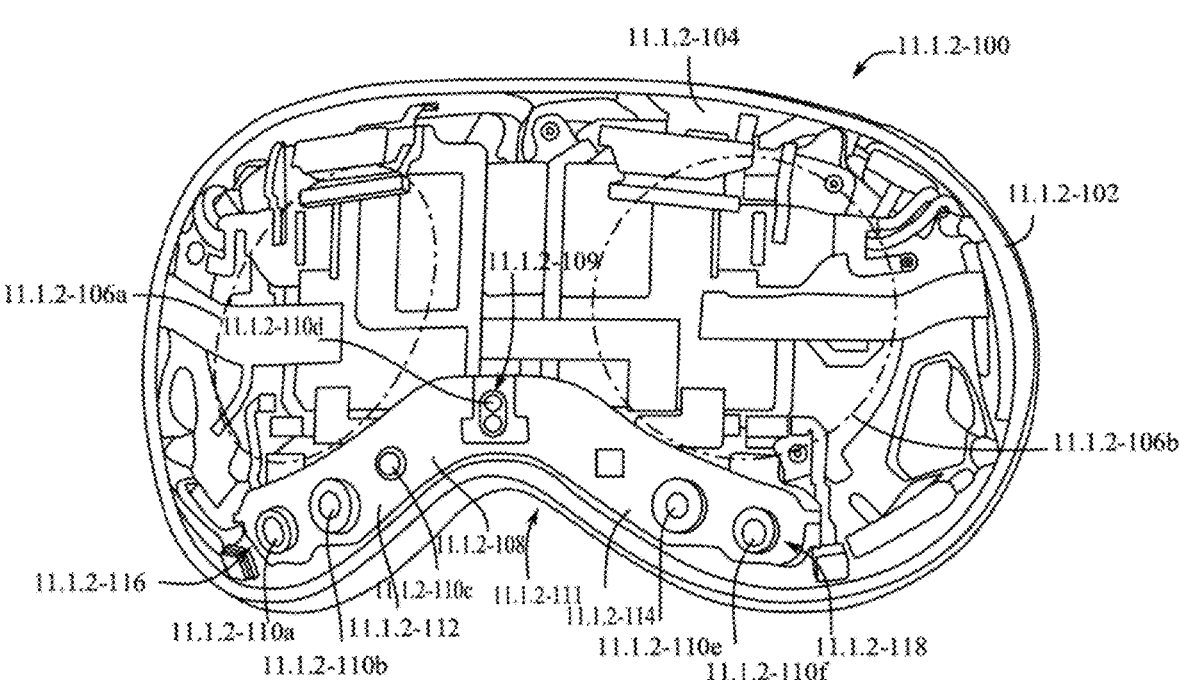
Figure 1O:
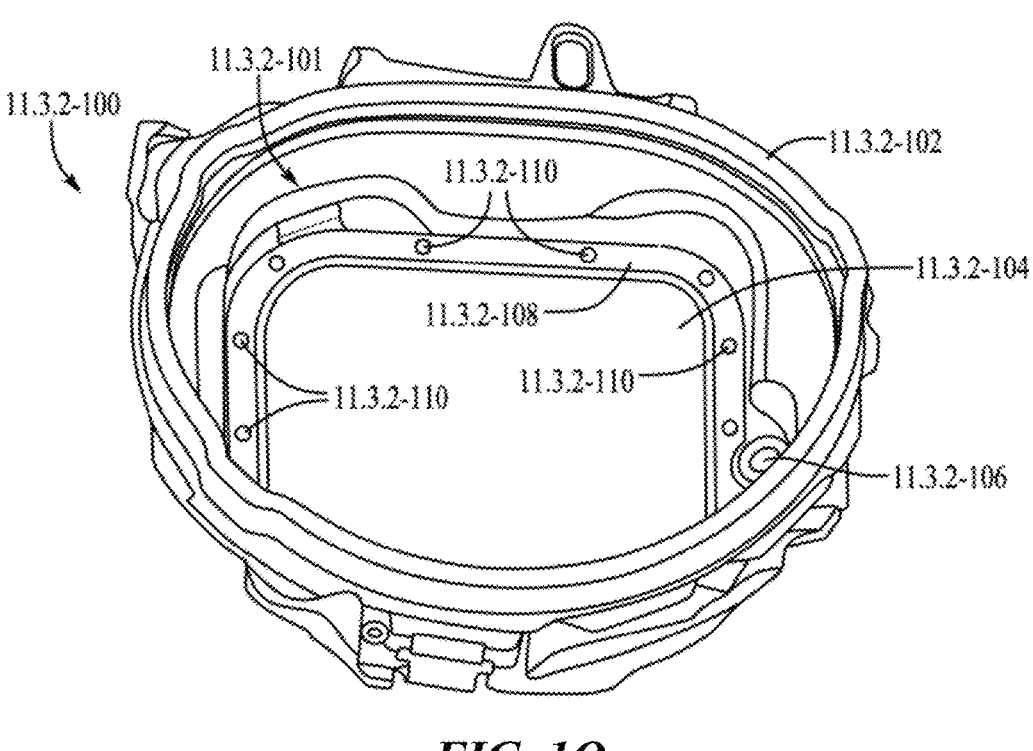
Figure 1P:
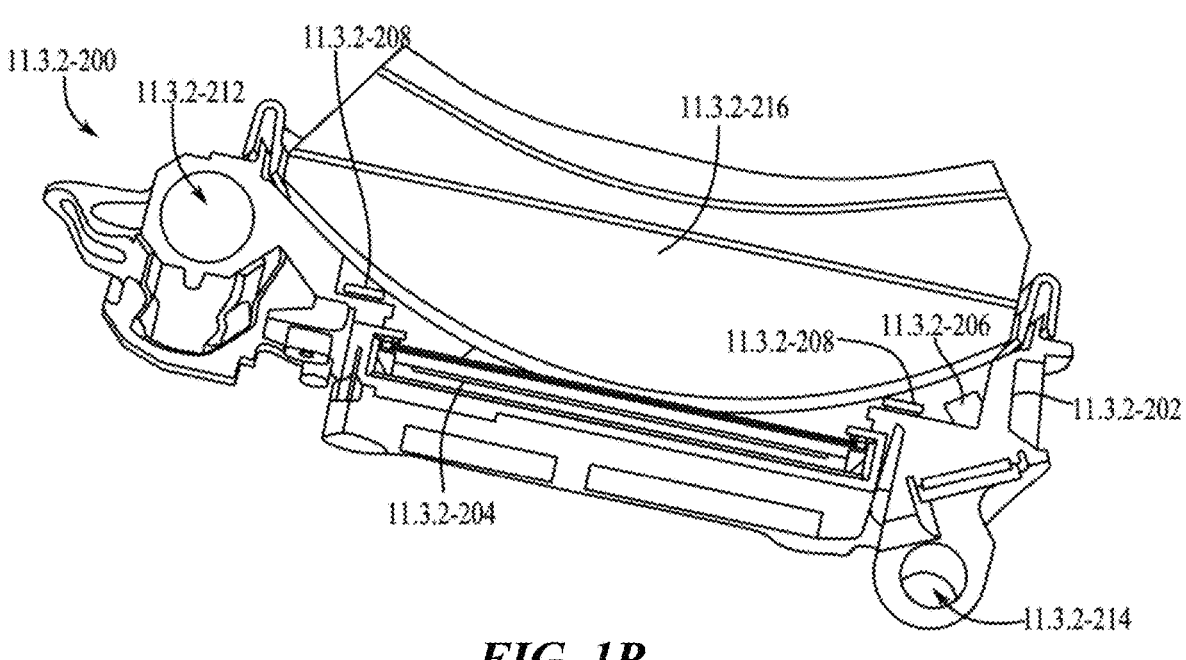

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be clastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-302 of a HMD. The display unit 1-302 can include a front display assembly 1-308, a frame/housing assembly 1-350, and a curtain assembly 1-324. The display unit 1-302 can also include a sensor assembly 1-356, logic board assembly 1-358, and cooling assembly 1-360 disposed between the frame assembly 1-350 and the front display assembly 1-308. In at least one example, the display unit 1-302 can also include a rear-facing display assembly 1-320 including first and second rear-facing display screens 1-322a, 1-322b disposed between the frame 1-350 and the curtain assembly 1-324.

In at least one example, the display unit 1-302 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-302 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the display assembly 3-108 of the HMD 1-100 shown in FIG. 1B or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," "backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-

108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
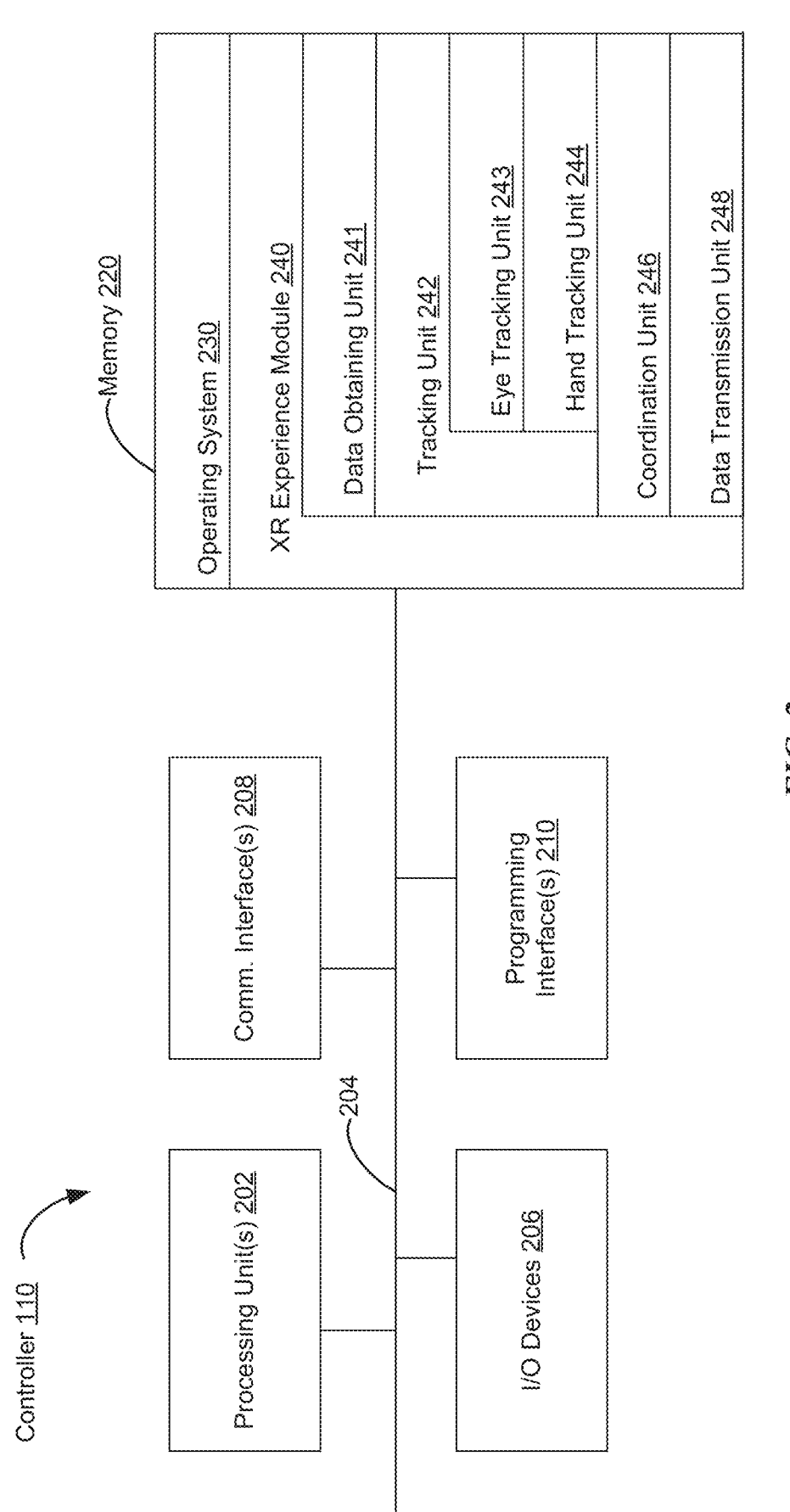
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
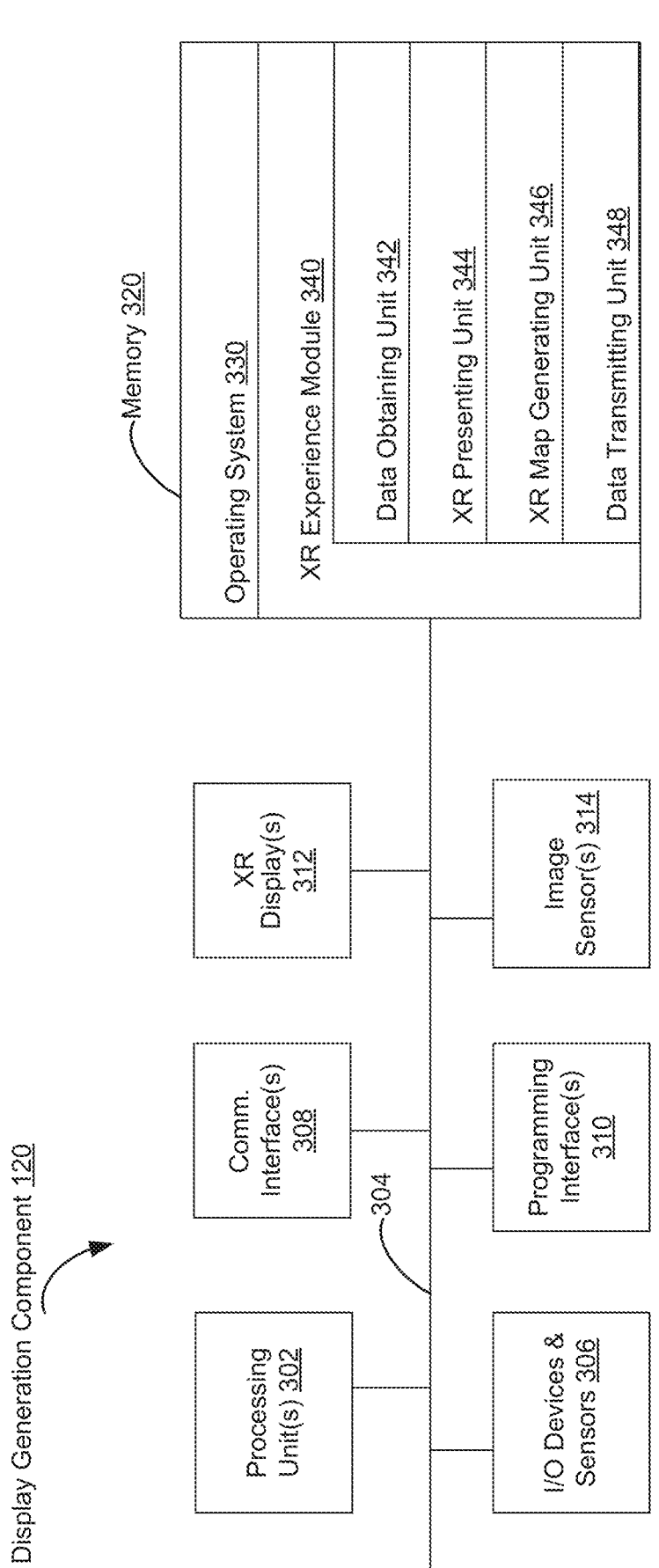
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors' 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
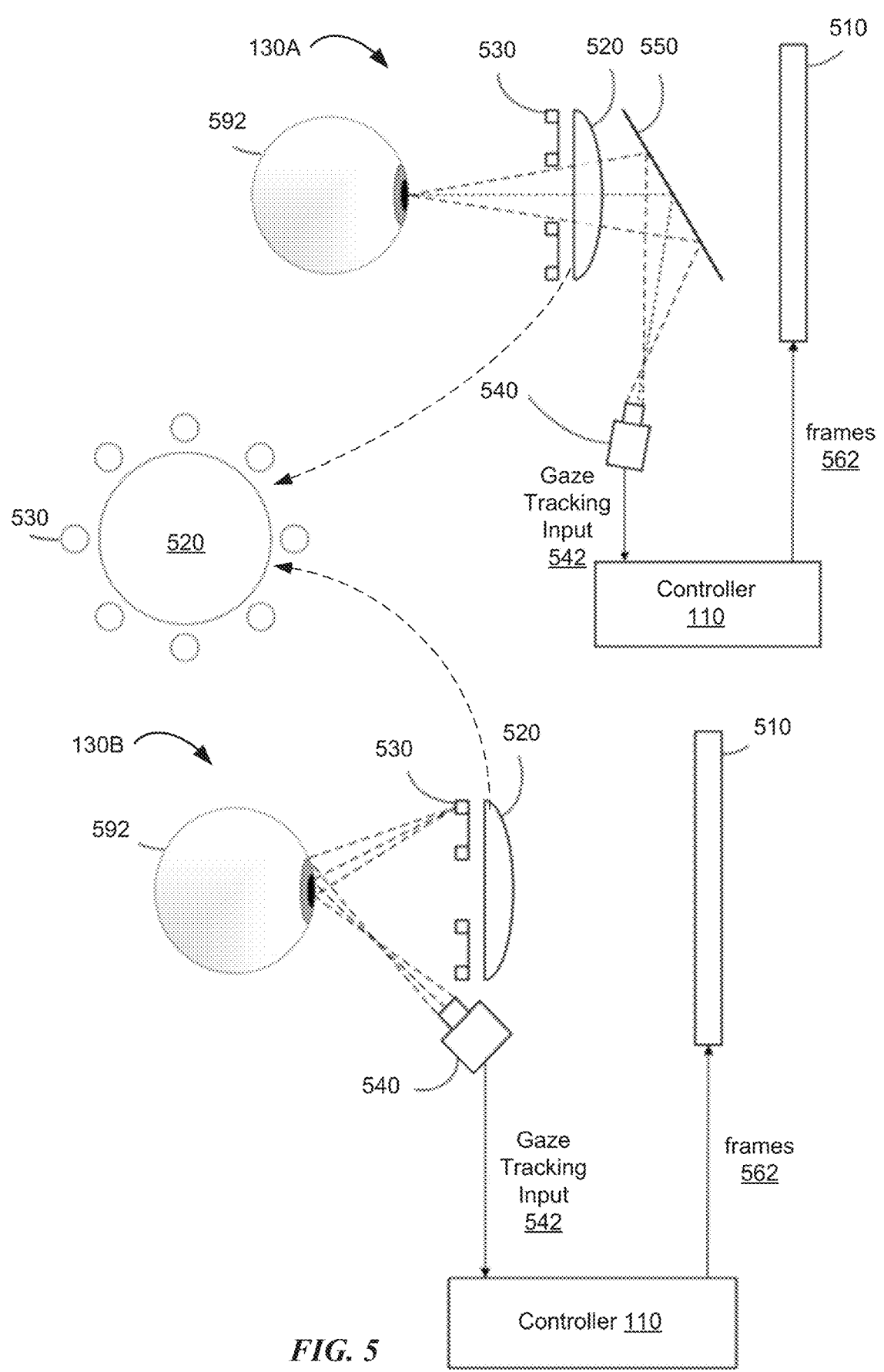
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a hologram, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)) mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm)

and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
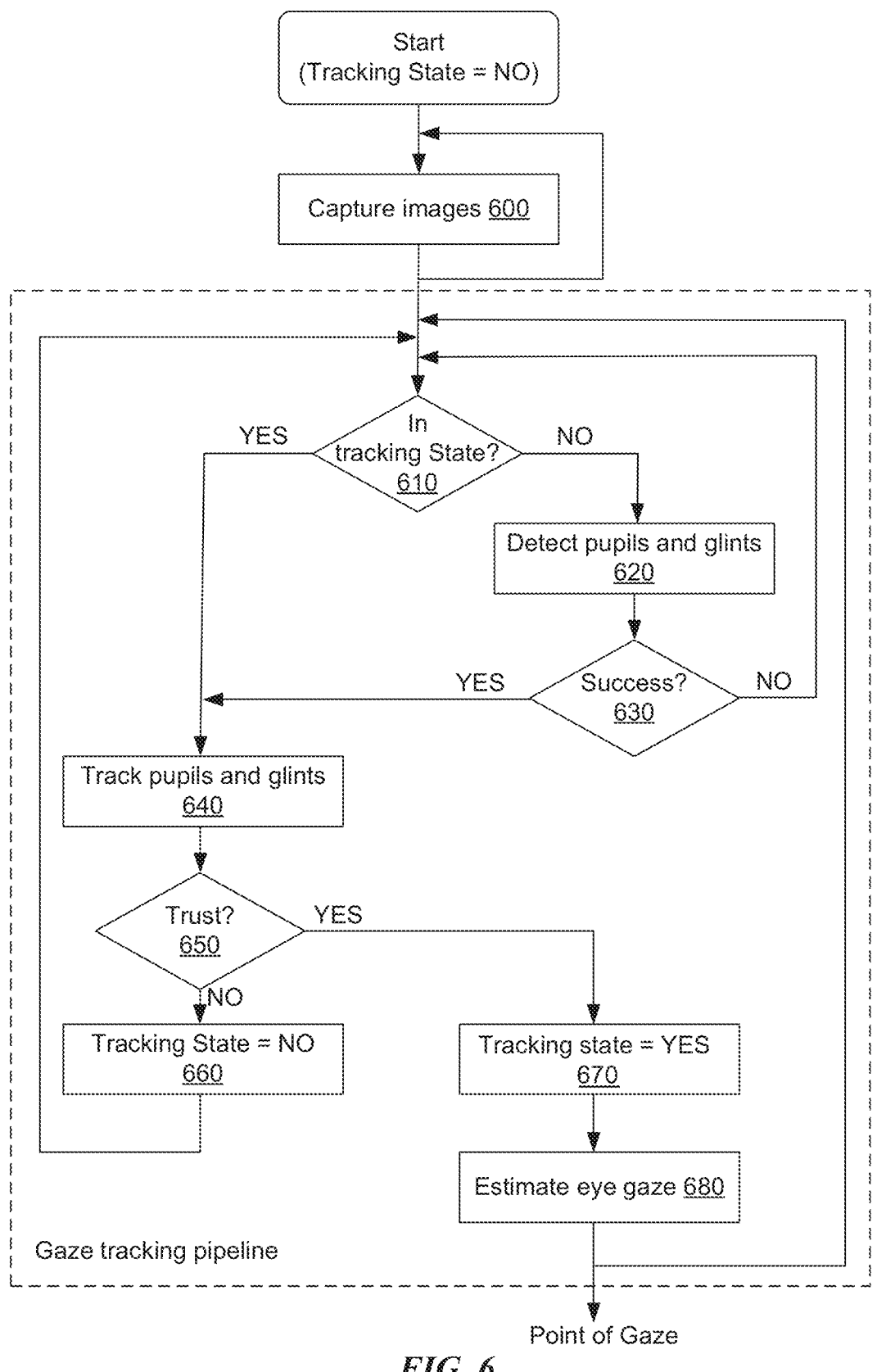
FIG. 6 is a flow diagram illustrating a glint-assisted gaze tracking pipeline in accordance with some embodiments.
Figure 7A:
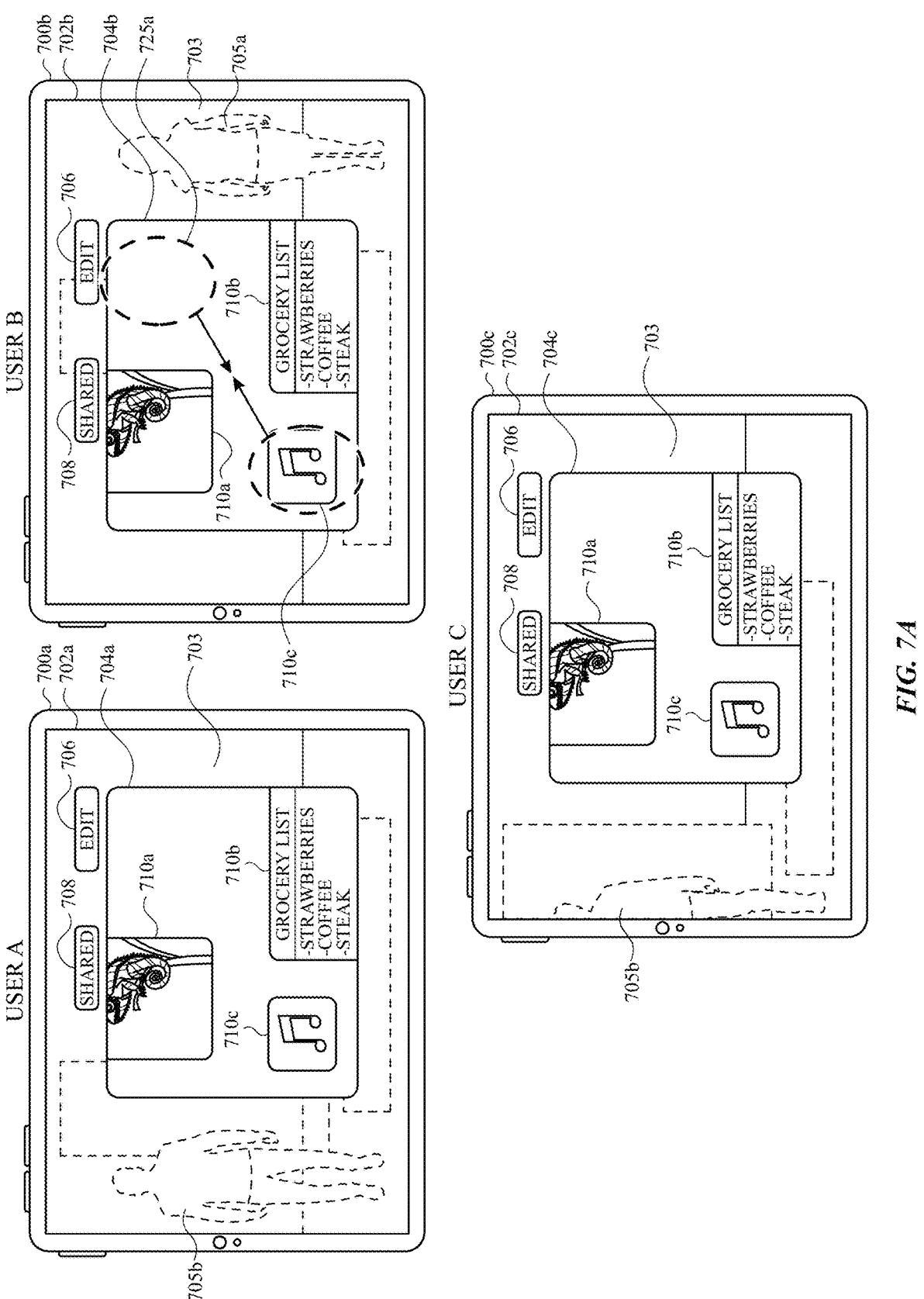
FIGS. 7A-7R illustrate example techniques for collaborating on content, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/ or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and (optionally) one or more cameras.

FIGS. 7A-7R illustrate examples of techniques and user interfaces for collaborating on content. FIG. 8 is a flow diagram of an exemplary method 800 for collaborating on content. The user interfaces in FIGS. 7A-7R are used to illustrate the processes described below, including the processes in FIG. 8. In some embodiments, the user interfaces described in FIGS. 7A-7R are displayed on a head-mounted device and a user provides inputs (e.g., to change a view of content and/or edit content as described below) using air gestures, voice commands, and/or inputs on a remote control.

FIG. 7A illustrates computer system 700a, computer system 700b, and computer system 700c. Computer system 700a includes display 702a; computer system 700b includes display 702b; and computer system 700c includes display 702c. Computer system 700a, computer system 700b, and computer system 700c are in a collaboration session in which users can view and/or edit content together. Computer system 700a is associated with a first participant (User A) in the collaboration session; computer system 700b is associated with a second participant (User B) in the collaboration session; and computer system 700c is associated with a third participant (User C) in the collaboration session. In some embodiments, the participants of the collaboration session are also in a real-time communication session in which the participants can communicate via audio and/or video. In some embodiments, the participants communicate in a shared extended reality environment (e.g., a virtual three-dimensional environment). Computer system 700a displays representation 705b of User B in environment 703 (e.g., an XR environment), and computer system 700b displays representation 705a of User A in environment 703.

In FIG. 7A, the participants of the collaboration session have respective views of the content being shared in the collaboration session via their respective computer systems. Computer system 700a displays view 704a of the content in the collaboration session; computer system 700b displays view 704b of the content in the collaboration session; and computer system 700c displays view 704c of the content in the collaboration session. In FIG. 7A, all three participants share the same view of the content, including photo 710a, document 710b, and application icon 710c. For example, view 704a, view 704b, and view 704c all display the same portion of the content shared in the collaboration session. Sharing indicator 708 indicates that the respective view of the content displayed is a shared view that is synchronized between participants in the collaboration session (e.g., sharing indicator 708 on computer system 700a indicates that view 704a is a shared view in FIG. 7A).

Figure 7B:
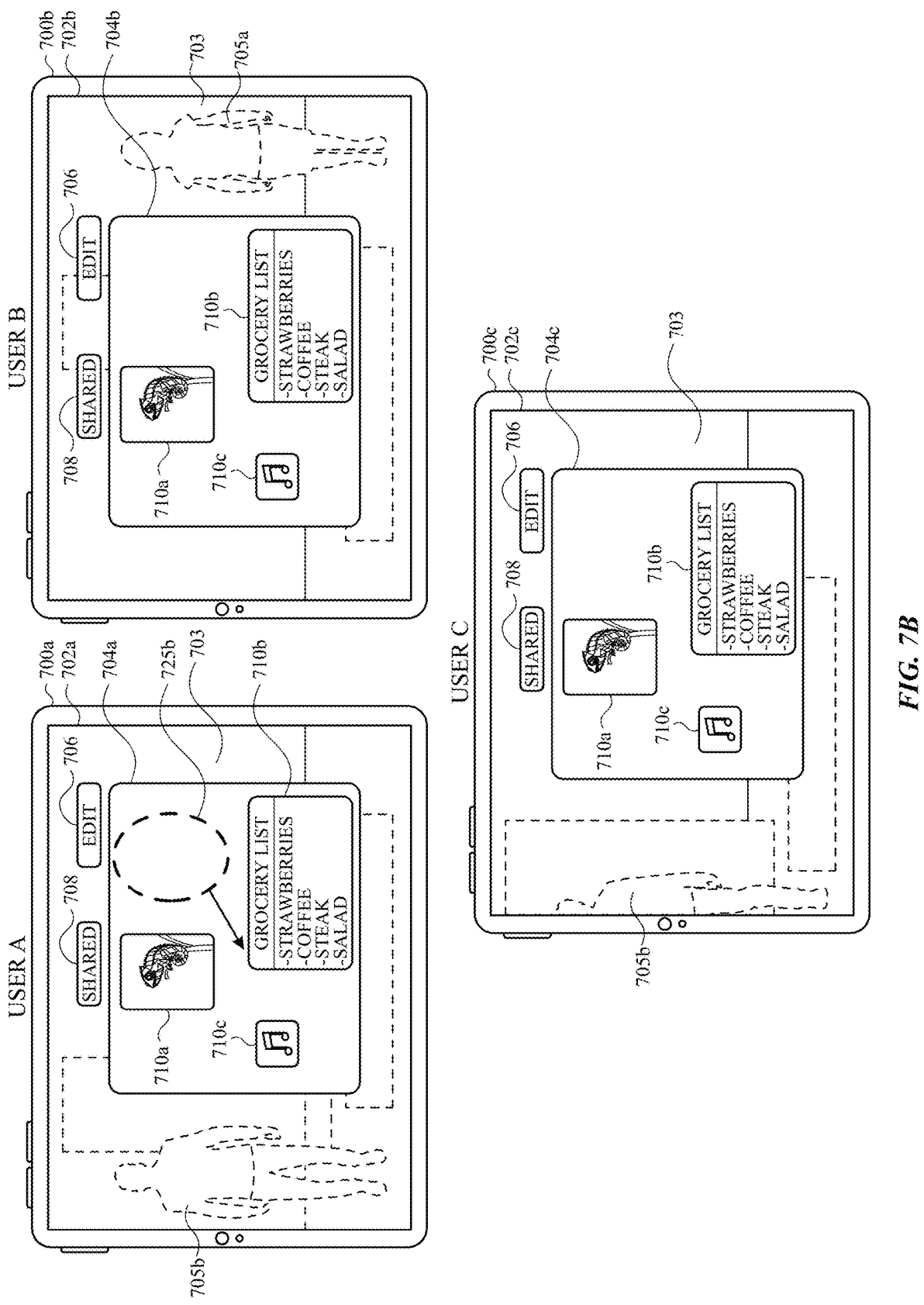

Computer system 700a, computer system 700b, and computer system 700c are all in a mode in which the respective views of the content are synchronized such that changes to the view of the content by one participant will change the view of the content displayed by the computer systems of the other participants (e.g., the participants of the collaboration session share a common view or a shared view of the content). For example, in FIG. 7A, computer system 700b detects request 725a to zoom out view 704b of the content. In response to detecting request 725a, view 704a, view 704b, and view 704c are zoomed out, as shown in FIG. 7B. Because view 704a, view 704b, and view 704c are all synchronized, view 704a, view 704b, and view 704c all including the same view of the content in the collaboration session.

Figure 7C:
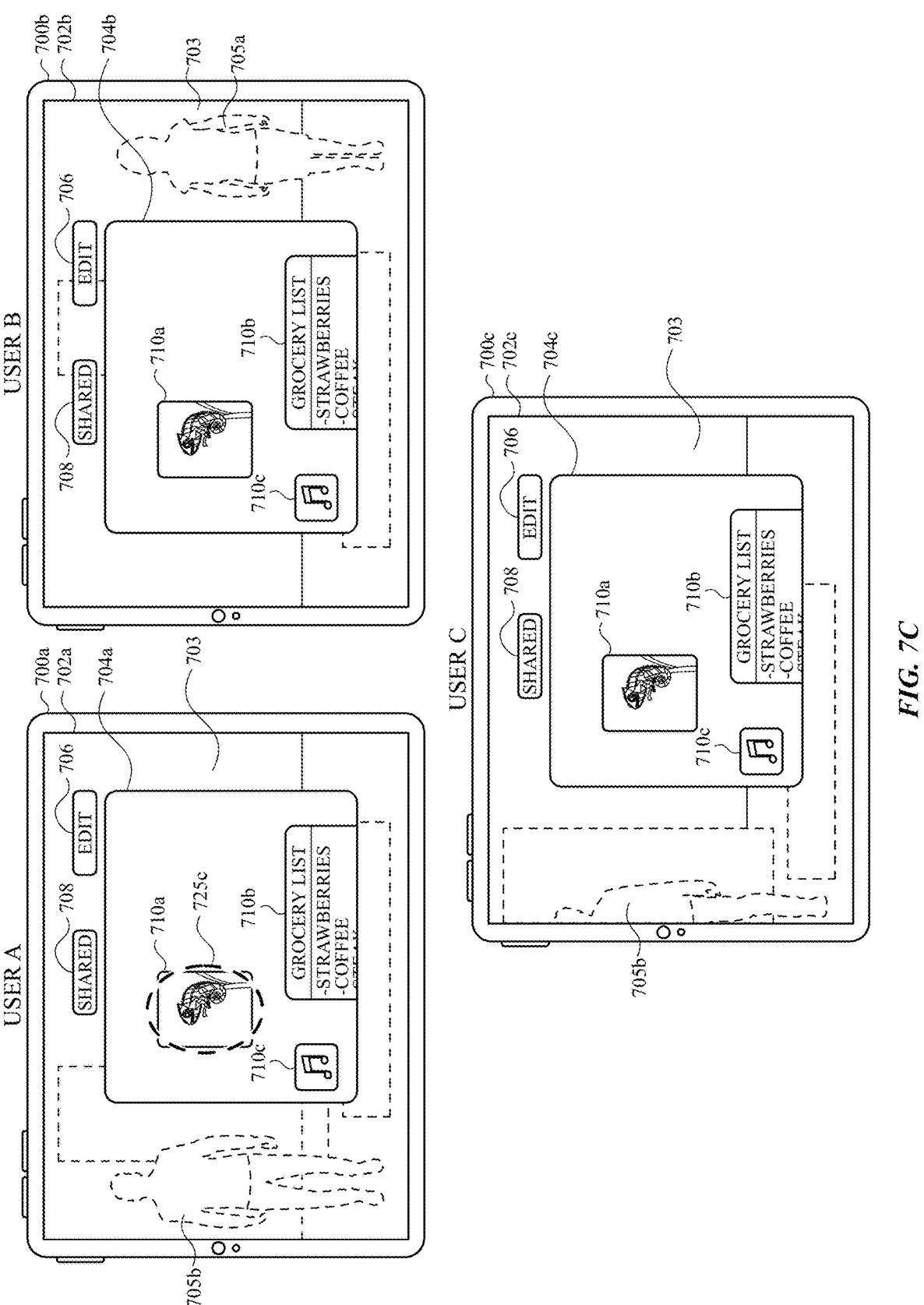
Figure 7D:
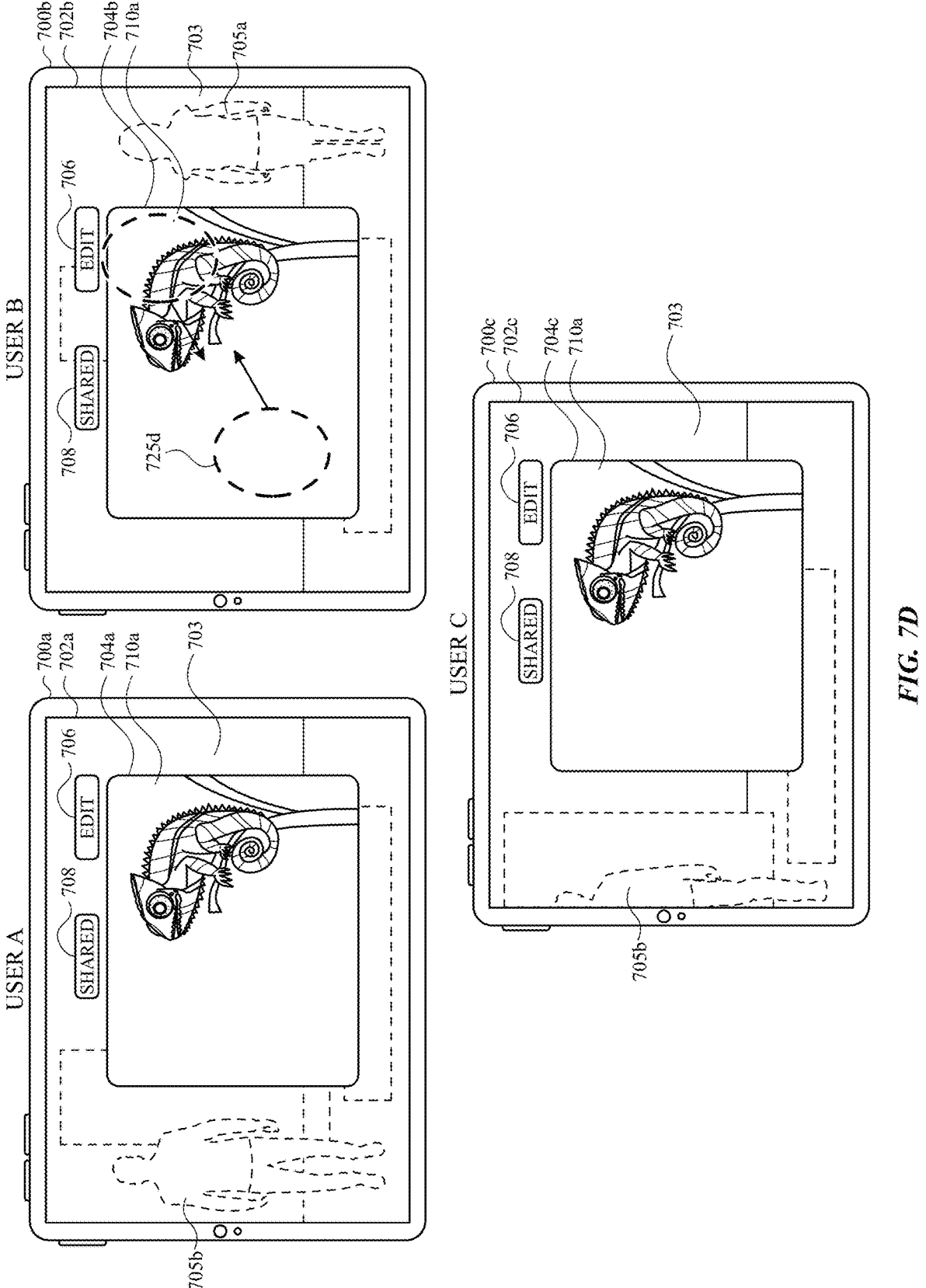

In FIG. 7B, computer system 700a detects request 725b to scroll the view of the content to the left. In response to detecting request 725b, the content is scrolled in view 704a, view 704b, and view 704c, as shown in FIG. 7C. In FIG. 7C, computer system 700a detects request 725c (e.g., by User A) to open and/or enlarge photo 710a in the collaboration session. In response to detecting request 725c, photo 710a is enlarged in the collaboration session such that view 704a, view 704b, and view 704c including an enlarged view of photo 710a, as shown in FIG. 7D. In FIG. 7D, computer system 700b detects request 725d (e.g., by User B) to close and/or reduce the size of photo 710a that was opened and/or enlarged (e.g., by User A). In response to request 725d, photo 710a is closed and/or reduced in size in the collaboration, as seen in view 704a, view 704b, and view 704c in FIG. 7E.

Figure 7E:
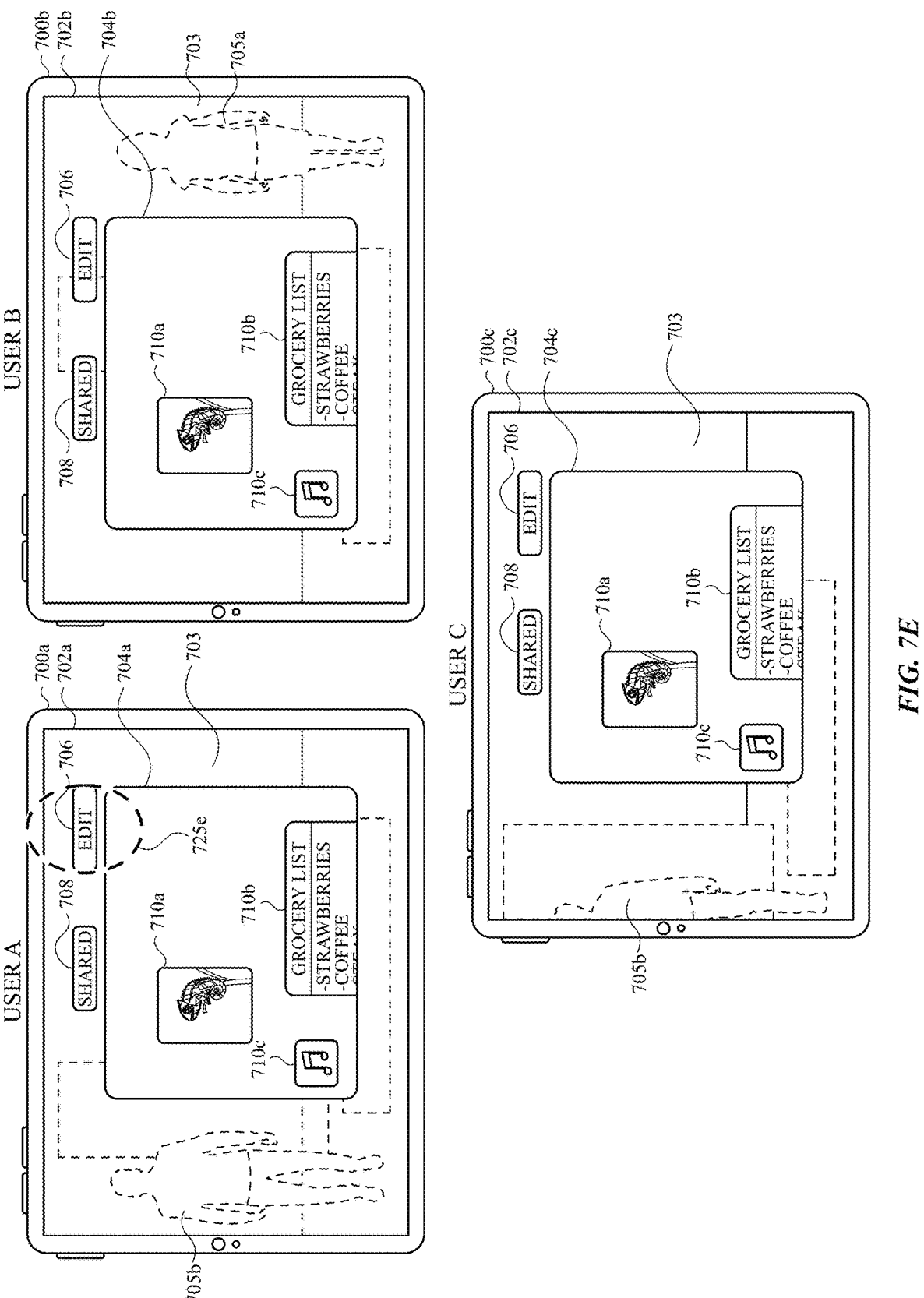
Figure 7F:
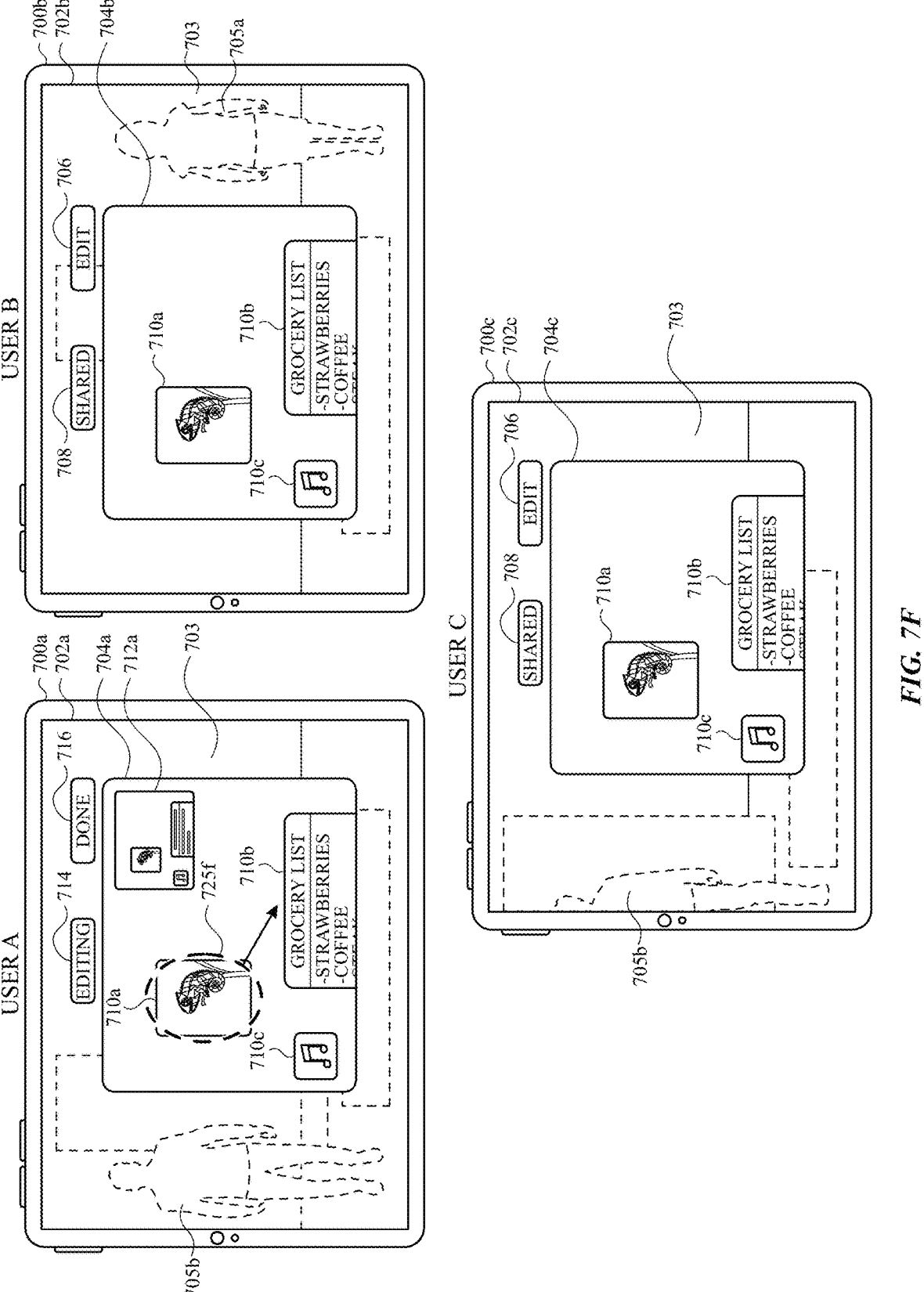

In FIG. 7E, computer system 700a detects request 725e (e.g., selection of edit option 706) to enter an editing mode in which User A can edit the content in the collaboration session. In response to request 725e, computer system 700a enters the editing mode, as shown in FIG. 7F. In response to detecting request 725e to enter the editing mode, computer system 700a displays editing indicator 714 and view 712a of the content in the collaboration session. Editing indicator 714 indicates that a respective computer system (e.g., computer system 700a in FIG. 7F) is in an editing mode (e.g., a mode in which view 704a is not synchronized with the view of the content provided to other participants). View 712a includes a view of the content in the collaboration session that is synchronized to the view that is shared by the other participants (referred to as the shared view). View 712a provides User A with a smaller version of the shared view for context while providing view 704a for editing the content in the collaboration session. In FIG. 7F, computer system 700b and computer system 700c remain in the same mode as in FIGS. 7A-7E.

Figure 7G:
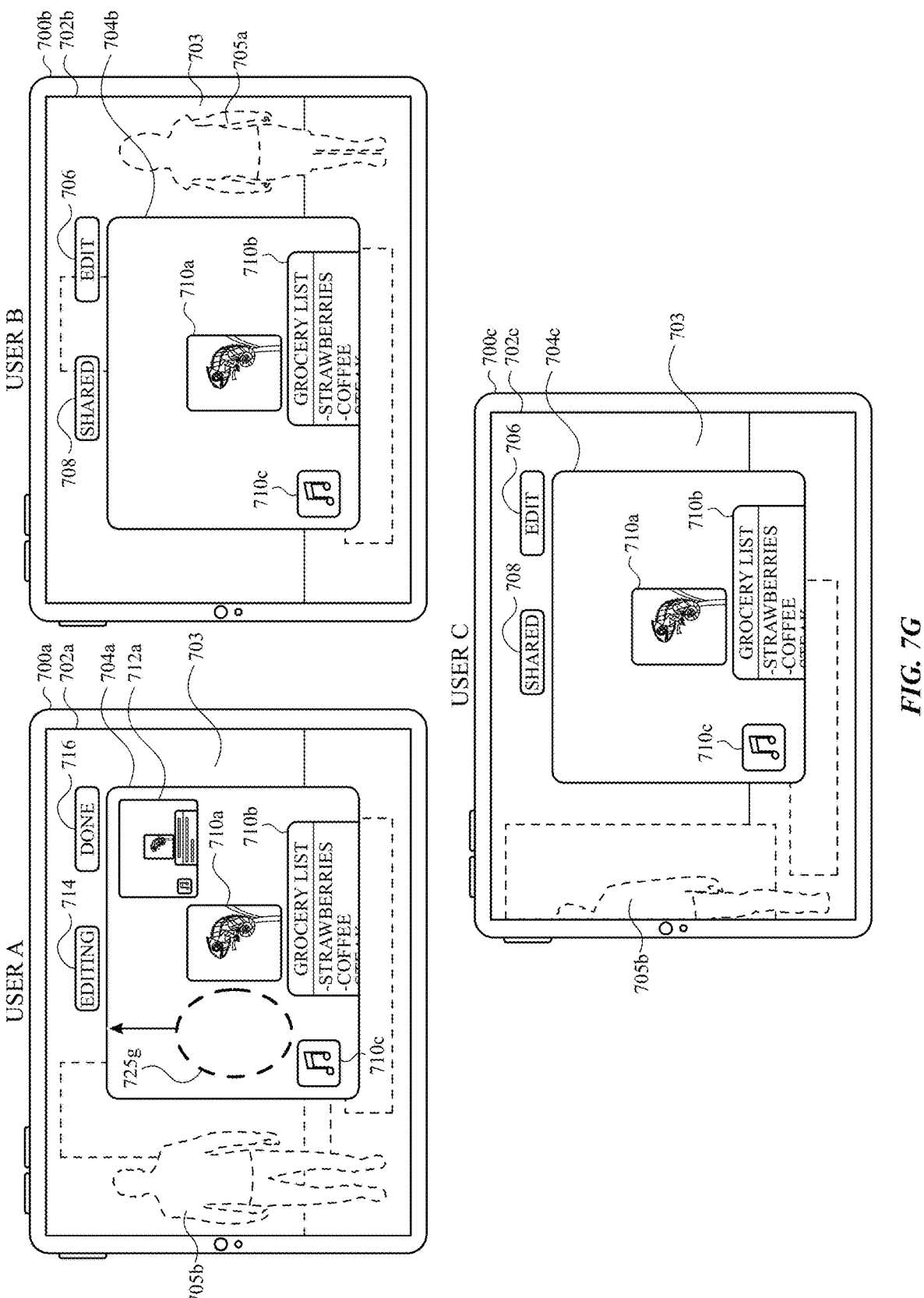

In FIG. 7F, computer system 700a detects request 725f to edit the content in the collaboration session by moving an element of the content. In the illustrated embodiment, request 725f includes a request to change a position of photo 710a. In response to detecting request 725f, the content in the collaboration session is edited and view 704a, view 704b, and view 704c are updated to reflect the edit, as shown in FIG. 7G.

Figure 7H:
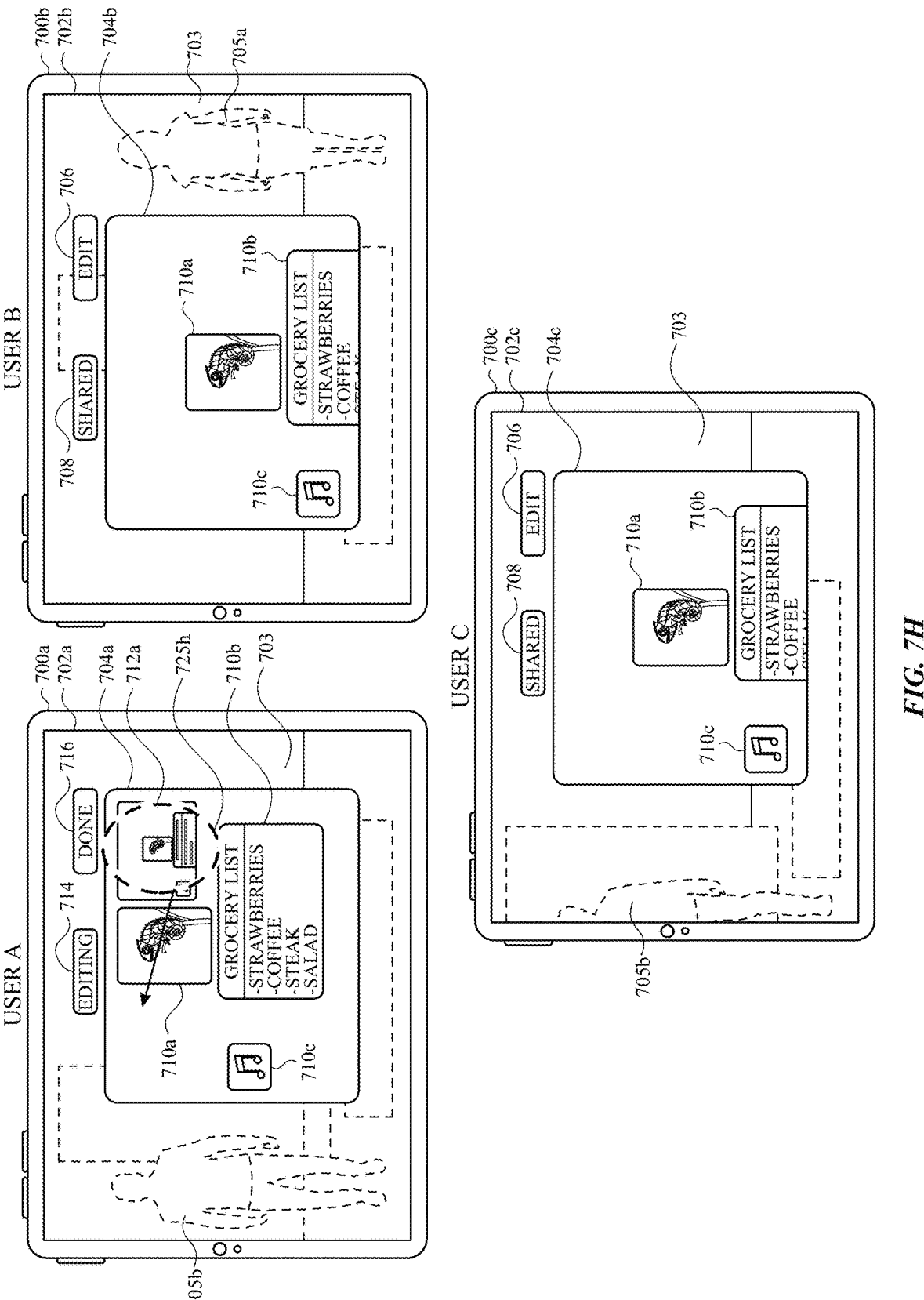

When computer system 700a is in the editing mode, view 704a of the content in the collaboration session is not (e.g., no longer) synchronized with view 704b on computer system 700b and view 704c on computer system 700c. For example, in FIG. 7G, computer system 700a detects request 725g to scroll view 704a. In response to request 725g, view 704a on computer system 700a is scrolled upward, while view 704b on computer system 700b and view 704c on computer system 700c remain unchanged, as shown in FIG. 7H. Accordingly, in FIG. 7H, view 704a displays a different portion of the content than view 704b and view 704c. View 704b and view 704c continue to provide a synchronized view of the content shared by the participants in the collaboration session.

Although view 704a has changed, view 712a remains unchanged and shows the shared view of the collaboration session (e.g., the same view as view 704b and view 704c in FIG. 7H). In some embodiments, view 712a can be moved. For example, in FIG. 7H, computer system 700a detects request 725h to move view 712a. In response to request 725h, computer system 700a moves view 712a as shown in FIG. 7I.

Figure 7I:
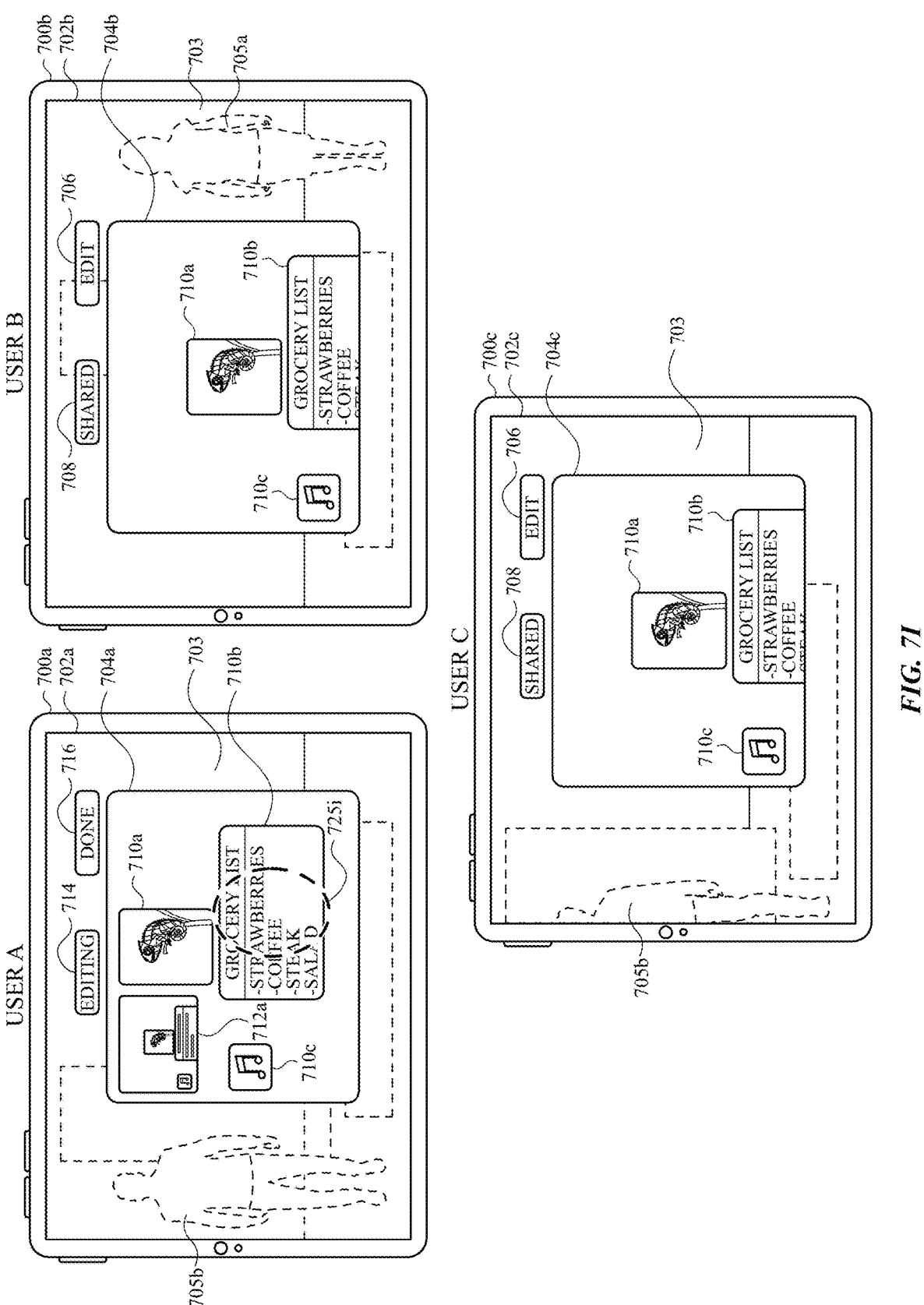

In FIG. 7I, computer system 700a detects request 725i to edit the content in the collaboration session by editing an element of the content. Request 725i includes a request to edit document 710b. In response to detecting request 725i, text is added to document 710b, and view 704a, view 704b, view 704c, and view 712a are updated to show that the content has been modified, as shown in FIG. 7J.

Figure 7J:
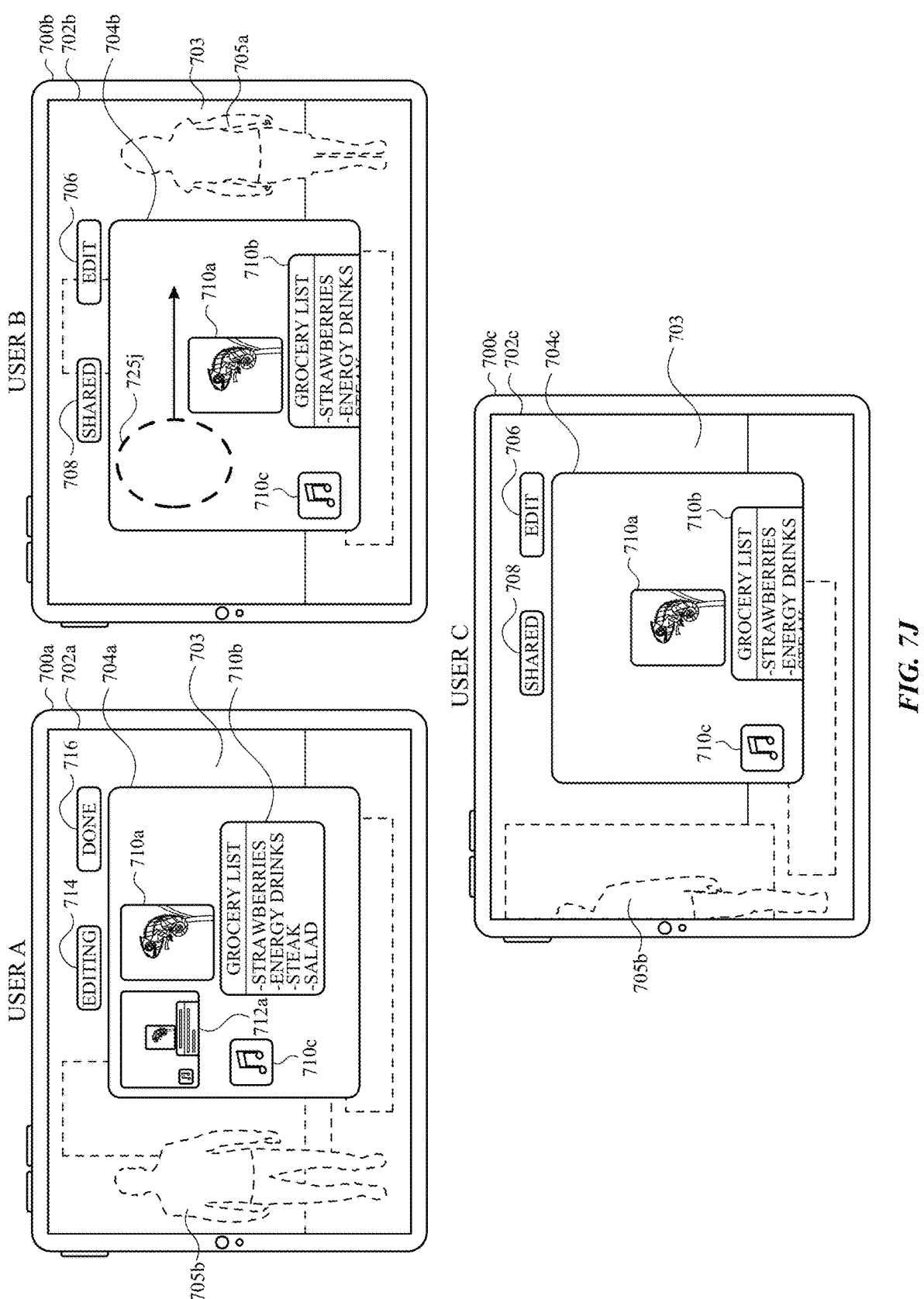
Figure 7K:
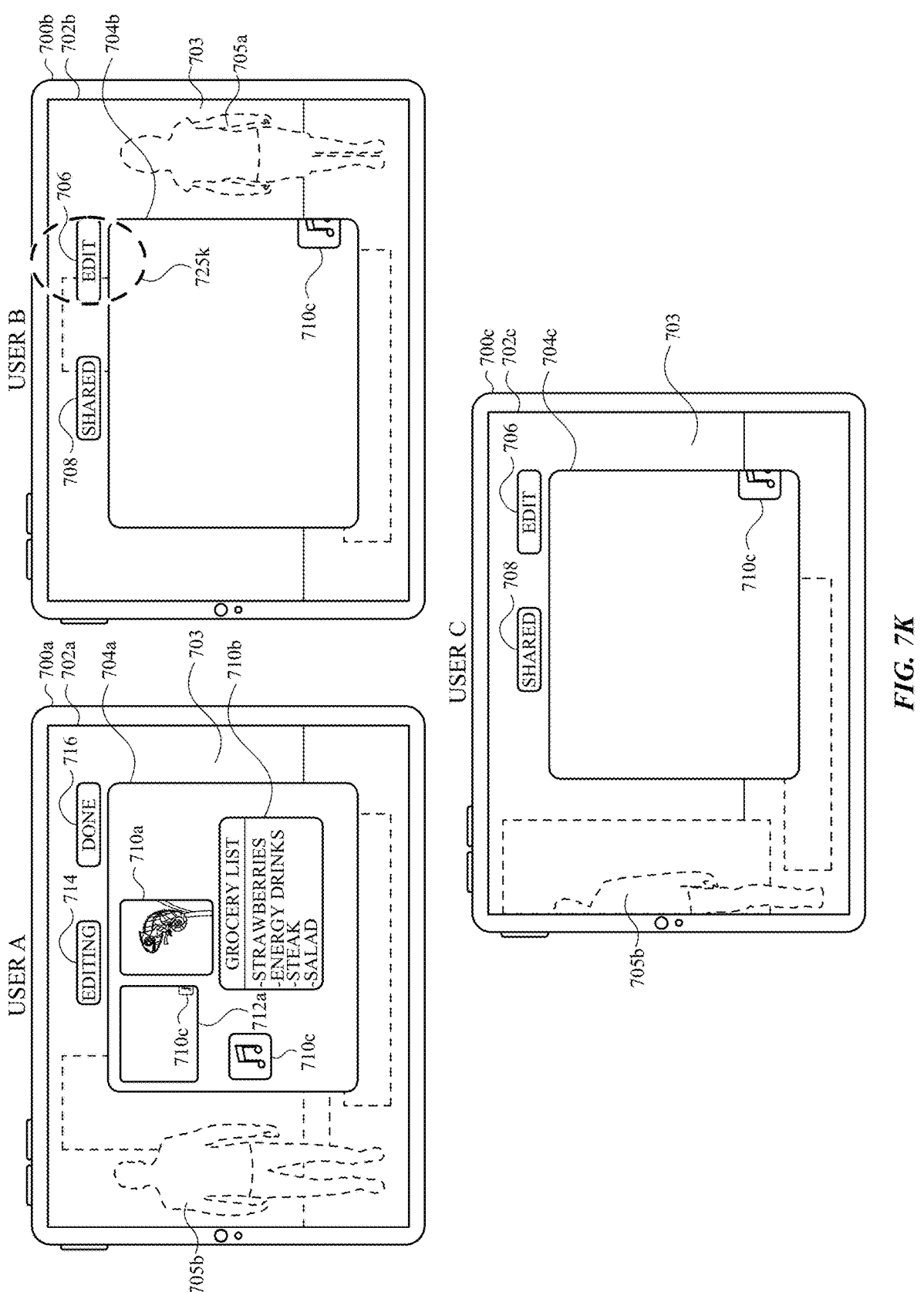

In FIG. 7J, view 704b and view 704c display the shared view of the content. View 704a is not synchronized to the shared view of the collaboration session when computer system 700a is in the editing mode. In FIG. 7J, computer system 700b detects request 725j to scroll view 704b (e.g., the shared view of the content). In response to detecting request 725j, view 704b, view 704c, and view 712a are scrolled, as shown in FIG. 7K. Scrolling the view as shown in FIG. 7K moves photo 710a and document 710b out of the shared view, and application icon 710c is partially in the shared view. Although photo 710*a* and document 710*b* are not displayed in the shared view, they are still in the content shared in the collaboration session (e.g., they have not been deleted or removed from the content). For example, photo 710*a* and document 710*b* are displayed in view 704*a* in FIG. 7K. Although view 704*a* is not synchronized to the shared view, view 704*a* displays the current content of the collaboration session.

Figure 7L:
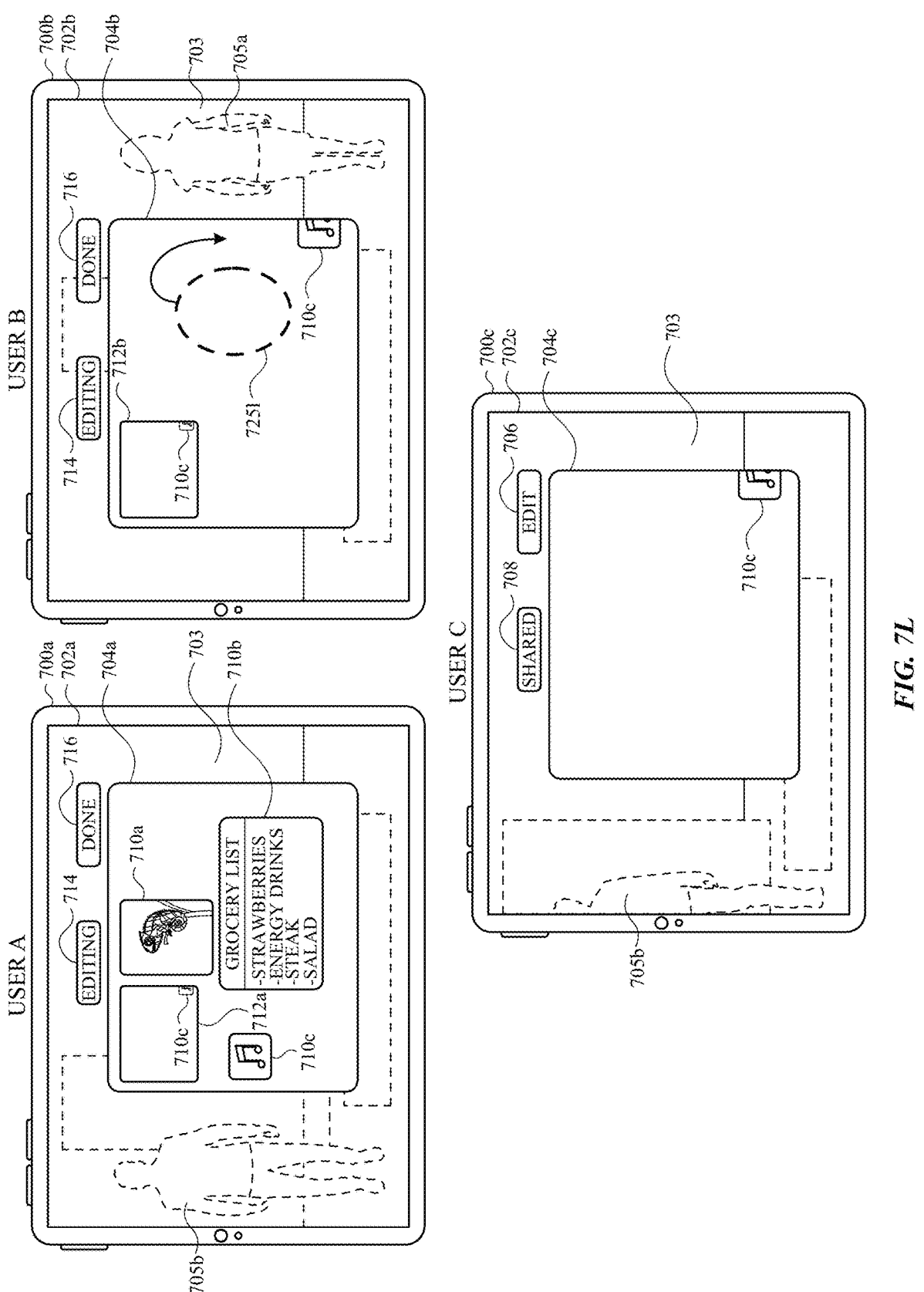

In FIG. 7K, computer system 700*b* detects request 725*k* to enter the editing mode. In response to detecting request 725*k*, computer system 700*b* enters the editing mode, displays indication 714 indicating that computer system 700*b* is in the editing mode, and displays view 712*b*, as shown in FIG. 7L. View 712*b* is analogous to view 712*a* on computer system 700*a* and provides User B with the shared view of the content in the collaboration session while view 704*b* can be used to edit the content.

In FIG. 7L, computer system 700*b* detects request 725*l* to add an element (e.g., a drawing) to the content in the collaboration session. In response to detecting request 725*l*, drawing 710*d* is added to the content, as shown in FIG. 7M.

Figure 7M:
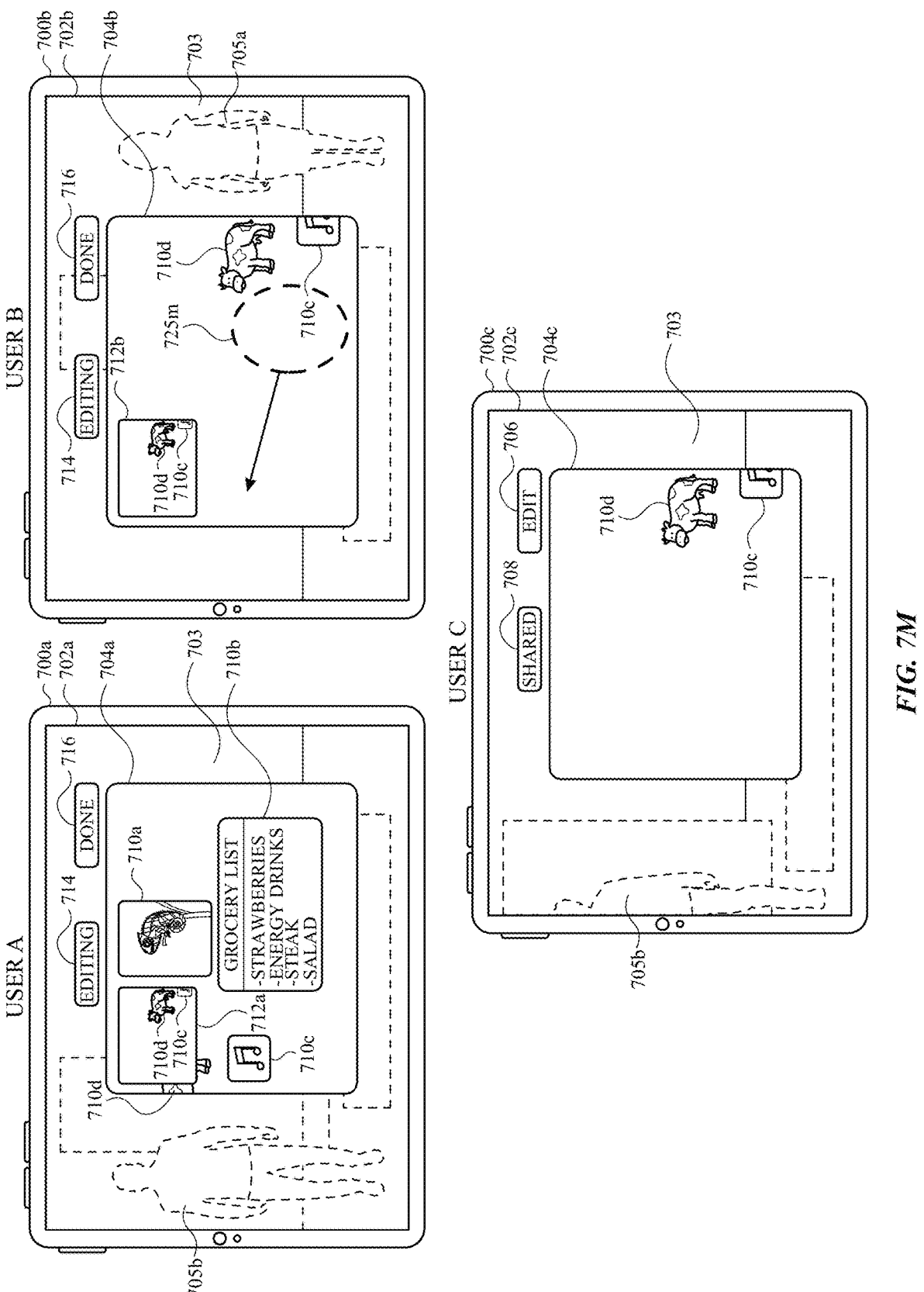
Figure 7N:
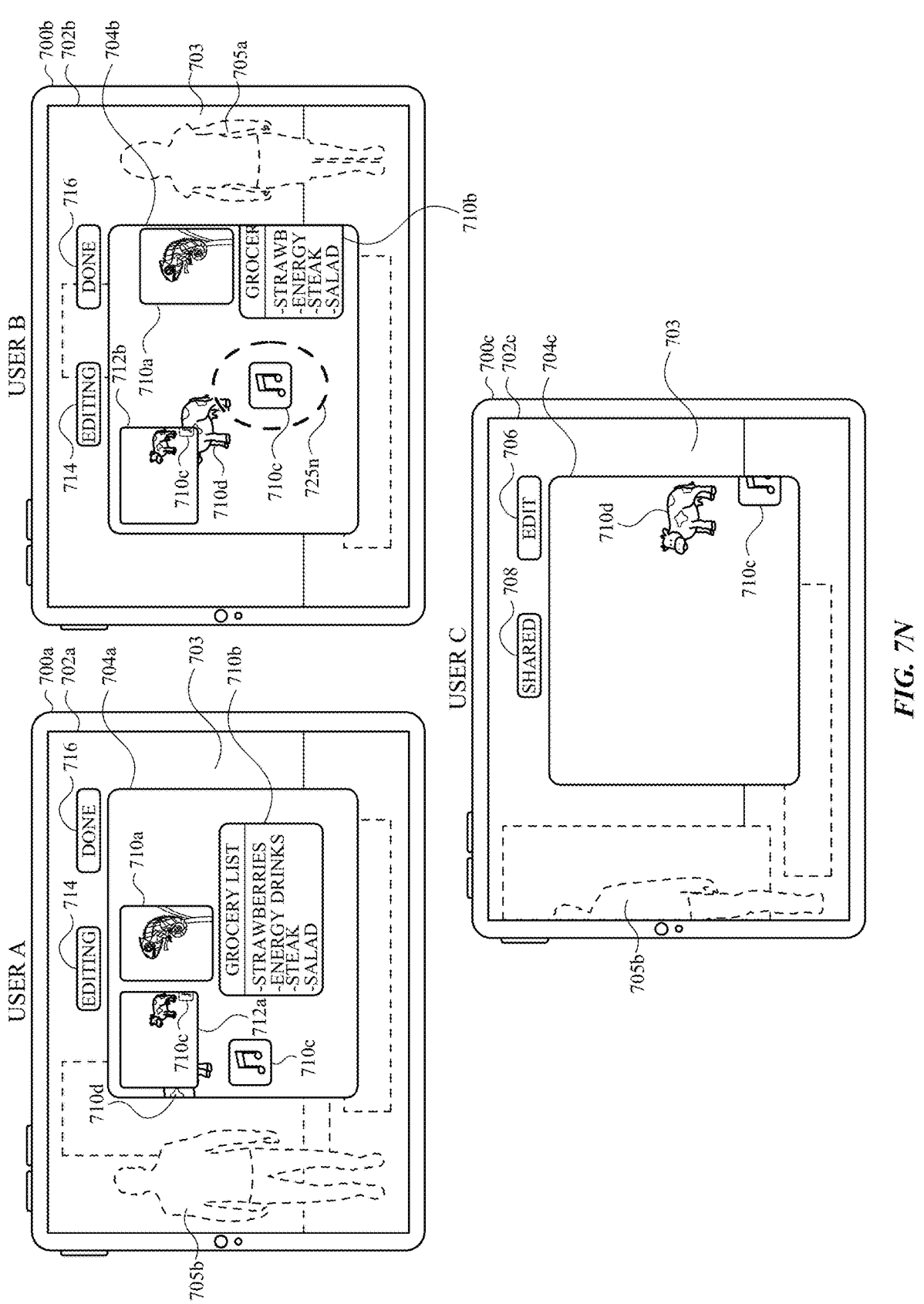

In FIG. 7M, computer system 700*b* detects request 725*m* to scroll view 704*b*. In response to detecting request 725*m*, computer system 700*b* scrolls view 704*b* as shown in FIG. 7N. Because computer system 700*b* is in the editing mode, view 704*b* is not synchronized with the view shared by other participants (e.g., the shared view) in the collaboration session. Because view 704*b* is not synchronized to the shared view, scrolling view 704*b* in response to request 725*m* does not change the shared view represented by view 704*c*, view 712*a*, and view 712*b* in FIG. 7N.

In FIG. 7N, computer system 700*b* detects request 725*n* to remove application icon 710*c* from the content shared in the collaboration session. In response to request 725*n*, application icon 710*c* is removed from the content, as shown in FIG. 7O.

Figure 7O:
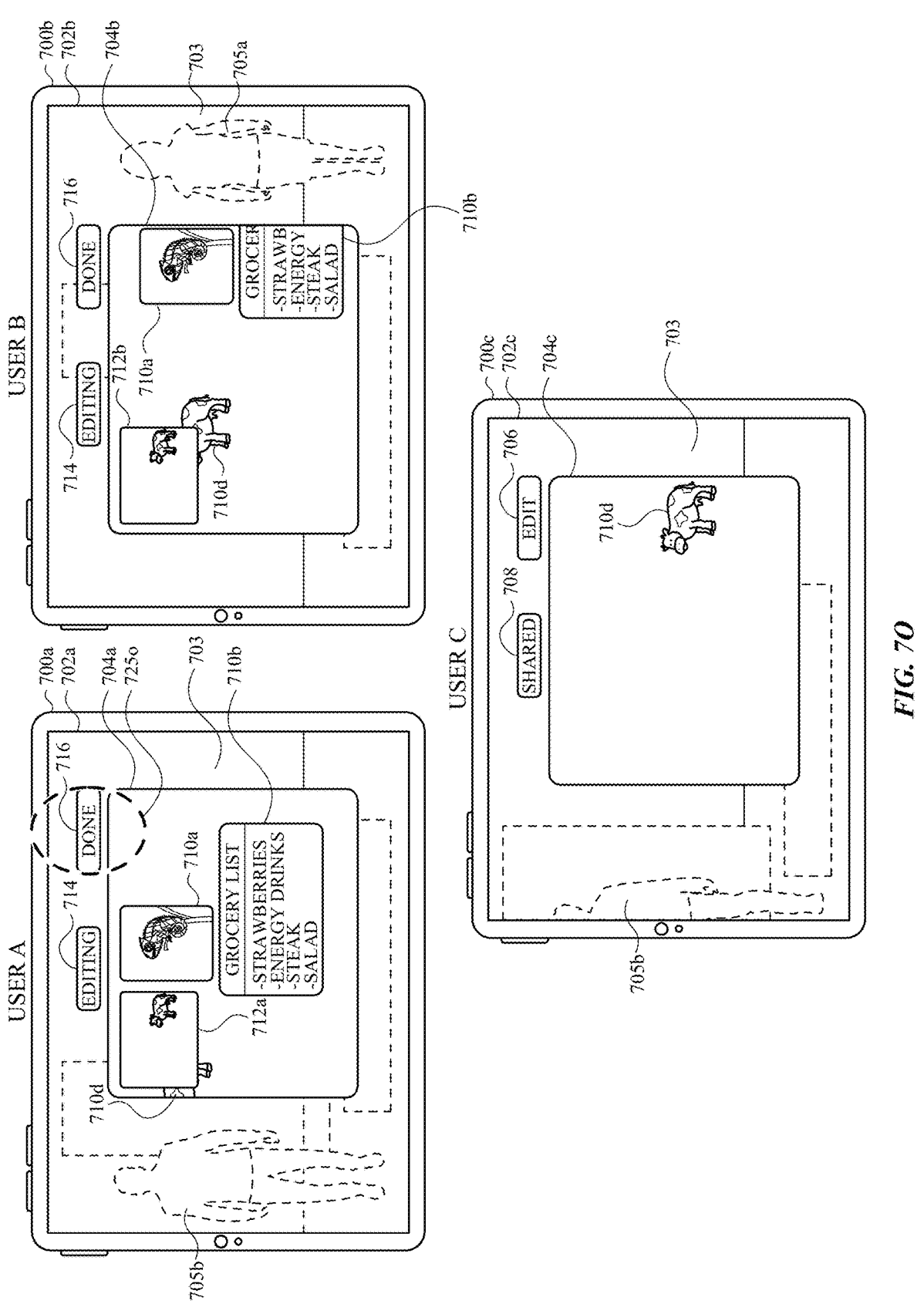

In FIG. 7O, computer system 700*a* detects request 725*o* (e.g., selection of done option 716) to exit the editing mode. In response to detecting request 725*o*, computer system 700*a* updates view 704*a* to the shared view of the content (e.g., re-synchronizes view 704*a* with the shared view), removes view 712*a*, and displays indicator 708, as shown in FIG. 7P1. Indicator 708 indicates that view 704*a* is a shared view of the content in the collaboration session.

Figure 7Q:
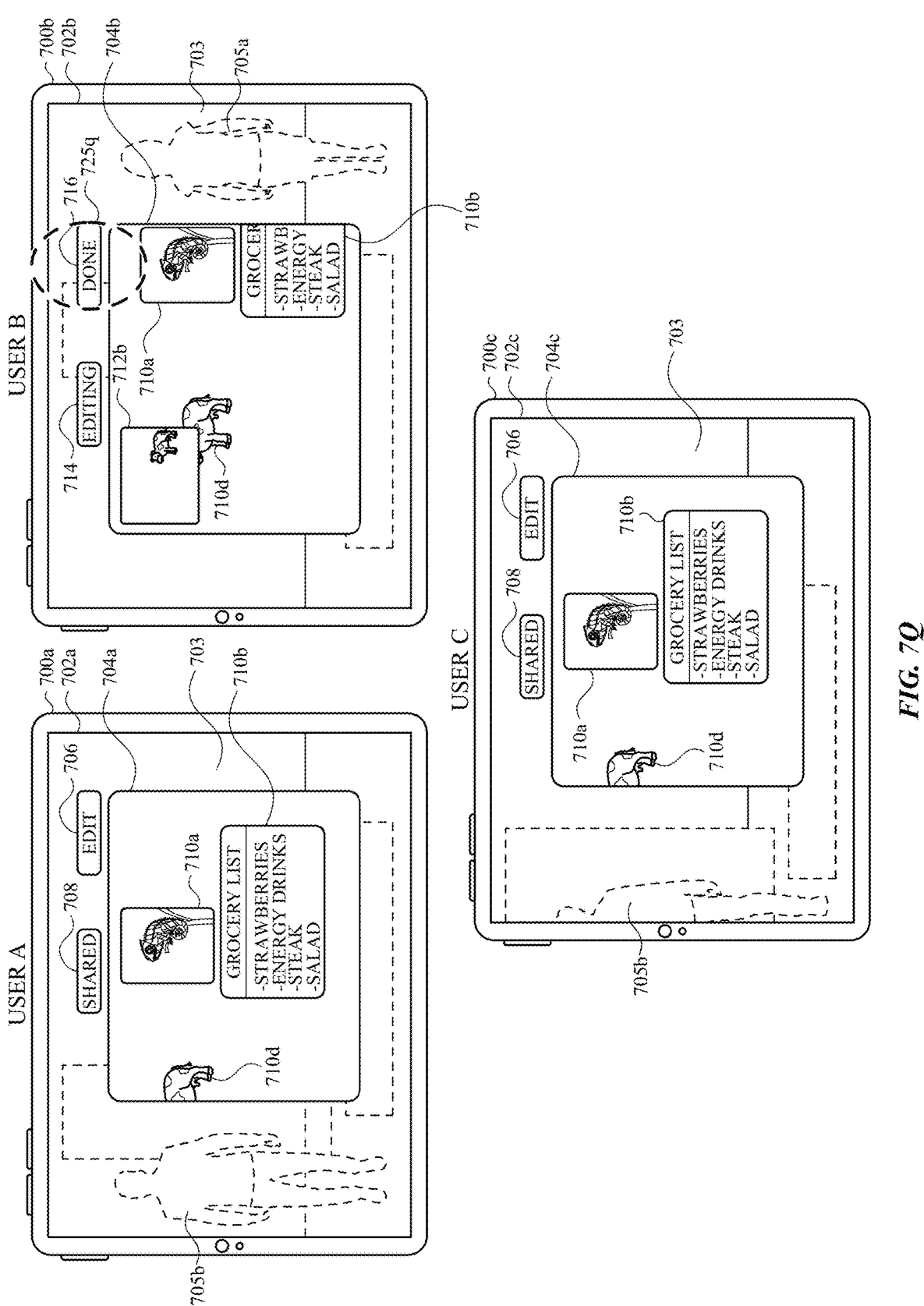
Figure 7R:
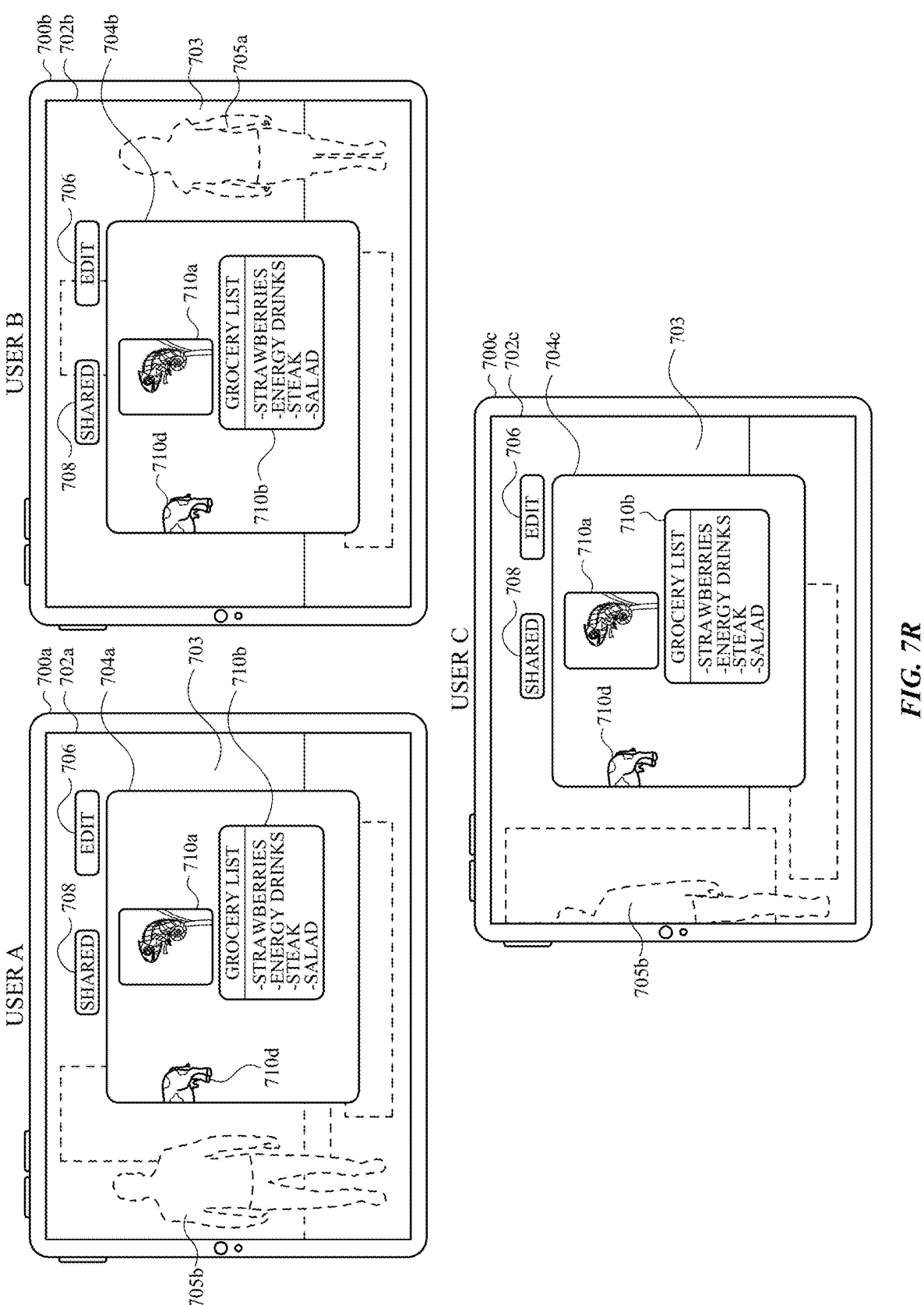

In FIG. 7P1, computer system 700*a* detects request 725*p* to scroll view 704*a*. In response to detecting request 725*p*, computer system 700*a* updates (e.g., scrolls) view 704*a* of the content according to request 725*p*, as shown in FIG. 7Q. Because view 704*a* in FIG. 7P1 is synchronized with the shared view, request 725*p* scrolls the shared view and view 704*c* and view 712*b* are updated in FIG. 7Q accordingly.

In some embodiments, the techniques and user interface(s) described in FIGS. 7A-7R are provided by one or more of the devices described in FIGS. 1A-1P. For example, FIGS. 7P2A-7P2C (e.g., corresponding to User A, User B, and User C in FIG. 7P1, respectively) illustrate an embodiment in which view 704*a*, view 704*b*, and view 704*c* (e.g., as described in FIG. 7P1) are displayed on display module X702*a* of head-mounted device (HMD) X700*a*, display module X702*b* of HMD X700*b*, and display module X702*c* of HMD X700*c*, respectively. In some embodiments, HMD X700*a*, HMD X700*b*, and HMD X700*c* include respective pairs of display modules that provide stereoscopic content to different eyes of the same user. For example, HMD X700*a* includes display module X702*a* (which provides content to a left eye of the user) and a second display module (which provides content to a right eye of the user). In some embodiments, the second display module displays a slightly different image than display module X702*a* to generate the illusion of stereoscopic depth.

In FIGS. 7P2A-7P2C, HMD X700*a* detects request X725*p* to scroll view 704*a*. In some embodiments, HMD X700 detects request X725*p* based on an air gesture performed by a user of HMD X700*a*. In some embodiments, HMD X700*a* detects hands X750A and/or X750B of the user of HMD X700*a* and determines whether motion of hands X750A and/or X750B perform a predetermined air gesture corresponding to request X725*p*. In response to detecting request X725*p*, HMD X700*a* updates (e.g., scrolls) view 704*a* of the content according to request X725*p* (e.g., as described with reference to FIG. 7Q). Because view 704*a* in FIG. 7P2A is synchronized with the shared view, request X725*p* scrolls the shared view, and view 704*c* on HMD X700*c* and view 712*b* on HMD X700*b* are updated accordingly (e.g., as described with reference to FIG. 7Q).

Any of the features, components, and/or parts, including the arrangements and configurations thereof shown in FIGS. 1B-1P can be included, either alone or in any combination, in HMD X700*a*, HMD X700*b*, and/or HMD X700*c*. For example, in some embodiments, HMD X700*a* includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702*a*, display module X702*b*, and/or display module X702*c* include any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700*a*, HMD X700*b*, and/or HMD X700*c* include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, HMD X700*a*, HMD X700*b*, and/or HMD X700*c* include any of the features, components, and/or parts of any of first button 1-128, button 11.1.1-114, second button 1-132, and or dial or button 1-328, either alone or in any combination. In some embodiments, HMD X700*a*, HMD X700*b*, and/or HMD X700*c* include one or more audio output components (e.g., electronic component 1-112) for generating audio feedback (e.g., audio output), optionally generated based on detected events and/or user inputs detected by the HMD X700.

In FIG. 7Q, computer system 700*b* detects request 725*q* to exit the editing mode. In response to detecting request 725*q*, computer system 700*b* updates view 704*b* to the shared view of the content, removes view 712*b*, and displays indicator 708 to indicate that view 704*a* is a shared view of the content in the collaboration session, as shown in FIG. 7R.

Additional descriptions regarding FIGS. 7A-7R are provided below in reference to method 800 described with respect to FIG. 8.

FIG. 8 is a flow diagram of an exemplary method 800 for collaborating on content, in some embodiments. In some embodiments, method 800 is performed at a computer system (e.g., computer system 101 in FIG. 1A) (e.g., 700*a*, 700*b*, 700*c*, X700*a*, X700*b*, and/or X700*c*) (e.g., a smart phone, a smart watch, a tablet computer, a laptop computer, a desktop computer, a wearable device, and/or head-mounted device) that is in communication with (e.g., includes and/or is connected to) one or more display generation components (e.g., display generation component 120 in FIGS. 1A, 3, and 4) (e.g., 702*a*, 702*b*, 702*c*, X702*a*, X702*b*, and/or X702*c*) (e.g., a visual output device, a display, a touch-sensitive display, a monitor, a 3D display, a display having at least a portion that is transparent or translucent on which images can be projected (e.g., a see-through display), a projector, a heads-up display, and/or a display controller) and one or more input devices (e.g., 125, X703*a*, X703*b*, X703*c*, 702*a*, 702*b*, and/or 702*c*) (e.g., a touch-sensitive surface (e.g., a touch-sensitive display); a mouse; a keyboard; a remote control; a visual input device (e.g., X704*a*, X704*b*, and/or X704*c*) (e.g., one or more cameras (e.g., an infrared camera, a depth camera, a visible light camera, and/or a gaze tracking camera)); an audio input device; and/or a biometric sensor (e.g., a fingerprint sensor, a face identification sensor, a gaze tracking sensor, and/or an iris identification sensor)). In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

While (802) the computer system is in a collaboration session (e.g., a real-time collaboration session) with two or more participants (e.g., the user of the computer system and one or more other participants associated with respective computer systems), wherein the collaboration session includes content (e.g., 710*a*, 710*b*, 710*c*, and/or 710*d*, individually or collectively) (e.g., a document, file, template, image, virtual object, virtual element, virtual whiteboard, virtual chalkboard, virtual canvas, and/or a portion or element thereof) that is configured to be edited in the collaboration session (e.g., in real-time) by the two or more participants, and wherein the computer system is associated with a first participant of the collaboration session: while (804) the computer system is in a first mode of the collaboration session (e.g., a mode in which the a participant cannot edit the content in the collaboration session, such as a read-only mode; and/or a mode in which the computer system displays, via the one or more display generation components, a view of the content that is synchronized with a view of the content provided to other participants in the collaboration session, such as a synchronized viewing mode; a mode in which the shared view of the content is displayed; and/or a mode in which the shared view of the content can be changed): the computer system displays (806), via the one or more display generation components, a first view (e.g., 704*a* in FIGS. 7A-7E, 7P1, 7P2A, and 7Q-7R; 704*b* in FIGS. 7A-7K and 7R; and/or 704*c* in FIGS. 7A-7R) (e.g., a synchronized view, a shared view, and/or a first portion) of the content, wherein the first view of the content is shared by the two or more participants in the collaboration session (e.g., 704*a* changes in response to 725*a*; and/or 704*b* changes in response to 725*b*). In some embodiments, an edit to the content made by one participant is viewable in the collaboration session (e.g., in real-time) by the other participants of the collaboration session (e.g., edits made by one participant are displayed at the computer systems of the other participants as the edits are made). In some embodiments, editing the content includes editing an element (e.g., a portion) of the content. In some embodiments, the collaboration session includes real-time communication (e.g., audio and/or video communication) between the participants. In some embodiments, the collaboration session includes a view of the content (referred to as a common view of the content and/or a shared view of the content) that is shared within the collaboration session and/or by the participants of the collaboration session. In some embodiments, the shared view of the content is updated (e.g., in the collaboration session and/or for all participants in the collaboration session) in response to a participant of the collaboration session changing (e.g., scrolling, panning, translating, zooming in, and/or zooming out) the shared view of the content. In some embodiments, a change and/or edit to the content made by a participant in the collaboration session is reflected (e.g., in real-time) in the shared view of the content (e.g., the shared view of the content is updated to include the change and/or edit to the content). In some embodiments, the first view of the content is the same as a view of the content provided to other participants of the collaboration session (e.g., the first view is a shared view or a common view). Displaying a first view of the content that is shared by the two or more participants in the collaboration session when the computer system is in the first mode allows users to see changes made by other participants to a view of the content, improves context and understanding between participants, and enables the participants to efficiently collaborate on content, thereby providing improved visual feedback to the user, reducing the number of inputs needed to perform an operation, and/or providing a more varied, detailed, and/or realistic user experience while saving storage space.

The computer system detects (808), via the one or more input devices, an input (e.g., 725*e* and/or 725*k*) corresponding to a request to enter a second mode (e.g., an editing mode) of the collaboration session that is different from the first mode of the collaboration session. In some embodiments, the request to enter the second mode includes (e.g., is) a request to edit the content in the collaboration session. In some embodiments, the request to enter the second mode includes (e.g., is) a request to enable the computer system and/or the first participant to edit the content in the collaboration session (e.g., without editing the content). In response to detecting the input corresponding to the request to enter the second mode of the collaboration session, the computer system enters (810) the second mode (e.g., a mode in which the first participant can edit the content in the collaboration session, such as an editing mode; and/or a mode in which the computer system displays, via the one or more display generation components, a view (e.g., an unsynchronized view) of the content that is not synchronized with a view (e.g., the shared view) of the content provided to other participants in the collaboration session, such as an unsynchronized viewing mode) of the collaboration session. A view of the content that is not synchronized with a view (e.g., the shared view) of the content provided to other participants in the collaboration session is referred to as an unsynchronized view. A view of the content that is synchronized with a view (e.g., the shared view) of the content provided to other participants in the collaboration session is referred to as a synchronized view. While (812) the computer system is in the second mode of the collaboration session: the computer system displays (814), via the one or more display generation components, a second view (e.g., 704a in FIGS. 7F-7O; and/or 704b in FIGS. 7L-7Q) (e.g., an unsynchronized view and/or a second portion) of the content (e.g., the computer system displays an unsynchronized view of the content that is not synchronized with the shared view of the content in the collaboration session); and in response to a second participant changing (e.g., scrolling, panning, translating, zooming in, and/or zooming out) a respective view (e.g., 704a in FIGS. 7A-7E and 7P1, 7P2A, and 7Q-7R; 704b in FIGS. 7A-7K and 7R; and/or 704c in FIGS. 7A-7R) of the content (e.g., a shared view of the content and/or a view of the content displayed at a computer system of the second participant) (e.g., the second participant changes the shared view of the content), the computer system displays (816), via the one or more display generation components, the second view of the content (e.g., without changing the second view of the content; the computer system maintains display of the second view; and/or the computer system does not change the view of content displayed via the one or more display generation components in response to the second participant changing the respective view of the content) (e.g., while the computer system is in the second mode of the collaboration session, the computer system displays an unsynchronized view of the content that is not synchronized with the shared view of the collaboration session) (e.g., the computer system displays a different portion (or a view of a different portion) of the content than a portion of the content included in the shared view of the content) (e.g., 704a on 700a does not change in response to 725j). Displaying the second view of the content in response to a second participant changing a respective view of the content while the computer system is in the second mode of the collaboration session enables a user to more quickly and efficiently edit content in a collaboration session by reducing interruptions to a user's view of the content while editing, thereby reducing the number of inputs needed to perform an operation.

In some embodiments, while the computer system is in the first mode of the collaboration session: in response to the second participant changing a magnification level of (e.g., resizing and/or zooming) the respective view of the content (e.g., a shared view of the content and/or a view of the content displayed at a computer system of the second participant) while the computer system is displaying the first view of the content, the computer system changes a magnification level of the first view of the content (e.g., without editing and/or changing a size of the content itself) (e.g., as described in FIGS. 7A-7B). In some embodiments, changing a magnification level includes zooming in and/or out (e.g., displaying a smaller portion of the content and/or a larger portion of the content). In some embodiments, changing the respective view of the content includes changing a magnification level of the respective view of the content (e.g., without editing and/or changing a size of the content itself). In some embodiments, the second participant changing the respective view of the content includes the second participant zooming (e.g., in and/or out) the respective view of the content (e.g., displaying a smaller portion of the content and/or a larger portion of the content).

In some embodiments, while the computer system is in the first mode of the collaboration session: in response to the second participant scrolling the respective view of the content (e.g., a shared view of the content and/or a view of the content displayed at a computer system of the second participant) while the computer system is displaying the first view of the content, the computer system scrolls the first view of the content (e.g., without editing the content and/or moving elements of the content within the content itself) (e.g., without changing an amount of the content that is displayed) (e.g., as described in FIGS. 7B-7C). In some embodiments, scrolling a view of the content includes hiding and/or revealing a portion of the content. In some embodiments, scrolling a view of the content includes displaying a different portion of the content (e.g., without editing the content and/or moving elements of the content within the content itself). In some embodiments, the second participant changing the respective view of the content includes the second participant scrolling the respective view of the content.

In some embodiments, while the computer system is in the first mode of the collaboration session: in response to the second participant performing an interaction (e.g., 725c) with an element (e.g., 710a) (e.g., a video or virtual element) of the content (e.g., an interaction that does not include editing the content or the element) while the computer system is displaying the first view of the content, the computer system displays, via the one or more display generation components, the interaction in the first view of the content (e.g., without editing the content or the element). In some embodiments, the interaction includes starting, stopping, forwarding, rewinding, and/or pausing playback of the element (e.g., a video). In some embodiments, the interaction includes an animation of the element (e.g., a virtual element). In some embodiments, the second participant changing the respective view of the content includes the second participant performing an interaction with an element of the content (e.g., an interaction that does not include editing the content).

In some embodiments, while the computer system is in the second mode of the collaboration session and the computer system is displaying the second view of the content (e.g., 704 in FIG. 7G) (e.g., an unsynchronized view of the content): the computer system detects, via the one or more input devices, a request (e.g., 725g) to change the view (e.g., the second view and/or an unsynchronized view) of the content; and in response to detecting the request to change the view of the content, the computer system displays, via the one or more display generation components, a third view (e.g., 704a in FIG. 7H) (e.g., an unsynchronized view) of the content that is different from the second view of the content (e.g., computer system changes the view of the content) (e.g., the third view includes a different portion of the content than the second view) without causing a view (e.g., 704b and/or 704c in FIG. 7G) of the content to change for the second participant (e.g., the view of the content changes on the computer system but not on a computer system of the second participant; the view of the content changes only on the computer system; the view of the content on the computer system is not synchronized with the view of the content on computer systems of other participants; the change in view of the content does not change the shared view of the collaboration session; and/or changing an unsynchronized view of the content on the computer system does not change the shared view). Displaying a third view of the content in response to detecting the request to change the view of the content without causing a view of the content to change for the second participant enables the user to adjust the view of the content in a manner that is more desirable (e.g., for editing and/or for another purpose other than collaborating) without other participants viewing the change to the view, thereby improving privacy and/or security and reducing the number of inputs needed to perform an operation.

In some embodiments, the request to enter the second mode of the collaboration session includes (e.g., is) an input (e.g., 725f, 725i, 725l, and/or 710c) for editing (e.g., changing an element of) the content (e.g., moving an element of the content, adding an element to the content, removing an element from the content, changing a color of the content, and/or modifying an element of the content). For example, in some embodiments, the computer system automatically enters the second mode of the collaboration session when the user edits the content. In some embodiments, the request to enter the second mode of the collaboration session includes a request to edit the content. In some embodiments, the request to enter the second mode of the collaboration session does not include an input (e.g., 725e and/or 725k) for editing the content (e.g., the request is a request specifically to enter the second mode of the collaboration session).

In some embodiments, while the computer system is in the second mode of the collaboration session: the computer system detects, via the one or more input devices, a request (e.g., 725l) to create a drawing (e.g., 710d) (e.g., a handwritten drawing, a mark, and/or a freeform input); and in response to detecting the request to create the drawing, the computer system adds the drawing to the content in the collaboration session (e.g., the drawing is viewable in the shared view of the content). In some embodiments, the drawing is viewable on the computer system in the second mode of the collaboration session (e.g., the computer system displays the drawing in an unsynchronized view of the content). In some embodiments, while the computer system is in the second mode of the collaboration session: the computer system detects, via the one or more input devices, a request (e.g., 725f) to move an element (e.g., 710a) (e.g., a two-dimensional element or a three-dimensional element) of the content; and in response to detecting the request to move the element of the content, the computer system moves the element of the content (e.g., relative to and/or within the content) in the collaboration session (e.g., moving the element is viewable in the shared view of the content). In some embodiments, moving the element is viewable on the computer system in the second mode of the collaboration session (e.g., the computer system displays the movement in an unsynchronized view of the content). In some embodiments, while the computer system is in the second mode of the collaboration session: the computer system detects, via the one or more input devices, a request (e.g., 725l and/or 725n) to change a number of elements (e.g., two-dimensional elements and/or three-dimensional elements) in the content (e.g., a request to add one or more elements to the content and/or a request to remove one or more elements from the content); and in response to detecting the request to change the number of element in the content, the computer system changes the number of elements in the content in the collaboration session (e.g., the change in number of the elements is viewable in the shared view of the content) (e.g., adding 710d and/or removing 710c). In some embodiments, the change in number of the elements is viewable on the computer system in the second mode of the collaboration session (e.g., the computer system displays the change in number of the elements in an unsynchronized view of the content).

In some embodiments, while the computer system is in the collaboration session, in response to the second participant making a first edit to the content (e.g., 725f, 725i, 725l, and/or 725n), the computer system displays (e.g., in a synchronized view of the content and/or an unsynchronized view of the content), via the one or more display generation component, the content with the first edit (e.g., regardless of whether the computer system is in the first mode of collaboration session or the second mode of the collaboration session) (e.g., 710c is removed from 704a in response to 725n). Displaying the content with the first edit in response to the second participant making an edit automatically provides a user with information about the state of the content, thereby providing improved visual feedback to the user. In some embodiments, while the computer system is in the second mode of the collaboration session, the computer system detects, via the one or more input devices, an input (e.g., 725f) corresponding to a request to make a second edit to the content; and in response to detecting the input corresponding to the request to make the second edit to the content: the computer system edits the content to include the second edit in the collaboration session; and the computer system displays, via the one or more display generation components, the content with the second edit (e.g., the computer system edits the content to include the second edit), wherein the second edit is visible (e.g., in the shared view and/or a synchronized view) to the second participant in the collaboration session (e.g., while a computer system of the second participant is in the first mode of the collaboration session of the second mode of the collaboration session) (e.g., 710a is moved in 704b in FIG. 7G). Displaying the content with the second edit and making the second edit visible to the second participant provides the participants with information about the state of the content, thereby providing improved visual feedback to the user and providing a more varied, detailed, and/or realistic user experience while saving storage space.

In some embodiments, in accordance with a determination that the computer system is in the second mode of the collaboration session, the computer system displays, via the one or more display generation components, an indication (e.g., 714, 716, 712a, and/or 712b) (e.g., a graphical element, text, an animation, and/or a color) that a view (e.g., an unsynchronized view) of the content displayed via the one or more display generation components is not synchronized (e.g., is not spatially synchronized) with a view (e.g., the shared view) of the content displayed by other participants in the collaboration session. In some embodiments, in accordance with a determination that the computer system is in the first mode of the collaboration session, the computer system displays, via the one or more display generation components, a view of the content without displaying the indication that the view of the content displayed via the one or more display generation components is not synchronized with a view of the content displayed by other participants in the collaboration session.

In some embodiments, in response to detecting the input corresponding to the request to enter the second mode of the collaboration session, the computer system displays, via the one or more display generation components, a representation (e.g., 712a and/or 712b) of a synchronized view of the content that is synchronized between the participants of the collaboration session (e.g., a representation of the shared view). In some embodiments, displaying the representation of the synchronized view of the content includes displaying the representation of the synchronized view of the content within (e.g., overlaid on) a user interface (e.g., 712a and/or 712b) that includes the second view (e.g., an unsynchronized view) of the content (e.g., within and/or overlaid on the second view of the content). In some embodiments, the representation of the synchronized view of the content is displayed at a smaller size than the second view of the content (e.g., as a picture-in-picture window). In some embodiments, the computer system moves the representation of the synchronized view of the content in response to detecting an input. In some embodiments, displaying the representation (e.g., 712a and/or 712b) of the synchronized view of the content includes displaying the representation of the synchronized view of the content concurrently with the second view (e.g., 704a in FIGS. 7F-7O; and/or 704b in FIGS. 7L-7Q) (e.g., an unsynchronized view) of the content (e.g., with a view of the content in which the content can be edited and that is not synchronized). In some embodiments, the representation of the synchronized view of the content is at a position that is separate from a position of the second view of the content. In some embodiments, displaying the representation (e.g., 712a and/or 712b) of the synchronized view of the content includes displaying the representation of the synchronized view of the content at a position in a three-dimensional environment that is farther away than the second view (e.g., 704a in FIGS. 7A-7E, 7P1, 7P2A, and 7Q-7R; 704b in FIGS. 7A-7K and 7R; and/or 704c in FIGS. 7A-7R) (e.g., an unsynchronized view) of the content (e.g., a view in which the content can be edited) relative to a viewpoint of the user of the computer system. In some embodiments, while displaying the second view of the content and the representation of the synchronized view of the content, the computer system detects, via the one or more input devices, a request (e.g., 725g) to change the second view of the content (e.g., to scroll, translate, and/or zoom an unsynchronized view of the content that, optionally, is used for editing the content); and in response to detecting the request to change the second view of the content, the computer system changes the second view of the content without changing the representation (e.g., 712a) of the synchronized view of the content (e.g., translating, zooming, and/or scrolling the unsynchronized and/or editable view of the content does not affect the representation of the synchronized view of the content).

In some embodiments, while the computer system is in the second mode of the collaboration session, the computer system detects, via the one or more input devices, a request (e.g., 725o and/or 725q) to switch to the first mode of the collaboration session (e.g., a request to exit an editing mode and/or to exit an unsynchronized viewing mode); and in response to detecting the request to switch to the first mode of the collaboration session, entering the first mode (e.g., a synchronized viewing mode) of the collaboration session and exiting the second mode of the collaboration session, wherein entering the first mode of the collaboration session includes displaying, via the one or more display generation components, a fourth view of the content (e.g., 704a in FIG. 7P1, 704a in FIG. 7P2A, and/or 704b in FIG. 7R) that is synchronized with a view (e.g., the shared view) of the content provided to other participants of the collaboration session. In some embodiments, the request to switch to the first mode of the collaboration session includes an input (e.g., 725o and/or 725q) corresponding to selection of a back user interface element (e.g., 716) (e.g., a selectable button, a selectable icon, a user-interactive graphical user interface element, and/or an affordance) displayed via the one or more display generation components. In some embodiments, the request to switch to the first mode of the collaboration session includes an input corresponding to selection of a representation (e.g., 712a and/or 712b) of a synchronized view (e.g., the shared view) of the content (e.g., a spatially synchronized view of the content; a view of the content in which the content cannot be edited; and/or a view of the content that is common to and/or shared by other participants of the collaboration session). In some embodiments, while the computer system is in the collaboration session, the computer system displays, via the one or more display generation components, a representation (e.g., text, names, avatars, photos, and/or video feeds) of the participants (e.g., User A, User B, and/or User C) in the collaboration session, wherein the request to switch to the first mode of the collaboration session includes an input (e.g., a tap, a gaze, and/or an air gesture) corresponding to selection of the representation of the participants in the collaboration session. In some embodiments, in response to detecting the request to switch to the first mode of the collaboration session, the computer system ceases display of (e.g., closing) the second view (e.g., 704a in FIGS. 7F-7O; and/or 704b in FIGS. 7L-7Q) of the content (e.g., ceasing display of an unsynchronized view of the content in which the content can be edited).

In some embodiments, while the computer system is in the second mode of the collaboration session and while displaying the second view of the content (e.g., 704a in FIG. 7J), the second participant (User B) changes (e.g., via input 725j) a view (e.g., the shared view) of the content (e.g., zooms, scrolls, and/or pans a view of the content that is shared by the participants of the collaboration session and/or a view of the content that is common among the participants of the collaboration session); and in response to the second participant changing the view of the content, the computer system maintains display of the second view (e.g., an unsynchronized view) of the content (e.g., the computer system does not change the unsynchronized view of the content in response to changes by other participants to the shared view of the content) (e.g., 704a does not change from FIG. 7J to FIG. 7K).

In some embodiments, while the computer system is in the second mode of the collaboration session and while displaying the second view of the content, the second participant changes a view (e.g., the shared view) of the content (e.g., zooms, scrolls, and/or pans a view of the content that is shared by the participants of the collaboration session) to a fifth view of the content; the computer system detects, via the one or more input devices, a request (e.g., 725o and/or 725q) to switch (e.g., return) to the first mode (e.g., a synchronized viewing mode) of the collaboration session; and in response to detecting the request to switch to the first mode of the collaboration session, the computer system displays, via the one or more display generation components, the fifth view (e.g., 704a in FIG. 7P1, 704a in FIG. 7P2A, and/or 704b in FIG. 7R) (e.g., the shared view) of the content (e.g., when the computer system exits the editing mode, the computer system updates display of the content to a view of the content that is shared in the collaboration session and/or a view that is common among the participants of the collaboration session). In some embodiments, displaying the fifth view of the content includes displaying an animation (e.g., over time) that includes ceasing display of the second view (e.g., an unsynchronized view) of the content and displaying the fifth view (e.g., the shared view and/or a synchronized view) of the content (e.g., displaying an animation of the transition of 704a from FIG. 7O to FIG. 7P1; and/or displaying an animation of the transition of 704b from FIG. 7Q to FIG. 7R).

In some embodiments, the collaboration session includes a real-time communication session between two or more of the two or more participants. In some embodiments, the computer system provides (e.g., outputs audio and/or displays a user interface of) a real-time (e.g., live) communication session. In some embodiments, representations of participants of the real-time communication session are displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying a representation of a participant's body (e.g., facial expression, body expression, body position, and/or body movement) via the representation of the participant. In some embodiments, providing the real-time communication session includes displaying the representation of the participant and/or outputting audio corresponding to utterances of the participant in real time. In some embodiments, the computer system and one or more other (e.g., remote) computer systems are in communication (e.g., wireless communication) with one another to enable transmission of information indicative of the representation of the participant and/or audio corresponding to utterances of the participant between the computer system and the one or more other computer systems. In some embodiments, a real-time communication session includes an XR experience (e.g., an XR environment). In some embodiments, the real-time communication session includes displaying a representation of the first participant (and, optionally, a representation of a second participant) in an XR environment via display generation components of the computer system and the one or more other computer systems in communication via the real-time communication session. In some embodiments, the real-time communication session includes (e.g., is provided and/or performed in) an extended reality environment (e.g., a three-dimensional environment). In some embodiments, the computer system displays a view of the content of the collaboration session in the extended reality environment). In some embodiments, the second participant is in (e.g., is present in, is co-present with the first participant in, and/or includes an avatar in) the extended reality environment (e.g., via a head mounted display device); and the two or more participants of the collaboration session include a third participant that is not in the extended reality environment (e.g., the third participant participates in the collaboration session without being present in the extended reality environment) (e.g., User C is not in the extended reality environment). In some embodiments, the third participant participates in the collaboration session via a laptop computer, a desktop computer, a tablet computer, a phone, and/or a computer system that is not configured to provide the extended reality environment and/or an extended reality experience. In some embodiments, while the computer system is in the collaboration session, the computer system displays, via the one or more display generation component, a representation (e.g., 705a and/or 705b) of the second participant. In some embodiments, the computer system displays a representation of the two or more participants of the collaboration session. In some embodiments, the representation of the second participant includes text, a name, an avatar, a photo, and/or a video feed. In some embodiments, in accordance with a determination that the second participant is editing (e.g., actively and/or currently editing) the content in the collaboration session, the computer system displays the representation of the second participant with a first appearance (e.g., the representation is visible and/or displayed with a first color, highlighting, and/or other indication); and in accordance with a determination that the second participant is not editing (e.g., not actively and/or currently editing) the content in the collaboration session, the computer system displays the representation of the second participant with a second appearance (e.g., the representation is not visible and/or is displayed with a second color, highlighting, and/or other indication) that is different from the first appearance, or the computer system displays a view of the content without displaying the representation of the second participant. Displaying a representation of the second content provides context to a user and improves communication between participants, thereby providing a more varied, detailed, and/or realistic user experience while saving storage space. In some embodiments, displaying the representation (e.g., 705a and/or 705b) of the second participant includes displaying a spatial representation (e.g., a spatial coin and/or avatar) of the second participant.

In some embodiments, while the computer system is in a first mode of the collaboration session: in response to the second participant (e.g., User A) changing (e.g., via 725b) (e.g., scrolling, panning, translating, zooming in, and/or zooming out a view of the content) the respective view of the content (e.g., a shared view of the content and/or a view of the content displayed at a computer system of the second participant) (e.g., the second participant changes the shared view of the content) while the computer system is displaying the first view (e.g., 704b in FIG. 7B) of the content, the computer system displays, via the one or more display generation components, a sixth view (e.g., 704b in FIG. 7C) (e.g., an updated synchronized view and/or a different portion) of the content that is different from the first view of the content (e.g., the computer system changes from displaying the first view of the content to the sixth view of the content) (e.g., the computer system updates the displayed view of the content to the shared view of the content) (e.g., the computer system displays a view of the content that is synchronized with the shared view). In some embodiments, displaying the sixth view of the content includes changing the view of the content in accordance with (e.g., to match) the change in the respective view of the content by the second participant (e.g., to match the shared view).

Figure 9A:
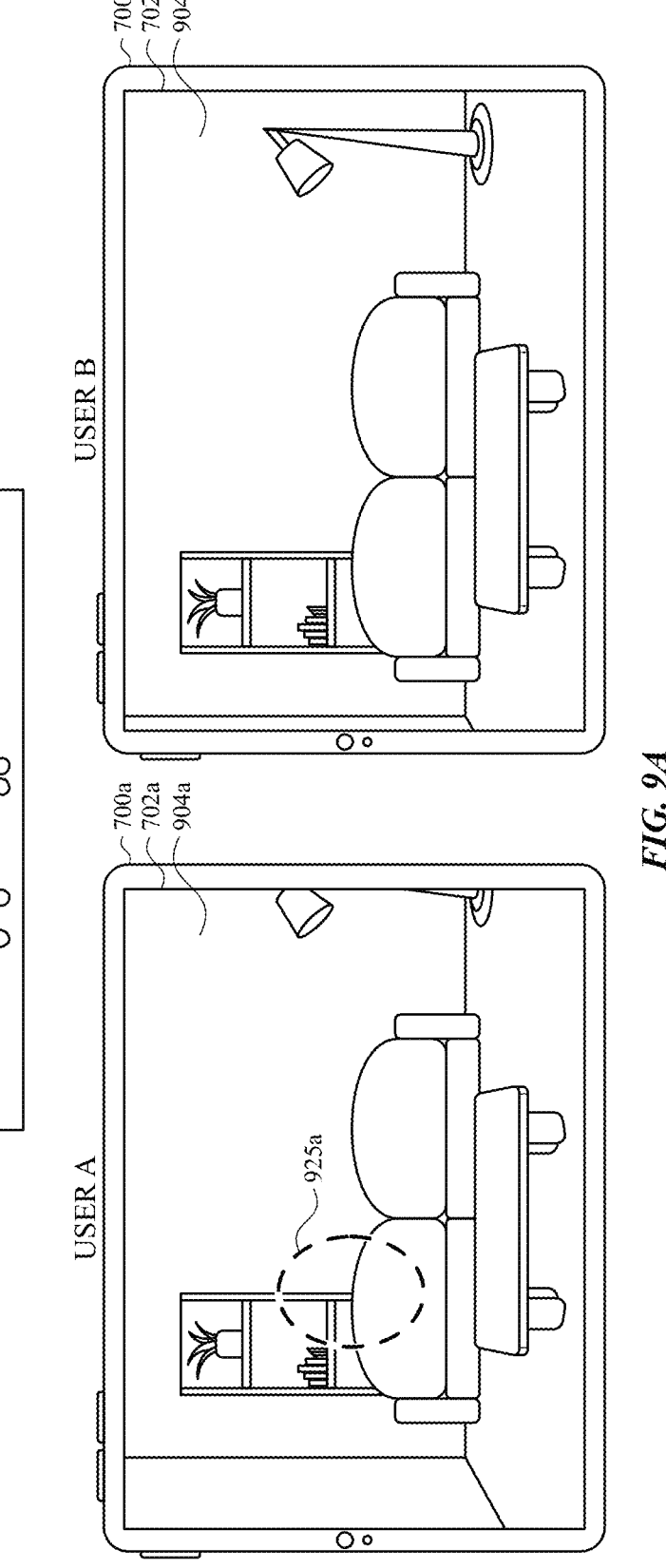

FIGS. 9A-9K illustrate examples of displaying content in a shared computer-generated environment. FIG. 10 is a flow diagram of an exemplary method 1000 for displaying content in a shared computer-generated environment. The user interfaces in FIGS. 9A-9K are used to illustrate the processes described below, including the processes in FIG. 10. In some embodiments, the user interfaces described in FIGS. 9A-7K are displayed on a head-mounted device and a user provides inputs (e.g., to select, add, share, manipulated, and/or edit content in a three-dimensional environment as described below) using air gestures, voice commands, and/or inputs on a remote control.

FIG. 9A illustrates computer system 700a associated with User A and computer system 700b associated with User B. Computer system 700a and computer system 700b are described above. In FIG. 9A, User A and User B are in a shared extended reality environment 900 via computer system 700a and computer system 700b, respectively. Diagram 902a illustrates the positions (e.g., the physical and/or virtual positions) of User A and User B in the extended reality environment. As shown in diagram 902a, User A and User B are next to each other and facing in the same direction. Computer system 700a displays view 904a of environment 900, and computer system 700b displays view 904b of environment 900. Based on the position of User A and User B represented in diagram 902a, view 904a and view 904b are similar, but slightly offset from one another.

Figure 9B:
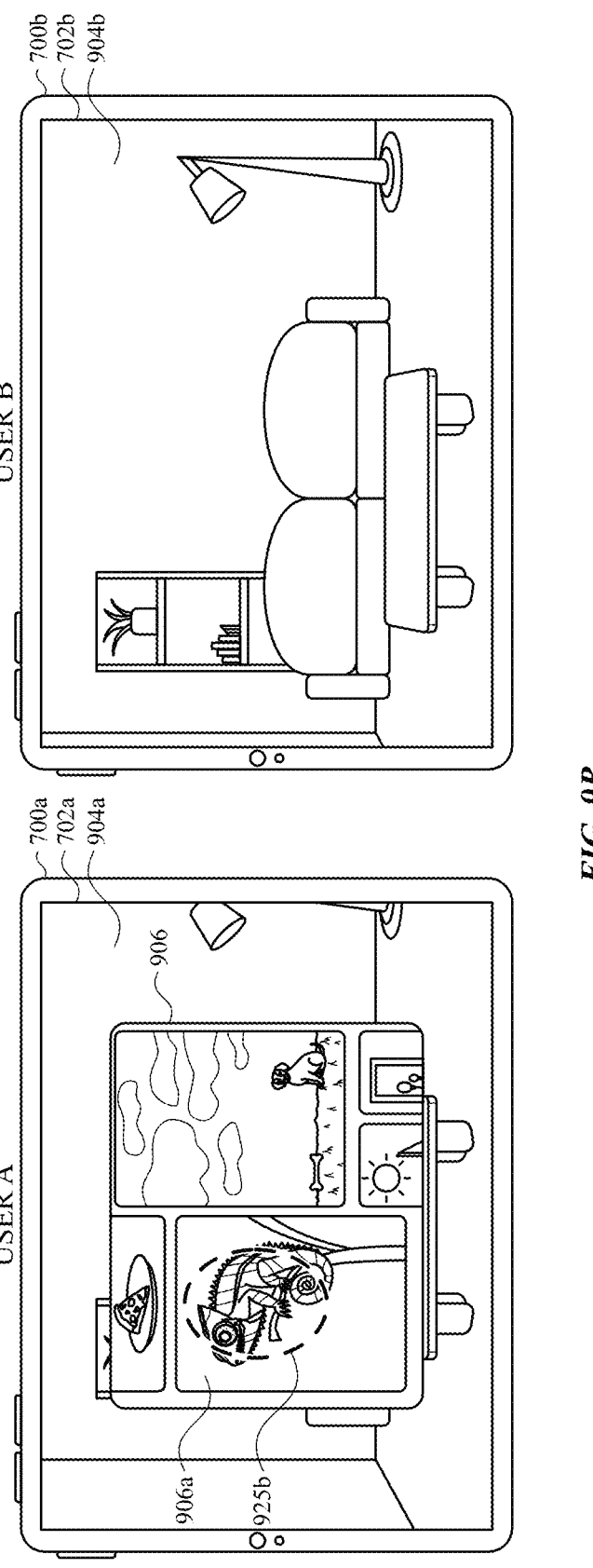

In FIG. 9A, computer system 700a detects request 925a to display a user interface for selecting content. In response to detecting request 925a, computer system 700a displays user interface 906 as shown in FIG. 9B. In the embodiment illustrated in FIG. 9B, user interface 906 is a content library that includes content items such as, e.g., photos, videos, documents, and/or other content items. In the embodiment illustrated in FIG. 9B, user interface 906 is not shared in environment 900, and therefore, is not displayed on computer system 700b. In some embodiments, computer system 700b displays user interface 906 in response to request 925a. In some embodiments, user interface 906 is added to and/or shared in environment 900 in response to request 925a.

Figure 9C:
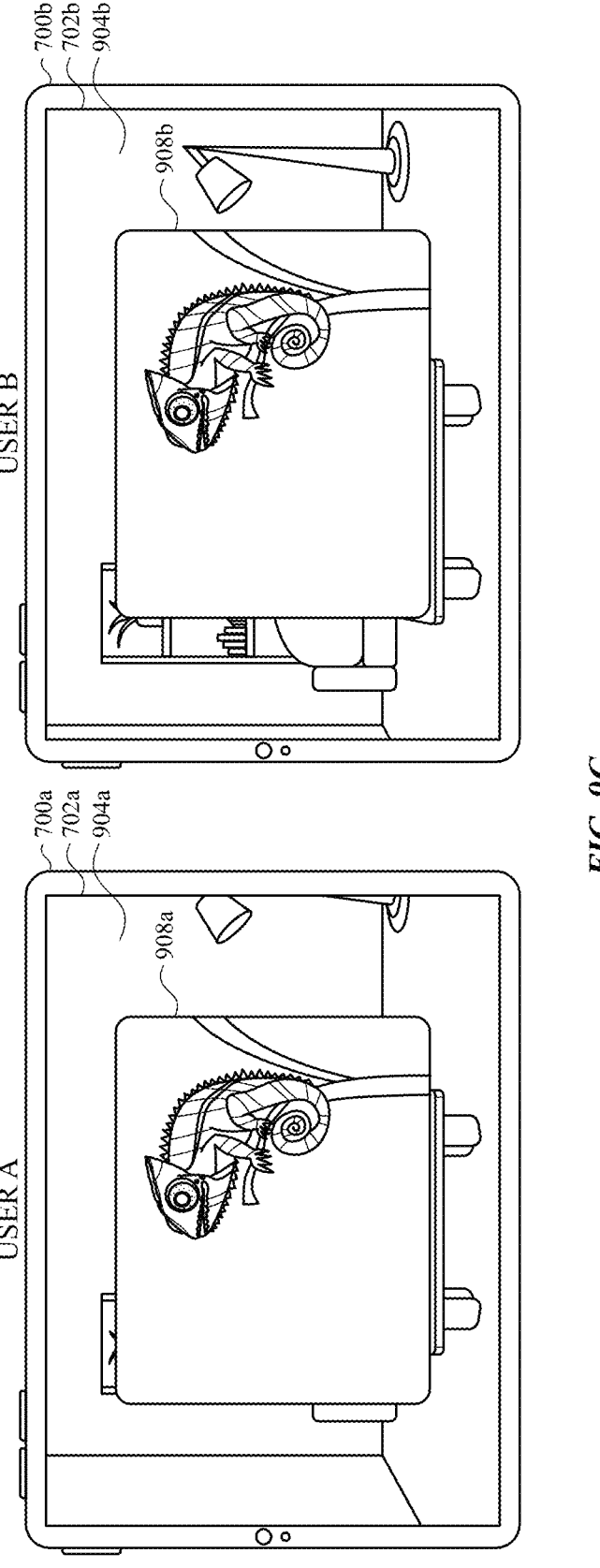
Figure 9D:
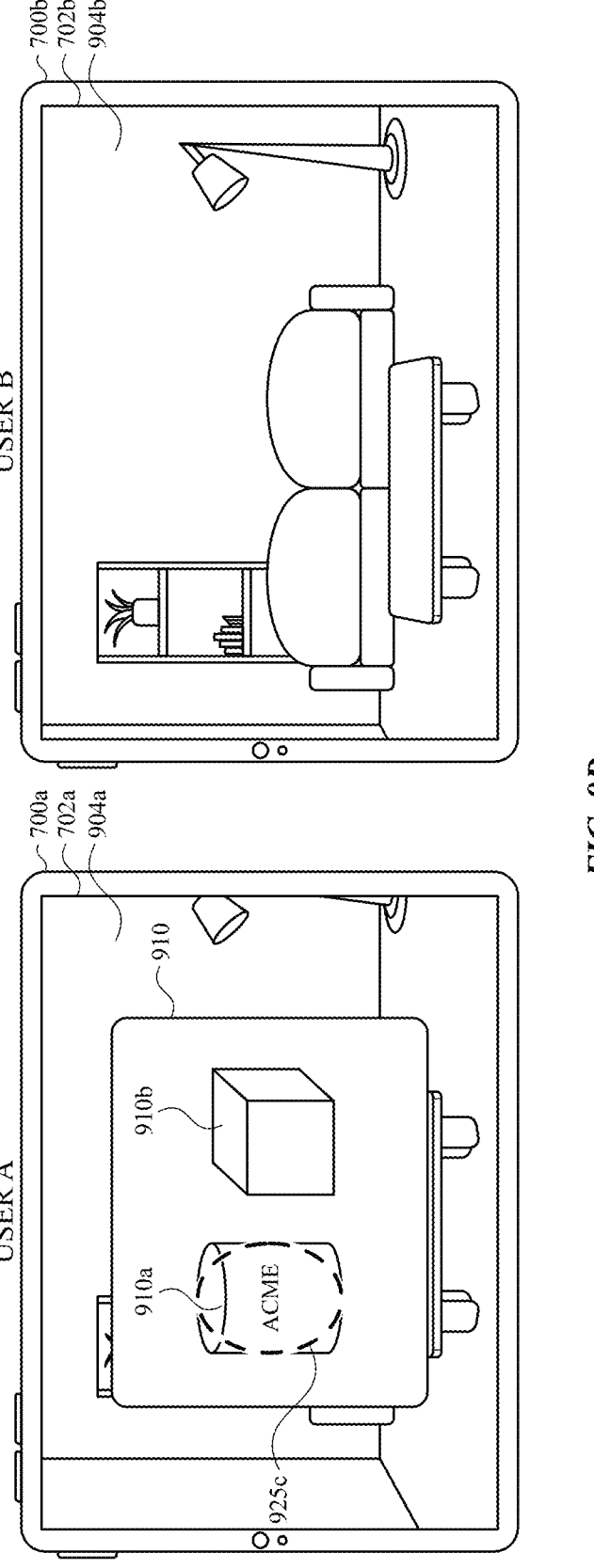

In FIG. 9B, computer system 700a detects selection 925b of content item 906a. In response to detecting selection 925b, the content corresponding to content item 906a is added to environment 900 within the view of environment 900 of User A and User B. As a result, computer system 700a displays representation 908a of the content added to environment 900, and computer system 700b displays representation 908b of the content added to environment 900, as shown in FIG. 9C. In the embodiment illustrated in FIG. 9C, the content represented by representation 908a and representation 908b is two-dimensional (e.g., has no depth or has little depth relative to the height and/or width of the content. In some embodiments, representation 908a and/or representation 908b includes a curved panoramic image (e.g., that is displayed on a spherical or cylindrical surface).

Figure 9E:
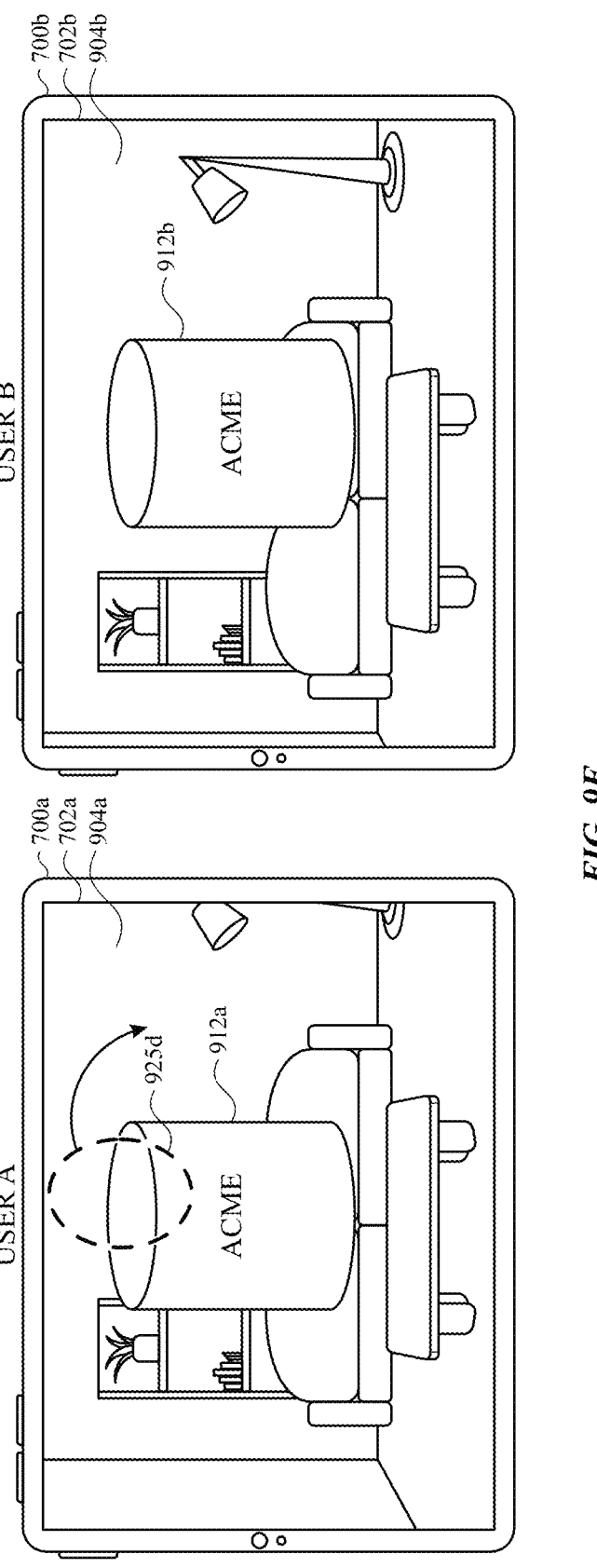

In the embodiment illustrated in FIG. 9C, the content represented by representation 908a is a type of content (e.g., two-dimensional content) that cannot be edited and/or manipulated by a user in environment 900. In some embodiments, a user can add certain types of content (e.g., virtual three-dimensional objects) to environment 900 that can be edited and/or manipulated in environment 900 by a user. For example, in FIG. 9D, computer system 700a displays (e.g., in environment 900) user interface 910, which includes representation 910a of a first three-dimensional object (e.g., a cylinder) and representation 910b of a second three-dimensional object (e.g., a cube). Computer system 700a detects request 925c to share the first three-dimensional object with User B (e.g., to add the shared object to environment 900 and/or to send the shared object to User B). The first three-dimensional object is also referred to as the shared object. In response to detecting request 925c, computer system 700 displays representation 912a of the shared object in representation 904a of environment 900, as shown in FIG. 9E. In some embodiments, computer system 700a adds the shared object to environment 900. In some embodiments, computer system 700a sends information (e.g., a data file, a 3D drawing file, and/or a 3D rendering file) representing the shared object to computer system 700b (e.g., via a wireless network, directly, and/or via a server) that enables computer system 700b to display representation 912b of the shared object (e.g., as if the shared object is in environment 900).

Figure 9F:
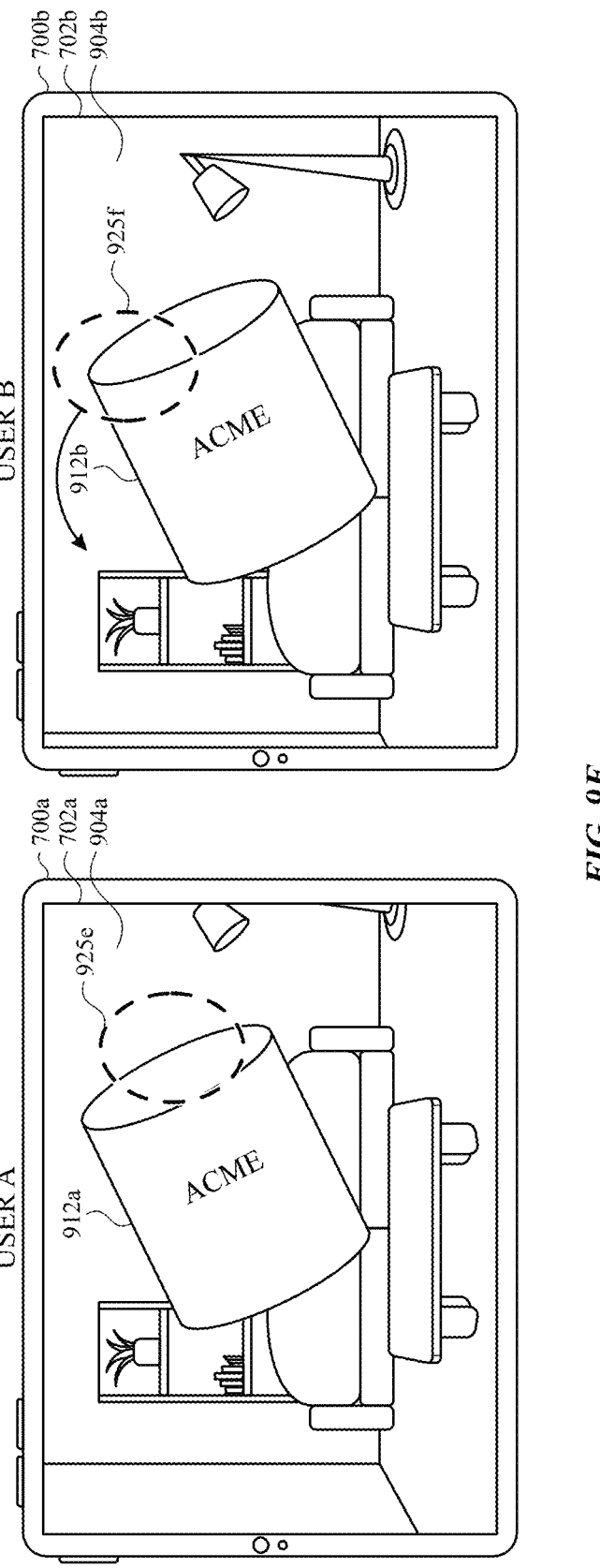

In FIG. 9E, computer system 700a detects interaction 925d with representation 912a of the shared object. In the embodiment illustrated in FIG. 9E, interaction 925d corresponds to a request to rotate the shared object clockwise (from the perspective of User A), to enlarge the shared object (or representation 912a of the shared object), and/or to change a location of the shared object in environment 900. As shown in FIG. 9F, in response to detecting interaction 925d, computer system 700a and computer system 700b update representation 912a and representation 912b, respectively, according to interaction 925d. In some embodiments in which the shared object is included in environment 900, the state of the shared object in environment 900 is updated. In some embodiments in which computer system 700a and computer system 700b have local versions of the shared object, information about the state of the shared object is sent (e.g., by computer system 700a) to computer system 700b, which enables computer system 700b to display representation 912b in the same state as representation 912a. Sharing the state of the shared object enables the state of representation 912a on computer system 700a to be synchronized with the state of representation 912b on computer system 700b. Sharing the state of the shared object (e.g., as opposed to data representing the shared object itself) reduces the resources (e.g., bandwidth, memory, and/or processing) used to display representation 912a and/or representation 912b, which can reduce the lag between an interaction that changes the state of the shared object and updating the state of representation 912a and/or representation 912b.

Figure 9G:
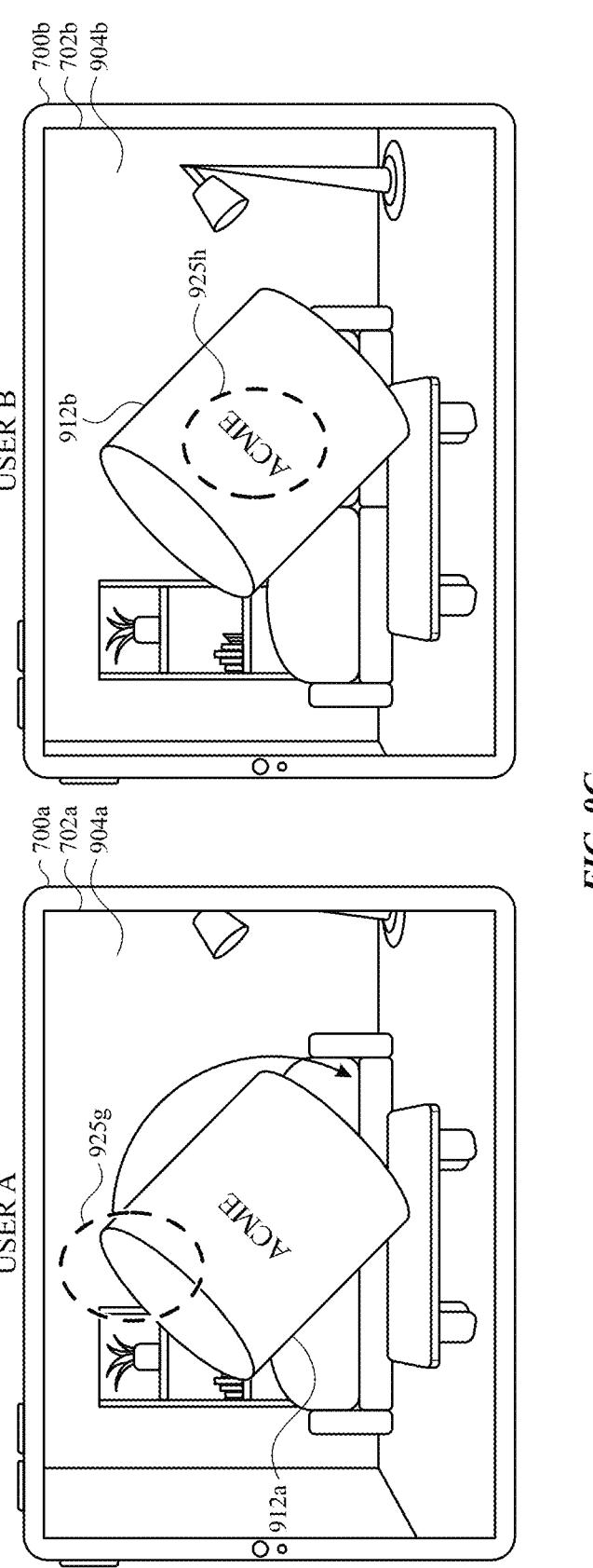

In some embodiments, User B of computer system 700b can manipulate the shared object. In some embodiments, User B of computer system 700b can take control of the shared object while User A is manipulating the shared object. For example, in FIG. 9F, while computer system 700a is detecting interaction 925e with representation 912a, computer system 700b detects interaction 925f with representation 912b. In some embodiments, interaction 925c at computer system 700a is a continuation of interaction 925d in FIG. 9E. In response to interaction 925f, User B (e.g., via computer system 700b) obtains control of the shared object and the shared object is manipulated according to interaction 925f (e.g., instead of interaction 925c). In the embodiment illustrated in FIG. 9F, interaction 925f corresponds to a counterclockwise rotation of representation 912b. In response to interaction 925f, the shared object is rotated counterclockwise and representation 912a and representation 912b are updated accordingly, as shown in FIG. 9G.

Figure 9H:
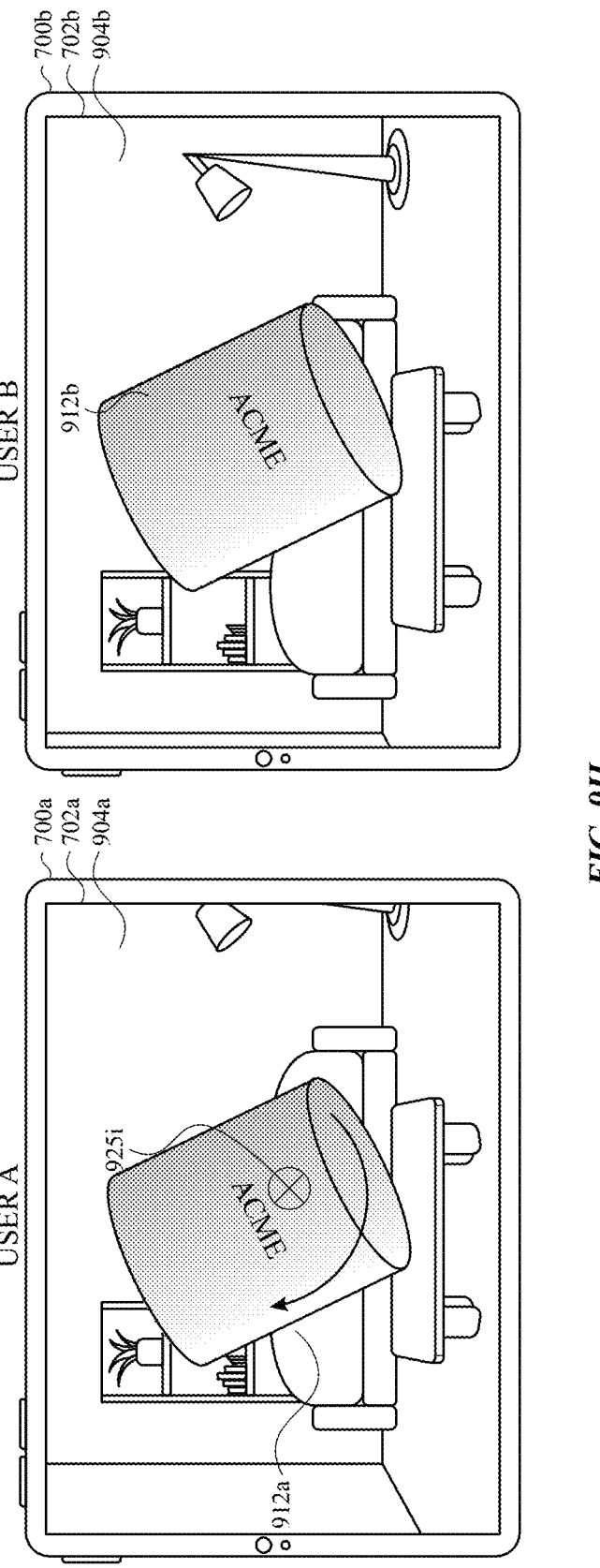

In some embodiments, User A can re-take control of the shared object (e.g., via computer system 700a). For example, User A can re-take control of the shared object by ending a previous interaction (e.g., 925e) and initiating a new interaction with representation 912a, such as interaction 925g in FIG. 9G. In some embodiments, control of the shared object is determined by the most recently initiated interaction. In FIG. 9G, in response to initiation of interaction 925g (e.g., while interaction 925f is ongoing), control of the shared object is provided to User A (e.g., via computer system 700a) and the state of the shared object is determined based on interaction 925g. Interaction 925g corresponds to a clockwise rotation of the shared object. In response to interaction 925g, representation 912a and representation 912b are updated (e.g., rotated back in the clockwise direction) according to interaction 925g as shown in FIG. 9H.

In some embodiments, content in environment 900 (and/or representations of content in environment 900) can be edited in response to user input. For example, input 925h on computer system 700b in FIG. 9G corresponds to a request to edit the shared object, and more specifically, to change a color of the shared object. In response to input 925h, the color of representation 912a and representation 912b of the shared object are changed according to input 925h, as shown in FIG. 9H.

Figure 9I:
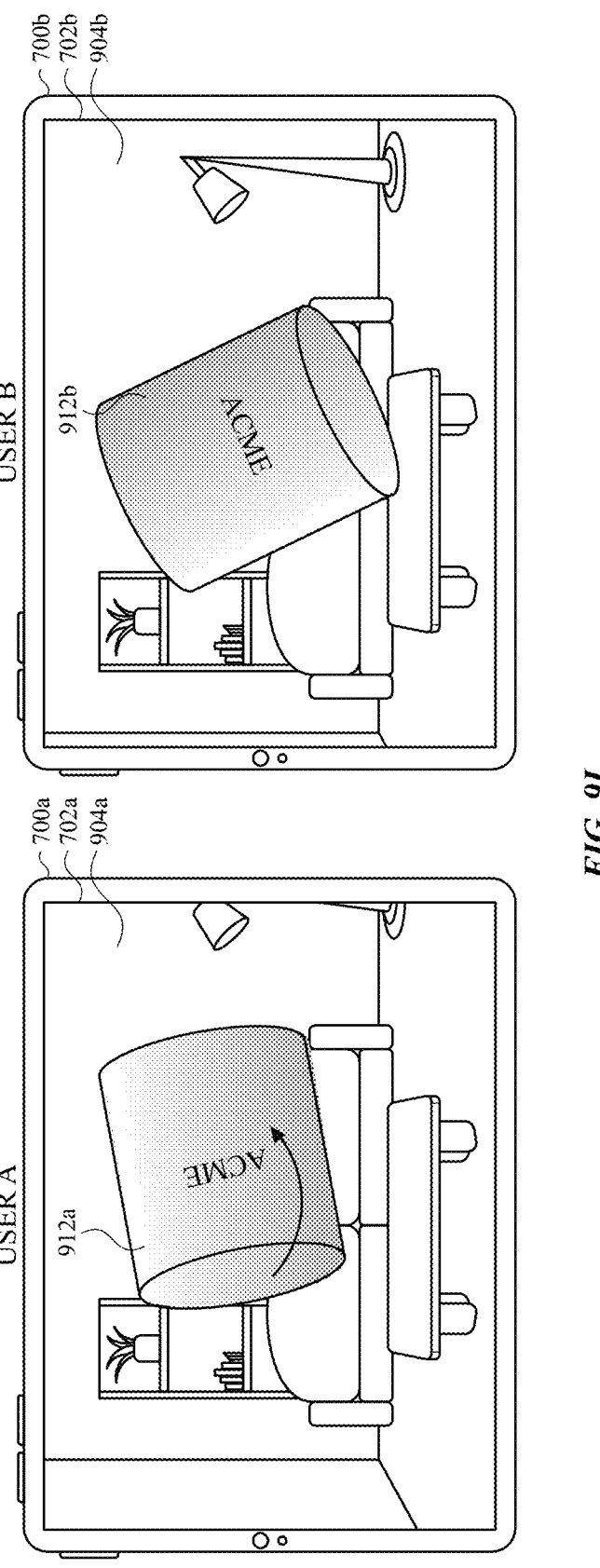

In some embodiments, certain types of events (e.g., interactions and/or conditions) can initiate an action on an object that is displayed for one user but not for others. For example, in FIG. 9H, an event associated with computer system 700*a* (or User A via computer system 700*a*) occurs. The event is represented by symbol 925*i* (also referred to as event 925*i*). In some embodiments, event 925*i* includes a gaze of User A looking at representation 912*a* and/or an input (e.g., a tap, a voice command, an air gesture, and/or a press of a button) directed to representation 912*a* (e.g., while a gaze is concurrently directed to representation 912*a*). In some embodiments, event 925*i* includes satisfying a proximity condition (e.g., User A and/or a representation of User A in environment 900 moves within a threshold distance of the shared object and/or representation 912*a*). In response to event 925*i*, computer system 700*a* displays an animation that includes movement of representation 912*a*, as illustrated in FIGS. 9H-9J1. FIG. 9H illustrates representation 912*a* in an initial state of the animation and an arrow indicating a movement of the animation. FIG. 9I illustrates an intermedia state of representation 912*a* during the animation. As shown in FIG. 9I, representation 912*a* has rotated clockwise to the position in FIG. 9I. As indicated by the arrow in FIG. 9I, representation 912*a* then rotates back to the initial state, as shown in FIG. 9J1. On computer system 700*b*, representation 912*b* maintains the same state (e.g., remains static in FIGS. 9H-9J1) while the animation of representation 912*a* is performed (e.g., computer system 700*b* does not display the animation for representation 912*b*). For example, the animation of representation 912*a* is only displayed locally (e.g., at the computer system associated with event 925*i*).

In some embodiments, the techniques and user interface(s) described in FIGS. 9A-9K are provided by one or more of the devices described in FIGS. 1A-1P. For example, FIGS. 9J2A and 9J2B (e.g., corresponding to User A and User B in FIG. 9J1, respectively) illustrate an embodiment in which representation 912*a* and representation 912*b* (e.g., as described in FIGS. 9H-9J1) are displayed on display module X702*a* of HMD X700*a* and display module X702*b* of HMD X700*b*, respectively. In some embodiments, HMD X700*a* and/or HMD X700*b* include a pair of display modules that provide stereoscopic content to different eyes of the same user. For example, HMD X700*a* includes display module X702*a* (which provides content to a left eye of the user) and a second display module (which provides content to a right eye of the user). In some embodiments, the second display module displays a slightly different image than display module X702*a* to generate the illusion of stereoscopic depth.

For example, in FIG. 9J2A, an event associated with HMD X700*a* (or User A via HMD X700*a*) occurs. The event is represented by symbol X925*i* (also referred to as event X925*i*). In some embodiments, event X925*i* includes a gaze of User A looking at representation 912*a* and/or an input (e.g., a tap, a voice command, an air gesture, and/or a press of a button) directed to representation 912*a* (e.g., while a gaze is concurrently directed to representation 912*a*). In some embodiments, HMD X700*a* detects event X925*i* based on an air gesture performed by a user of HMD X700*a*. In some embodiments, HMD X700*a* detects hands X750A and/or X750B of the user of HMD X700 and determines whether motion of hands X750A and/or X750B perform a predetermined air gesture corresponding to selection of representation 912*a*. In some embodiments, the predetermined air gesture selecting representation 912*a* includes a pinch gesture. In some embodiments, the pinch gesture includes detecting movement of finger X750C and thumb X750D toward one another. In some embodiments, HMD X700*a* detects selection of representation 912*a* based on a gaze and air gesture input performed by the user of HMD

X700*a*. In some embodiments, the gaze and air gesture input includes detecting that the user of HMD X700*a* is looking at representation 912*a* (e.g., for more than a predetermined amount of time) and hands X750A and/or X750B of the user of HMD X700*a* perform a pinch gesture.

In some embodiments, event X925*i* includes satisfying a proximity condition (e.g., User A and/or a representation of User A in environment 900 moves within a threshold distance of the shared object and/or representation 912*a*). In response to event X925*i*, HMD X700*a* displays an animation that includes movement of representation 912*a* (e.g., as illustrated in FIGS. 9H-9J1). FIG. 9J2A illustrates representation 912*a* in an initial state of the animation and an arrow indicating a movement of the animation (e.g., analogous to FIG. 9H). In some embodiments, HMD X700*a* displays an intermedia state of representation 912*a* during the animation (e.g., as described in FIG. 9I) in which representation 912*a* has rotated clockwise (e.g., to the position in FIG. 9I) and then rotates back to the initial state shown in FIG. 9J2A. On HMD X700*b*, representation 912*b* maintains the same state (e.g., remains static) while the animation of representation 912*a* is performed on HMD X700*a* (e.g., HMD X700*b* does not display the animation for representation 912*b*). For example, the animation of representation 912*a* is only displayed locally (e.g., at HMD X700*a*).

Any of the features, components, and/or parts, including the arrangements and configurations thereof shown in FIGS. 1B-1P can be included, either alone or in any combination, in HMD X700*a* and/or HMD X700*b*. For example, in some embodiments, HMD X700*a* and/or HMD X700*b* include any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702*a* and/or display module X702*b* include any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700*a* and/or HMD X700*b* include a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, cither alone or in any combination. In some embodiments, input device X703*a* and/or X703*b* includes any of the features, components, and/or parts of any of first button 1-128, button 11.1.1-114, second button 1-132, and or dial or button 1-328, either alone or in any combination. In some embodiments, HMD X700*a* and/or HMD 700*b* include one or more audio output components (e.g., electronic component 1-112) for generating audio feedback, optionally generated based on detected events and/or user inputs detected by the HMD X700*a* and/or HMD X700*b*, respectively.

Figure 9K:
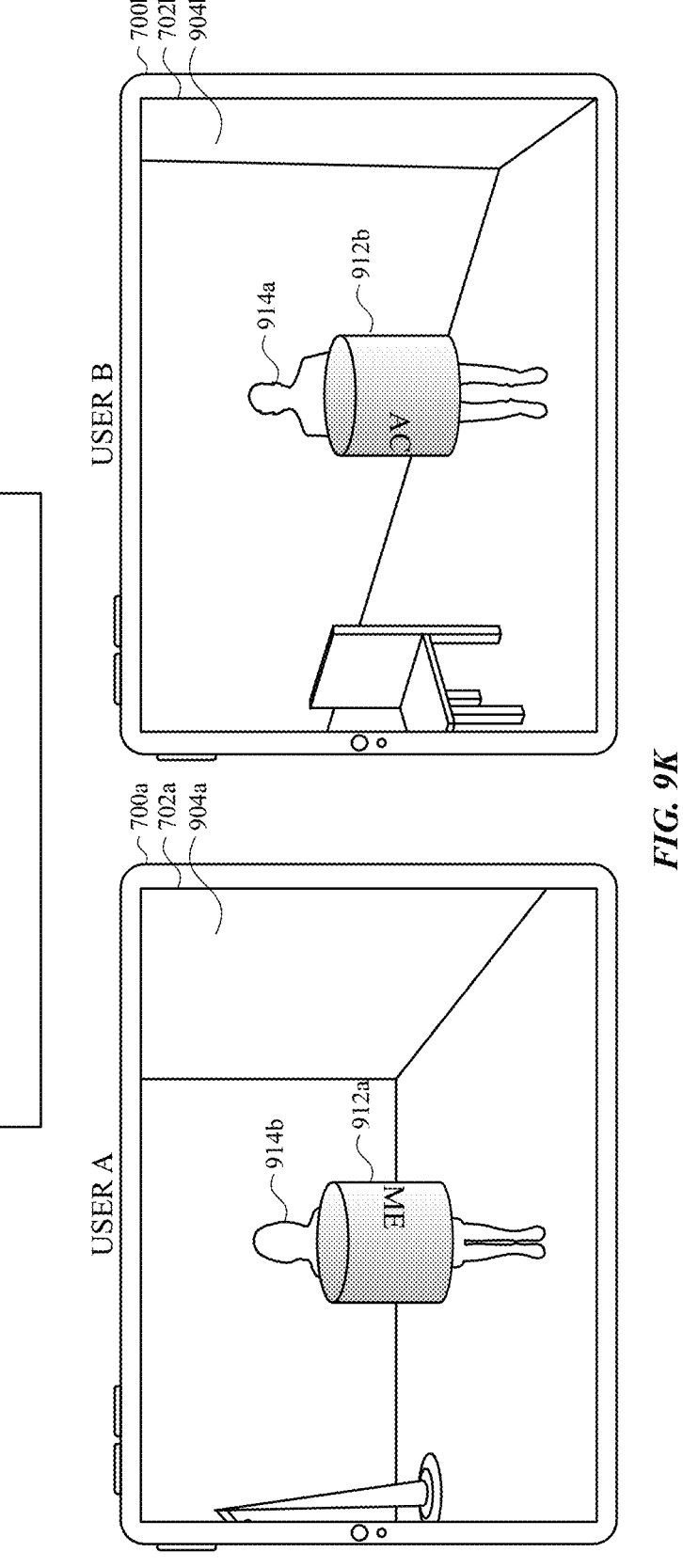

Turning to FIG. 9K, User A and User B move to different locations in environment 900. As illustrated in diagram 902*b*, User A and User B have moved apart and are facing each other, with the shared object in between them. In FIG. 9K, computer system 700a displays (e.g., updates) view 904a based on the viewpoint of User A in environment 900 and computer system 700b displays (e.g., updates) view 904b based on the viewpoint of User B in environment 900. For example, because User A and User B are facing each other in environment 900, view 904a in FIG. 9K includes representation 914b of User B and view 904b includes representation 914a of User A. FIG. 9K also illustrates that the view that a user has of the shared object is based on the position of the user in environment 900 relative to the shared object. For example, because User A and User B have moved (and/or their viewpoints have moved) to different locations in environment 900, representation 912a and representation 912b show different portions of the shared object.

Additional descriptions regarding FIGS. 9A-9K are provided below in reference to method 1000 described with respect to FIG. 10.

FIG. 10 is a flow diagram of an exemplary method 1000 for displaying content in a shared computer-generated environment, in some embodiments. In some embodiments, method 1000 is performed at a computer system (e.g., computer system 101 in FIG. 1A) (e.g., 700a, 700b, 700c, X700a, X700b, and/or X700c) (e.g., a smart phone, a smart watch, a tablet computer, a laptop computer, a desktop computer, a wearable device, and/or head-mounted device) that is in communication with one or more display generation components (e.g., display generation component 120 in FIGS. 1A, 3, and 4) (e.g., 702a, 702b, 702c, X702a, X702b, and/or X702c) (e.g., a visual output device, a display, a touch-sensitive display, a monitor, a 3D display, a display having at least a portion that is transparent or translucent on which images can be projected (e.g., a see-through display), a projector, a heads-up display, and/or a display controller) and one or more input devices (e.g., 125, X703a, X703b, X703c, 702a, 702b, and/or 702c) (e.g., a touch-sensitive surface (e.g., a touch-sensitive display); a mouse; a keyboard; a remote control; a visual input device (e.g., X704a, X704b, and/or X704c) (e.g., one or more cameras (e.g., an infrared camera, a depth camera, a visible light camera, and/or a gaze tracking camera)); an audio input device; and/or a biometric sensor (e.g., a fingerprint sensor, a face identification sensor, a gaze tracking sensor, and/or an iris identification sensor)). In some embodiments, method 1000 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1000 are, optionally, combined and/or the order of some operations is, optionally, changed.

While (1002) the computer system is in (e.g., connected to) a real-time communication session (and/or, in some embodiments, while the computer system is providing an extended reality experience) that includes (e.g., concurrently includes) two or more participants (e.g., User A and User B) (e.g., the user of the computer system and one or more other participants), wherein the real-time communication session (or, in some embodiments, the extended reality experience) includes a three-dimensional environment (e.g., 900) (e.g., a virtual three-dimensional environment and/or a three-dimensional XR environment) shared (e.g., concurrently shared) by the two or more participants (e.g., the two or more participants can communicate via audio, video, and/or avatar representations in the three-dimensional environment): the computer system displays (1004), via the one or more display generation components, a representation (e.g.,

904a and/or 904b) of the three-dimensional environment. In some embodiments, the computer system is associated with a first participant. While displaying the representation of the three-dimensional environment, the computer system detects (1006), via the one or more input devices, a set of one or more inputs (e.g., 925a, 925b, and/or 925c) including a request to add content (e.g., content corresponding to 906a and/or 910a) to the three-dimensional environment in the real-time communication session (or, in some embodiments, in the extended reality experience) (e.g., to share content with the other participants by adding the content to the three-dimensional environment). In response (1008) to detecting the set of one or more inputs including the request to add the content to the three-dimensional environment in the real-time communication session (or, in some embodiments, the extended reality experience), the computer system adds (1010) the content (e.g., content corresponding to 908a and/or 908b in FIG. 9C and/or 912a and/or 912b in FIG. 9E) to (e.g., displaying the content in) the three-dimensional environment and shares (1012) the content in the real-time communication session (or, in some embodiments, the extended reality experience) (e.g., such that other participants can view and/or access the content in the three-dimensional environment). Adding the content to the three-dimensional environment and sharing the content in a real-time communication session in response to detecting a request to add the content to the three-dimensional environment enables the user to control the content in the three-dimensional environment and to quickly and efficiently collaborate with other participants, thereby providing improved visual feedback to the user, reducing the number of inputs needed to perform an operation, and providing a more varied, detailed, and/or realistic user experience while saving storage space. In some embodiments, the computer system provides (e.g., outputs audio and/or displays a user interface of) a real-time (e.g., live) communication session. In some embodiments, representations of participants of the real-time communication session are displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying a representation of a participant's body (e.g., facial expression, body expression, body position, and/or body movement) via the representation of the participant. In some embodiments, providing the real-time communication session includes displaying the representation of the participant and/or outputting audio corresponding to utterances of the participant in real time. In some embodiments, the computer system and one or more other (e.g., remote) computer systems are in communication (e.g., wireless communication) with one another to enable transmission of information indicative of the representation of the participant and/or audio corresponding to utterances of the participant between the computer system and the one or more other computer systems. In some embodiments, a real-time communication session includes an XR experience (e.g., an XR environment). In some embodiments, the real-time communication session includes displaying a representation of the first participant (and, optionally, a representation of a second participant) in an XR environment via display generation components of the computer system and the one or more other computer systems in communication via the real-time communication session.

In some embodiments, while the content is shared in the real-time communication session (or, in some embodiments, while the content is shared in the extended reality experience): the computer system displays, via the one or more display generation components, a representation (e.g., 908a, 908b, 912a and/or 912b) of the content having a first appearance (e.g., a first position and/or visual appearance) in the three-dimensional environment; the computer system detects, via the one or more input devices, an input (e.g., 925d, 925f, 925g, and/or 925h) corresponding to a request to change a state of (e.g., to manipulate, to move, to edit, to change a position of, to change a size of, to change a color of, and/or to change a property of) the content in the three-dimensional environment; and in response to detecting the input corresponding the request to change the state of the content in the three-dimensional environment, the computer system displays, via the one or more display generation components, the representation of the content having a second appearance (e.g., a second position and/or visual appearance) in the three-dimensional environment that is different from the first appearance (e.g., the computer system changes the appearance of the content in the three-dimensional environment). In some embodiments, a view of the content in the three-dimensional environment provided to other participants of the real-time communication session changes when the state of the content is changed by a participant in the real-time communication session. In some embodiments, the computer system changes display of the content in response to a request to change the state of the content by other participants in the real-time communication session. In some embodiments, the computer system detects a request to edit the content, and in response to detecting the request to edit the content: in accordance with a determination that the content is a first type of content (e.g., editable content), the computer system edits the content in the real-time communication session; and in accordance with a determination that the content is a second type of content that is different from the first type of content, the computer system foregoes editing the content.

In some embodiments, in response to detecting the set of one or more inputs (e.g., 925c) including the request to add the content to the three-dimensional environment in the real-time communication session (or, in some embodiments, the extended reality experience), the computer system sends (e.g., transmits) the content (e.g., a file that includes data representing the content) (e.g., sending data representing the content corresponding to 912a to computer system 700b) to one or more participants of the real-time communication session (or, in some embodiments, the extended reality experience) (e.g., the computer system sends a copy of the content to the other participants such that the other participants have a local copy of the content). Sending the content to one or more participants of the real-time communication session reduces the resources required to share and/or manipulate the content, thereby providing a more varied, detailed, and/or realistic user experience while saving storage space. In some embodiments, the computer system detects, via the one or more input devices, a first request (e.g., 925d, 925f, 925g, and/or 925h) to control (e.g., to change a state of, to change a view of, and/or to edit) the content (e.g., the content represented by 912a and/or 912b) in the real-time communication session (or, in some embodiments, the extended reality experience); and in response to detecting the first request to control the content in the real-time communication session (or, in some embodiments, the extended reality experience), the computer system controls (e.g., takes control of) the content (e.g., controlling the content represented by 912a and/or 912b) in the real-time communication session, including changing a state of the content (e.g., changing a state of the content represented by 912a and/or 912b) in the real-time communication session (or, in some embodiments, the extended reality experience) (e.g., for the two or more participants; e.g., a state of the content is synchronized between the two or more participants). In some embodiments, in response to detecting the first request to control the content in the three-dimensional environment, the computer system sends (e.g., via the real-time communication session) information representing the state (and/or, in some embodiments, the change in state) of the content (e.g., to the other participants). In some embodiments, the first request to control the content in the three-dimensional environment includes a set of one or more inputs (e.g., 925d, 925f, 925g, and/or 925h) by a user of the computer system. In some embodiments, the set of one or more inputs includes an interaction with the content (e.g., a tap, a gesture, an air gesture, and/or other input directed to the content in the three-dimensional environment). In some embodiments, the set of one or more inputs corresponds to a request to rotate the content, scale the content, change a size of the content, and/or to change a zoom level of the content. In some embodiments, the set of one or more inputs includes a request to initiate an animation of the content. In some embodiments, while the computer system (e.g., 700a) has control of the content in the real-time communication session (or, in some embodiments, the extended reality experience) (e.g., while detecting the first request to control the content) (e.g., in FIG. 9E), a second participant (e.g., a participant different from the user of the computer system) (e.g., User B) requests (e.g., via 925f) to control (e.g., interacts with and or requests to change a state of) the content in the real-time communication session (or, in some embodiments, the extended reality experience); and in response to the second participant requesting to control the content in the real-time communication session (or, in some embodiments, the extended reality experience), the computer system ceases control of the content (e.g., the state of the content) in the real-time communication session (or, in some embodiments, the extended reality experience) by the computer system (e.g., 700a) (e.g., the participant that most recently interacts with the content in the real-time communication session takes control of the content; and/or the second participant takes, obtains, and/or is provided with control of the content). Ceasing control of the content in response to the second participant requesting to control the content avoids providing different feedback to different participants and resolves potentially conflicting inputs while reducing interruptions, thereby providing improved visual feedback to the user, reducing the number of inputs needed to perform an operation, and providing a more varied, detailed, and/or realistic user experience while saving storage space. In some embodiments, after ceasing control of the content by the computer system (and, in some embodiments, while the second participant is controlling the content), the computer system detects, via the one or more input devices, a second request (e.g., 925g) to control the content in the real-time communication session (or, in some embodiments, the extended reality experience); and in response to detecting the second request to control the content in the real-time communication session (or, in some embodiments, the extended reality experience), the computer system controls (e.g., re-takes control of) the content in the real-time communication session (or, in some embodiments, the extended reality experience) (e.g., 700*a* re-takes control of the content represented by 912*a* in FIG. 9G). Controlling the content in response to detecting the second request to control the content provides the user with the ability to re-take control of the content and makes it more efficient to perform a desired action, thereby providing improved visual feedback to the user and reducing the number of inputs needed to perform an operation.

In some embodiments, in response to detecting the first request to control the content in the real-time communication session (or, in some embodiments, the extended reality experience) (or, in some embodiments, in response to detecting that the first request to control the content has ended): in accordance with a determination that a network used to perform the real-time communication session (or, in some embodiments, the extended reality experience) is in a first state (e.g., an unreliable state, a state with a bandwidth that does not meet (e.g., is less than) a bandwidth threshold, and/or a state with a poor connection), the computer system sends, via a first communication channel (e.g., a low-bandwidth communication channel) a final state of the content in the real-time communication session (or, in some embodiments, the extended reality experience) (e.g., a state of the content when the computer system ceases control of (or ceases to have control of) the content). In some embodiments, in accordance with a determination that the network used to perform the real-time communication session (or, in some embodiments, to provide the extended reality experience) is in a second state (e.g., a reliable state, a state with a bandwidth that meets (e.g., is greater than or equal to) the bandwidth threshold, and/or a state with a good connection), the computer system foregoes sending the final state of the content via the first communication channel. Sending the final state via a first communication channel in accordance with a determination that a network used to perform the real-time communication session is in a first state enables the computer system to convey relevant information for displaying the content when network performance is reduced, thereby performing an operation when a set of conditions has been met without requiring further user input. In some embodiments, while the network used to perform the real-time communication session (or, in some embodiments, the extended reality experience) is in the first state, the computer system sends, via a second communication channel (e.g., a communication channel with a bandwidth that is greater than the first communication channel), intermediate states (e.g., states between an initial state and the final state) of the content in the real-time communication session (or, in some embodiments, the extended reality experience).

In some embodiments, while the computer system is in the real-time communication session (or, in some embodiments, while the computer system is providing the extended reality experience): the computer system displays, via the one or more display generation components, a representation (e.g., 912*a*) of the content having a third appearance (e.g., a first position and/or visual appearance) in the three-dimensional environment (e.g., the orientation of 912*a* in FIG. 9H and/or in FIG. 9J2A); and in response to a determination that an event (e.g., 925*i* and/or X925*i*) has occurred, the computer system displays, via the display generation component, the representation (e.g., 912*a*) of the content having a fourth appearance (e.g., a second position and/or visual appearance) (e.g., displaying an animation that includes movement of the content) in the three-dimensional environment (e.g., the orientation of 912*a* in FIG. 9I) without including the second appearance in the real-time communication session (or, in some embodiments, the extended reality experience) (e.g., without sending information representing the second appearance of the content to other participants) (e.g., the fourth appearance of the content is displayed locally at the computer system but is not displayed to other participants) (e.g., appearance of 912*b* does not change from FIG. 9H to FIG. 9I). In some embodiments, in response to a determination that the event has occurred: in accordance with a determination that the event is a first type of event, the computer system changes a state of the content in the real-time communication session (or, in some embodiments, the extended reality experience) (e.g., including for participants other than the user of the computer system); and in accordance with a determination that the event is a second type of event that is different from the first type of event, the computer system displays the content in the three-dimensional environment without including the fourth appearance in the real-time communication session (or, in some embodiments, the extended reality experience). Displaying the representation of the content having a fourth appearance without including the second appearance in the real-time communication session enables display of an action locally for a user without sharing the action with other participants, thereby providing improved privacy and/or security and providing a more varied, detailed, and/or realistic user experience while saving storage space. In some embodiments, the event (e.g., 925*i* and/or X925*i*) includes a distance between the content and a position associated with a user of the computer system in the three-dimensional environment satisfying (e.g., being less than; and/or being less than or equal to) a threshold distance. In some embodiments, the computer system displays the content having the fourth appearance in response to a determination that a distance between the content and the position associated with the user of the computer system satisfies (e.g., is less than; or is less than or equal to) the threshold distance (e.g., the computer system automatically displays an animation and/or other change in state of the content when the user is in proximity of the content in the three-dimensional environment). In some embodiments, the event (e.g., 925*i* and/or X925*i*) includes a gaze of a user of the computer system satisfying a set of gaze criteria (e.g., the gaze is directed to the content and/or the gaze is directed to the content for a threshold amount of time (e.g., the gaze dwells on the content)). In some embodiments, the computer system displays the content having the fourth appearance in response to a determination that the gaze of the user of the computer system satisfies the set of gaze criteria (e.g., the computer system automatically displays an animation and/or other change in state of the content when the user looks at the content).

In some embodiments, the content includes a three-dimensional virtual object (e.g., the object represented by 910*a*, 910*b*, 912*a*, and/or 912*b*). In some embodiments, the content includes a video (e.g., in some embodiments, the content represented by 908*a* is a video). In some embodiments, the content includes a virtual document (e.g., a two-dimensional object, a presentation, a word processing document, a file, and/or a photo) (e.g., in some embodiments, the content represented by 908*a* is a virtual document). In some embodiments, displaying the representation (e.g., 904*a* and/or 904*b*) of the three-dimensional environment (e.g., 900) includes displaying the representation of the three-dimensional environment (and, in some embodiments, displaying a representation of the content) from a first viewpoint (e.g., viewpoint of User A in FIG. 9K) that is different from a viewpoint (e.g., the viewpoint of User B in FIG. 9K) of the three-dimensional environment (and, in some embodiments, of the content) of a second participant in the real-time communication session (or, in some embodiments, the extended reality experience) (e.g., different participants have different viewpoints and/or positions in the three-dimensional environment and/or different views of the content). In some embodiments, the computer system displays, via the one or more display generation components, a representation (e.g., 914*a* and/or 914*b*) (e.g., an avatar) of one or more of the participants in the three-dimensional environment. In some embodiments, the representations of the participants displayed in the three-dimensional environment move in response to physical movement of the corresponding participant.

In some embodiments, aspects and/or operations of methods 800 and 1000 may be interchanged, substituted, and/or added between these methods. For example, the content in the collaboration session of method 800 can be included in the three-dimensional environment described in method 1000. For example, the content in the added to the three-dimensional environment in method 1000 can be included in the collaboration session described in method 1000.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve content collaboration and sharing. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve content collaboration and sharing. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content collaboration and sharing, the present technology can be configured to allow users to select to "opt in" or "opt out" of participation in the collection of personal information data during registration for services or anytime thereafter. In another example, users can select not to provide data for content collaboration and sharing. In yet another example, users can select to limit the length of time data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content collaboration and sharing based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:

one or more processors; and memory storing one or more programs configured to be executed by the one or more processors, the one or more programs including instructions for:

while the computer system is in a real-time communication session that includes two or more participants, wherein the real-time communication session includes a three-dimensional environment shared by the two or more participants:

displaying, via the one or more display generation components, a representation of the three-dimensional environment;

while displaying the representation of the three-dimensional environment, detecting, via the one or more input devices, a set of one or more inputs including a request to add content to the three-dimensional environment in the real-time communication session;

in response to detecting the set of one or more inputs including the request to add the content to the three-dimensional environment in the real-time communication session, adding the content to the three-dimensional environment and sharing the content in the real-time communication session; and while the content is shared in the real-time communication session:

displaying, via the one or more display generation components, a representation of the content having a first appearance in the three-dimensional environment; and in response to a determination that an event has occurred, displaying, via the one or more display generation components, the representation of the content having a second appearance in the three-dimensional environment without including the second appearance in the real-time communication session.

2. The computer system of claim 1, the one or more programs including further instructions for:

while the content is shared in the real-time communication session:

displaying, via the one or more display generation components, a representation of the content having a third appearance in the three-dimensional environment;

detecting, via the one or more input devices, an input corresponding to a request to change a state of the content in the three-dimensional environment; and in response to detecting the input corresponding the request to change the state of the content in the three-dimensional environment, displaying, via the one or more display generation components, the representation of the content having a fourth appearance in the three-dimensional environment that is different from the third appearance.

3. The computer system of claim 1, the one or more programs including further instructions for:

in response to detecting the set of one or more inputs including the request to add the content to the three-dimensional environment in the real-time communication session, sending the content to one or more participants of the real-time communication session.

4. The computer system of claim 3, the one or more programs including further instructions for:

detecting, via the one or more input devices, a first request to control the content in the real-time communication session; and in response to detecting the first request to control the content in the real-time communication session, controlling the content in the real-time communication session, including changing a state of the content in the real-time communication session.

5. The computer system of claim 4, wherein the first request to control the content in the three-dimensional environment includes a set of one or more inputs by a user of the computer system.

6. The computer system of claim 4, the one or more programs including further instructions for:

while the computer system has control of the content in the real-time communication session, a second participant requests to control the content in the real-time communication session; and in response to the second participant requesting to control the content in the real-time communication session, ceasing control of the content in the real-time communication session by the computer system.

7. The computer system of claim 6, the one or more programs including further instructions for:

after ceasing control of the content by the computer system, detecting, via the one or more input devices, a second request to control the content in the real-time communication session; and in response to detecting the second request to control the content in the real-time communication session, controlling the content in the real-time communication session.

8. The computer system of claim 4, the one or more programs including further instructions for:

in response to detecting the first request to control the content in the real-time communication session:

in accordance with a determination that a network used to perform the real-time communication session is in a first state, sending, via a first communication channel a final state of the content in the real-time communication session.

9. The computer system of claim 8, the one or more programs including further instructions for:

while the network used to perform the real-time communication session is in the first state, sending, via a second communication channel, intermediate states of the content in the real-time communication session.

10. The computer system of claim 1, wherein the event includes a distance between the content and a position associated with a user of the computer system in the three-dimensional environment satisfying a threshold distance.

11. The computer system of claim 1, wherein the event includes a gaze of a user of the computer system satisfying a set of gaze criteria.

12. The computer system of claim 1, wherein the content includes a three-dimensional virtual object.

13. The computer system of claim 1, wherein the content includes a video.

14. The computer system of claim 1, wherein the content includes a virtual document.

15. The computer system of claim 1, wherein displaying the representation of the three-dimensional environment includes displaying the representation of the three-dimensional environment from a first viewpoint that is different from a viewpoint of the three-dimensional environment of a second participant in the real-time communication session.

16. The computer system of claim 1, the one or more programs including further instructions for:
displaying, via the one or more display generation components, a representation of one or more of the participants in the three-dimensional environment.

17. A non-transitory computer-readable storage medium storing one or more programs configured to be executed by one or more processors of a computer system that is in communication with one or more display generation components and one or more input devices, the one or more programs including instructions for:
while the computer system is in a real-time communication session that includes two or more participants, wherein the real-time communication session includes a three-dimensional environment shared by the two or more participants:
displaying, via the one or more display generation components, a representation of the three-dimensional environment;
while displaying the representation of the three-dimensional environment, detecting, via the one or more input devices, a set of one or more inputs including a request to add content to the three-dimensional environment in the real-time communication session;
in response to detecting the set of one or more inputs including the request to add the content to the three-dimensional environment in the real-time communication session, adding the content to the three-dimensional environment and sharing the content in the real-time communication session; and
while the content is shared in the real-time communication session:
displaying, via the one or more display generation components, a representation of the content having a first appearance in the three-dimensional environment; and
in response to a determination that an event has occurred, displaying, via the one or more display generation components, the representation of the content having a second appearance in the three-dimensional environment without including the second appearance in the real-time communication session.

18. The non-transitory computer-readable storage medium of claim 17, the one or more programs including further instructions for:
while the content is shared in the real-time communication session:
displaying, via the one or more display generation components, a representation of the content having a third appearance in the three-dimensional environment;
detecting, via the one or more input devices, an input corresponding to a request to change a state of the content in the three-dimensional environment; and
in response to detecting the input corresponding the request to change the state of the content in the three-dimensional environment, displaying, via the one or more display generation components, the representation of the content having a fourth appearance in the three-dimensional environment that is different from the third appearance.

19. The non-transitory computer-readable storage medium of claim 17, the one or more programs including further instructions for:
in response to detecting the set of one or more inputs including the request to add the content to the three-dimensional environment in the real-time communication session, sending the content to one or more participants of the real-time communication session.

20. The non-transitory computer-readable storage medium of claim 19, the one or more programs including further instructions for:
detecting, via the one or more input devices, a first request to control the content in the real-time communication session; and
in response to detecting the first request to control the content in the real-time communication session, controlling the content in the real-time communication session, including changing a state of the content in the real-time communication session.

21. The non-transitory computer-readable storage medium of claim 20, wherein the first request to control the content in the three-dimensional environment includes a set of one or more inputs by a user of the computer system.

22. The non-transitory computer-readable storage medium of claim 20, the one or more programs including further instructions for:
while the computer system has control of the content in the real-time communication session, a second participant requests to control the content in the real-time communication session; and
in response to the second participant requesting to control the content in the real-time communication session, ceasing control of the content in the real-time communication session by the computer system.

23. The non-transitory computer-readable storage medium of claim 22, the one or more programs including further instructions for:
after ceasing control of the content by the computer system, detecting, via the one or more input devices, a second request to control the content in the real-time communication session; and
in response to detecting the second request to control the content in the real-time communication session, controlling the content in the real-time communication session.

24. The non-transitory computer-readable storage medium of claim 20, the one or more programs including further instructions for:
in response to detecting the first request to control the content in the real-time communication session:
in accordance with a determination that a network used to perform the real-time communication session is in a first state, sending, via a first communication channel a final state of the content in the real-time communication session.

25. The non-transitory computer-readable storage medium of claim 24, the one or more programs including further instructions for:
while the network used to perform the real-time communication session is in the first state, sending, via a second communication channel, intermediate states of the content in the real-time communication session.

26. The non-transitory computer-readable storage medium of claim 17, wherein the event includes a distance between the content and a position associated with a user of the computer system in the three-dimensional environment satisfying a threshold distance.

27. The non-transitory computer-readable storage medium of claim 17, wherein the event includes a gaze of a user of the computer system satisfying a set of gaze criteria.

28. The non-transitory computer-readable storage medium of claim 17, wherein the content includes a three-dimensional virtual object.

29. The non-transitory computer-readable storage medium of claim 17, wherein the content includes a video.

30. The non-transitory computer-readable storage medium of claim 17, wherein the content includes a virtual document.

31. The non-transitory computer-readable storage medium of claim 17, wherein displaying the representation of the three-dimensional environment includes displaying the representation of the three-dimensional environment from a first viewpoint that is different from a viewpoint of the three-dimensional environment of a second participant in the real-time communication session.

32. The non-transitory computer-readable storage medium of claim 17, the one or more programs including further instructions for:

displaying, via the one or more display generation components, a representation of one or more of the participants in the three-dimensional environment.

33. A method, comprising:

at a computer system that is in communication with one or more display generation components and one or more input devices:

while the computer system is in a real-time communication session that includes two or more participants, wherein the real-time communication session includes a three-dimensional environment shared by the two or more participants:

displaying, via the one or more display generation components, a representation of the three-dimensional environment;

while displaying the representation of the three-dimensional environment, detecting, via the one or more input devices, a set of one or more inputs including a request to add content to the three-dimensional environment in the real-time communication session;

in response to detecting the set of one or more inputs including the request to add the content to the three-dimensional environment in the real-time communication session, adding the content to the three-dimensional environment and sharing the content in the real-time communication session; and while the content is shared in the real-time communication session:

displaying, via the one or more display generation components, a representation of the content having a first appearance in the three-dimensional environment; and in response to a determination that an event has occurred, displaying, via the one or more display generation components, the representation of the content having a second appearance in the three-dimensional environment without including the second appearance in the real-time communication session.

34. The method of claim 33, further comprising:

while the content is shared in the real-time communication session:

displaying, via the one or more display generation components, a representation of the content having a third appearance in the three-dimensional environment;

detecting, via the one or more input devices, an input corresponding to a request to change a state of the content in the three-dimensional environment; and in response to detecting the input corresponding the request to change the state of the content in the three-dimensional environment, displaying, via the one or more display generation components, the representation of the content having a fourth appearance in the three-dimensional environment that is different from the third appearance.

35. The method of claim 33, further comprising:

in response to detecting the set of one or more inputs including the request to add the content to the three-dimensional environment in the real-time communication session, sending the content to one or more participants of the real-time communication session.

36. The method of claim 35, further comprising:

detecting, via the one or more input devices, a first request to control the content in the real-time communication session; and in response to detecting the first request to control the content in the real-time communication session, controlling the content in the real-time communication session, including changing a state of the content in the real-time communication session.

37. The method of claim 36, wherein the first request to control the content in the three-dimensional environment includes a set of one or more inputs by a user of the computer system.

38. The method of claim 36, further comprising:

while the computer system has control of the content in the real-time communication session, a second participant requests to control the content in the real-time communication session; and in response to the second participant requesting to control the content in the real-time communication session, ceasing control of the content in the real-time communication session by the computer system.

39. The method of claim 38, further comprising:

after ceasing control of the content by the computer system, detecting, via the one or more input devices, a second request to control the content in the real-time communication session; and in response to detecting the second request to control the content in the real-time communication session, controlling the content in the real-time communication session.

40. The method of claim 36, further comprising:

in response to detecting the first request to control the content in the real-time communication session:

in accordance with a determination that a network used to perform the real-time communication session is in a first state, sending, via a first communication channel a final state of the content in the real-time communication session.

41. The method of claim 40, further comprising:

while the network used to perform the real-time communication session is in the first state, sending, via a second communication channel, intermediate states of the content in the real-time communication session.

42. The method of claim 33, wherein the event includes a distance between the content and a position associated with a user of the computer system in the three-dimensional environment satisfying a threshold distance.

43. The method of claim 33, wherein the event includes a gaze of a user of the computer system satisfying a set of gaze criteria.

44. The method of claim 33, wherein the content includes a three-dimensional virtual object.

45. The method of claim 33, wherein the content includes a video.

46. The method of claim 33, wherein the content includes a virtual document.

47. The method of claim 33, wherein displaying the representation of the three-dimensional environment includes displaying the representation of the three-dimensional environment from a first viewpoint that is different from a viewpoint of the three-dimensional environment of a second participant in the real-time communication session.

48. The method of claim 33, further comprising:

displaying, via the one or more display generation components, a representation of one or more of the participants in the three-dimensional environment.

\*　\*　\*　\*　\*